US012425324B2

(12) United States Patent
Morris

(10) Patent No.: US 12,425,324 B2
(45) Date of Patent: Sep. 23, 2025

(54) METHODS, SYSTEMS, AND COMPUTER PROGRAM PRODUCTS FOR ASSOCIATING A NAME WITH A NETWORK PATH

(71) Applicant: SITTING MAN, LLC, Cary, NC (US)

(72) Inventor: Robert Paul Morris, Cary, NC (US)

(73) Assignee: Morris Routing Technologies, LLC, Plano, TX (US)

( * ) Notice: Subject to any disclaimer, the term of this patent is extended or adjusted under 35 U.S.C. 154(b) by 0 days.

(21) Appl. No.: 17/123,068

(22) Filed: Dec. 15, 2020

(65) Prior Publication Data

US 2021/0105210 A1   Apr. 8, 2021

Related U.S. Application Data

(63) Continuation of application No. 14/274,632, filed on May 9, 2014, now Pat. No. 10,904,144, which is a
(Continued)

(51) Int. Cl.
*G06F 15/16* (2006.01)
*H04L 45/02* (2022.01)
(Continued)

(52) U.S. Cl.
CPC .............. *H04L 45/02* (2013.01); *H04L 45/04* (2013.01); *H04L 45/16* (2013.01); *H04L 45/50* (2013.01);
(Continued)

(58) Field of Classification Search
CPC ....... H04L 45/745; H04L 45/02; H04L 45/04; H04L 45/16; H04L 45/22; H04L 45/50;
(Continued)

(56) References Cited

U.S. PATENT DOCUMENTS 5,504,747 A * 4/1996 Sweazey ................. H04L 12/66
370/403
7,471,669 B1 * 12/2008 Sabesan .................. H04L 45/02
370/351
(Continued)

FOREIGN PATENT DOCUMENTS

EP     1848235 A1 * 10/2007 .......... H04W 40/246
GB     2481907 A  *  1/2012 .......... H04L 12/2422
(Continued)

OTHER PUBLICATIONS

Performance comparison of hop count and radio aware path selection protocols in IEEE 802.11s WLAN mesh networks Sana Ghannay;Sonia Mettali Gammar;Farouk Kamoun 2008 1st IFIP Wireless Days Year: 2008 | Conference Paper | Publisher: IEEE (Year: 2008).*
(Continued)

*Primary Examiner* — Melvin H Pollack
(74) *Attorney, Agent, or Firm* — Patrick E. Caldwell, Esq.; The Caldwell Firm, LLC

(57) ABSTRACT

Methods and systems are described for associating a name with a network path. In an aspect, a first message is received, from a first node by a second node via a first network path in a network. A first symbolic identifier of the first node is identified, wherein the first network path includes a first hop included in communicatively coupling the first node and the second node. Second path information is identified that identifies a second hop in a second network path included in communicatively coupling the second node and a third node. A second message is sent, identifying the first symbolic identifier and the first hop, to the third node via the second hop to associate the first symbolic identifier with a third network path that includes a node included in at least one of the first hop and the second hop.

201 Claims, 34 Drawing Sheets

Related U.S. Application Data continuation-in-part of application No. 13/727,647, filed on Dec. 27, 2012, now abandoned, and a continuation-in-part of application No. 13/727,649, filed on Dec. 27, 2012, now abandoned, and a continuation-in-part of application No. 13/727,651, filed on Dec. 27, 2012, now abandoned, and a continuation-in-part of application No. 13/727,652, filed on Dec. 27, 2012, now abandoned, and a continuation-in-part of application No. 13/727,653, filed on Dec. 27, 2012, now abandoned, and a continuation-in-part of application No. 13/727,655, filed on Dec. 27, 2012, now abandoned, and a continuation-in-part of application No. 13/727,657, filed on Dec. 27, 2012, now abandoned, and a continuation-in-part of application No. 13/727,662, filed on Dec. 27, 2012, now abandoned.

(60) Provisional application No. 61/897,234, filed on Oct. 30, 2013, provisional application No. 61/833,565, filed on Jun. 11, 2013, provisional application No. 61/831,932, filed on Jun. 6, 2013, provisional application No. 61/830,064, filed on Jun. 1, 2013, provisional application No. 61/822,978, filed on May 14, 2013, provisional application No. 61/822,386, filed on May 12, 2013.

(51) Int. Cl.
  *H04L 45/12* (2022.01)
  *H04L 45/16* (2022.01)
  *H04L 45/50* (2022.01)
  *H04L 49/901* (2022.01)
  *H04L 61/4511* (2022.01)
  *H04L 61/5007* (2022.01)

(52) U.S. Cl.
  CPC .......... *H04L 49/901* (2013.01); *H04L 45/126* (2013.01); *H04L 61/4511* (2022.05); *H04L 61/5007* (2022.05)

(58) Field of Classification Search
  CPC . H04L 49/901; H04L 45/126; H04L 61/1511; H04L 61/2007
  USPC .......................................................... 709/238
  See application file for complete search history.

(56) References Cited

U.S. PATENT DOCUMENTS

| | | | |
|---|---|---|---|
| 7,808,919 B2 | 10/2010 | Nadeau et al. | |
| 7,983,174 B1 * | 7/2011 | Monaghan | H04L 45/50 370/242 |
| 8,645,565 B2 * | 2/2014 | Sparks | H04L 47/266 709/235 |
| 8,897,306 B2 * | 11/2014 | Hayashi | H04L 47/748 709/225 |
| 8,898,249 B1 * | 11/2014 | Bertz | H04L 61/30 370/254 |
| 8,898,335 B2 * | 11/2014 | Miyazaki | H04L 45/24 709/239 |
| 8,953,616 B2 * | 2/2015 | Allan | H04L 45/02 370/400 |
| 8,995,338 B2 * | 3/2015 | Viswanathan | H04W 40/00 370/328 |
| 9,013,985 B2 * | 4/2015 | Sivabalan | H04L 45/50 370/228 |
| 9,031,085 B2 * | 5/2015 | Murray | H04L 45/60 370/409 |
| 9,042,234 B1 * | 5/2015 | Liljenstolpe | H04L 45/00 370/238 |
| 9,064,106 B2 * | 6/2015 | Okita | G06F 21/6218 |
| 9,094,257 B2 * | 7/2015 | Morrill | H04L 45/304 |
| 9,109,915 B2 * | 8/2015 | Letz | G01C 21/343 |
| 9,110,689 B2 * | 8/2015 | Lecler | G06F 9/445 |
| 9,124,483 B2 * | 9/2015 | Peterson | H04Q 11/0062 |
| 9,141,717 B2 * | 9/2015 | Schneider | G06F 16/951 |
| 9,160,706 B2 * | 10/2015 | Scahill | H04L 61/4557 |
| 9,191,459 B2 * | 11/2015 | Ravindran | H04L 67/63 |
| 9,204,207 B2 * | 12/2015 | deRuijter | H04Q 3/0083 |
| 9,215,161 B2 * | 12/2015 | McGee | H04L 45/12 |
| 9,225,633 B2 * | 12/2015 | Jeng | H04L 45/16 |
| 9,231,851 B2 * | 1/2016 | Chen | H04L 45/12 |
| 9,247,482 B2 * | 1/2016 | Sherman | H04W 40/26 |
| 9,258,839 B2 * | 2/2016 | Rayavarapu | H04W 76/19 |
| 9,281,964 B2 * | 3/2016 | Xie | H04L 65/1016 |
| 9,306,764 B2 * | 4/2016 | Gossain | H04L 12/2838 |
| 9,363,164 B2 * | 6/2016 | Lemieux | H04L 45/22 |
| 9,432,213 B2 * | 8/2016 | Unbehagen | H04L 45/00 |
| 9,432,282 B2 * | 8/2016 | Shenoi | H04L 63/1408 |
| 9,479,341 B2 * | 10/2016 | Bugenhagen | H04L 43/12 |
| 9,491,084 B2 * | 11/2016 | McGee | H04L 45/48 |
| 9,497,081 B2 * | 11/2016 | Pignataro | H04L 41/12 |
| 9,503,360 B2 * | 11/2016 | Bragg | H04L 45/18 |
| 9,515,916 B2 * | 12/2016 | Zhang | H04L 67/563 |
| 9,537,754 B2 * | 1/2017 | Krishnaswamy | H04L 45/128 |
| 9,584,404 B2 | 2/2017 | Atlas et al. | |
| 9,774,517 B2 * | 9/2017 | Wittenstein | H04L 43/12 |
| 9,880,014 B2 * | 1/2018 | Tang | G01C 21/3423 |
| 10,038,621 B2 * | 7/2018 | Caviglia | H04L 45/26 |
| 10,063,475 B2 | 8/2018 | Previdi et al. | |
| 10,075,371 B2 * | 9/2018 | Nakano | H04L 45/245 |
| 10,250,492 B2 * | 4/2019 | Ceccarelli | H04L 45/22 |
| 10,277,501 B2 * | 4/2019 | Mentze | H04L 45/18 |
| 10,382,334 B2 | 8/2019 | Previdi et al. | |
| 10,454,848 B2 * | 10/2019 | Armbruster | G06F 11/1633 |
| 10,708,148 B2 * | 7/2020 | Polinati | H04L 41/5067 |
| 10,725,996 B1 * | 7/2020 | Holmes | G06F 11/1464 |
| 11,429,935 B2 * | 8/2022 | Dary | G06Q 10/087 |
| 2003/0088699 A1 * | 5/2003 | Luciani | H04L 45/00 709/243 |
| 2004/0219922 A1 * | 11/2004 | Gage | H04W 40/16 455/445 |
| 2006/0036762 A1 | 2/2006 | Vadlakonda et al. | |
| 2006/0056418 A1 * | 3/2006 | Rizzuto | H04L 61/4511 370/395.52 |
| 2007/0019647 A1 | 1/2007 | Roy et al. | |
| 2008/0049610 A1 * | 2/2008 | Linwong | H04Q 3/0025 370/225 |
| 2008/0235383 A1 * | 9/2008 | Schneider | H04L 61/30 709/229 |
| 2008/0285436 A1 * | 11/2008 | Robinson | H04L 12/4633 714/2 |
| 2009/0141721 A1 | 6/2009 | Filsfils | |
| 2009/0161576 A1 * | 6/2009 | Morris | H04L 61/6068 370/254 |
| 2012/0155327 A1 * | 6/2012 | Fondelli | H04L 41/0816 370/254 |
| 2013/0034103 A1 | 2/2013 | Chen et al. | |
| 2013/0058345 A1 * | 3/2013 | Kano | H04L 47/825 370/392 |
| 2014/0376371 A1 * | 12/2014 | Flinck | H04L 47/125 370/230 |
| 2015/0071057 A1 * | 3/2015 | Ceccarelli | H04L 45/28 370/228 |
| 2015/0098318 A1 * | 4/2015 | Gooch | H04L 41/0654 370/228 |
| 2018/0083871 A1 | 3/2018 | Filsfils et al. | |
| 2019/0349303 A1 | 11/2019 | Previdi et al. | |
| 2020/0403902 A1 | 12/2020 | Saad et al. | |

FOREIGN PATENT DOCUMENTS

| | | | |
|---|---|---|---|
| JP | 2004193644 | 7/2004 | |
| WO | WO-03019869 A1 * | 3/2003 | ......... H04L 12/2801 |
| WO | WO-2013067111 A1 * | 5/2013 | ........... H04L 45/122 |

OTHER PUBLICATIONS

(56) References Cited

OTHER PUBLICATIONS

Multi-Path Forwarding Strategy for Named Data Networking Based on Pending Interests and Available Bandwidth Shanshan Shi; Jun Li; Bin Han; Haibo Wu;Yuxiang Ma;Qian Dong;Hans D. Schotten 2021 IEEE Intl Conf on Parallel & Distributed Processing with Applications, Big Data & Cloud Computing, Sustainable Com (Year: 2021).*

An IP address based caching scheme for peer-to-peer networks R.A. Ferreira; A. Grama; S. Jagannathan GlobeCom '03. IEEE Global Telecommunications Conference (IEEE Cat. No.03CH37489) Year: 2003 | vol. 7 | Conference Paper | Publisher: IEEE (Year: 2003).*

An IP address based caching scheme for peer-to-peer networks R.A. Ferreira; A. Grama; S. Jagannathan GlobeCom '03. IEEE Global Telecommunications Conference (IEEE Cat. No.03CH37489) Year: 2003 | vol. 7 | Conference Paper | Publisher: IEEE (Year: 2003) (Year: 2003).*

Advisory_Action_mailed_Sep. 17, 2019 for U.S. Appl. No. 16/195,830. U.S. Pat. No. 9,9125,77.

Non-Final_Rejection_mailed_Sep. 12, 2019 for U.S. Appl. No. 16/195,823.

U.S. Appl. No. 15/961,828, Nov. 13, 2019_NOA.

U.S. Appl. No. 16/264,580, Oct. 30, 2019_NOA.

U.S. Appl. No. 16/454,030 Nov. 8, 2019_NOA.

"A Review of Routing Protocols for Mobile ad hoc Networks," Abolhasan et al., Ad Hoc Networks (2004).

"A Survey of Routing Algorithms for Wireless Sensor Networks," Narasimha Datta et al., J. Indian Inst. Sci. (2006).

"A Survey of Routing Protocols in Mobile Ad Hoc Networks," Taneja et al., International Journal of Innovation, Management, and Technology (2010).

"Computer Networking—A Top-Down Approach Featuring the Internet," Kurose and Ross, Addison Wesley, Second Edition (2003).

"Improving Convergence Speed and Scalability in OSPF," Goyal et al., HAL Open Science (2011).

"Multi-Domain Crankback Operations for IP/MPLS & DWDM Network", Fareena Saqib, Sep. 10, 2010.

"RSVP-TE: Extensions to RSVP for LSP Tunnels," Network Working Group, RFC 3209, Asduche et al.(2001).

"Understanding IP Addressing: Everything You Ever Wanted to Know," Chuck Semeria (1996).

Request for Ex Parte Reexamination for U.S. Pat. No. 12,058,042, filed Apr. 10, 2025.

Order Granting Request for Ex Parte Reexamination for U.S. Pat. No. 12,058,042, dated May 13, 2025.

Papers in Case No. 4:24-cv-00623.

Papers in Case No. 4:24-cv-00624.

Papers in Case No. 4:24-cv-00625.

Papers in Case No. 4:24-cv-00626.

Papers in U.S. Appl. No. 18/357,806 dated Jul. 15, 2025.

Papers in U.S. Appl. No. 19/185,200 dated Jul. 8, 2025.

Papers in U.S. Appl. No. 19/185,210 dated Jul. 2, 2025.

* cited by examiner

METHODS, SYSTEMS, AND COMPUTER PROGRAM PRODUCTS FOR ASSOCIATING A NAME WITH A NETWORK PATH

RELATED APPLICATIONS

The present application claims priority to U.S. application Ser. No. 14/274,632 filed May 8, 2014, and entitled "METHODS, SYSTEMS, AND COMPUTER PROGRAM PRODUCTS FOR ASSOCIATING A NAME WITH A NETWORK PATH," which in turn claims priority to U.S. application Ser. No. 13/727,647 filed Dec. 27, 2012 and entitled "Methods, Systems, and Computer Program Products for Identifying a Protocol Address based on Path Information," U.S. application Ser. No. 13/727,649 filed Dec. 27, 2012 and entitled "Methods, Systems, and Computer Program Products for Assigning an Interface Identifier to a Network Interface," U.S. Provisional Application No. 61/822,978 filed May 14, 2013 and entitled "Methods, Systems, and Computer Program Products For Transmitting Data Via A Scope-Specific Protocol Address," U.S. Provisional Application No. 61/822,386 filed May 12, 2013 and entitled "Methods, Systems, and Computer Program Products For Associating a Name With a Network Path," U.S. Provisional Application No. 61/897,234 filed Oct. 30, 2013 and entitled "Methods, Systems, and Computer Program Products For Transmitting Data Via A Variable Length Protocol Address," U.S. application Ser. No. 13/727,651 filed Dec. 27, 2012 and entitled "Methods, Systems, and Computer Program Products for Routing Based on a Nested Protocol Address," U.S. application Ser. No. 13/727,652 filed Dec. 27, 2012 and entitled "Methods, Systems, and Computer Program Products for Routing Based on a Scope-Specific Address," U.S. application Ser. No. 13/727,653 filed Dec. 27, 2012 and entitled "Methods, Systems, and Computer Program Products for Identifying a Protocol Address in a Scope-Specific Address Space," U.S. application Ser. No. 13/727,655 filed Dec. 27, 2012 and entitled "Methods, Systems, and Computer Program Products for Determining a Shared Identifier for a Hop in a Network," U.S. Provisional Application No. 61/830,064 filed Jun. 1, 2013 and entitled "Methods, Systems, and Computer Program Products For Adjusting A Separator Field For A Protocol Address," U.S. application Ser. No. 13/727,657 filed Dec. 27, 2012 and entitled "Methods, Systems, and Computer Program Products for Determining a Protocol Address For a Node," U.S. application Ser. No. 13/727,662 filed Dec. 27, 2012 and entitled "Methods, Systems, and Computer Program Products for Routing Based on a Path-Based Protocol Address," U.S. Provisional Application No. 61/831,932 filed Jun. 6, 2013 and entitled "Methods, Systems, and Computer Program Products for Source Routing," and U.S. Provisional Application No. 61/833,565 filed Jun. 11, 2013 and entitled "Methods, Systems, and Computer Program Products For Changing Protocol Address By A Network Relay," the entire contents of each are herein incorporated by reference.

Additionally, this application is related to the following commonly owned, currently pending U.S. patent applications by the present inventor, the entire disclosures of each being incorporated by reference herein: application Ser. No. 13/727,647 filed on 2012 Dec. 27, entitled "Methods, Systems, and Computer Program Products for Identifying a Protocol Address Based on Path Information";
Application Ser. No. 13/727,649 filed on 2012 Dec. 27, entitled "Methods, Systems, and Computer Program Products for Assigning an Interface Identifier to a Network Interface";
Application Ser. No. 13/727,651 filed on 2012 Dec. 27, entitled "Methods, Systems, and Computer Program Products for Routing Based on a Nested Protocol Address";
Application Ser. No. 13/727,652 filed on 2012 Dec. 27, entitled "Methods, Systems, and Computer Program Products for Routing Based on a Scope-Specific Address";
Application Ser. No. 13/727,653 filed on 2012 Dec. 27, entitled "Methods, Systems, and Computer Program Products for Identifying a Protocol address in a Scope-specific Address Space";
Application Ser. No. 13/727,655 filed on 2012 Dec. 27, entitled "Methods, Systems, and Computer Program Products for Determining a Shared identifier for a Hop in a Network";
Application Ser. No. 13/727,657 filed on 2012 Dec. 27, entitled "Methods, Systems, and Computer Program Products for Determining a Hop Identifier for a Network Protocol"; and
Application Ser. No. 13/727,662 filed on 2012 Dec. 27, entitled "Methods, Systems, and Computer Program Products for Routing Based on a Path-Based Protocol Address".

This application is related to the following currently pending U.S. patent applications by the present inventor, the entire disclosures of each being incorporated by reference herein: application Ser. No. 11/962,285, filed on 2007 Dec. 21, entitled "Methods and Systems for Sending Information to a Zone Included in an Internet Network";
Application Ser. No. 12/062,101, filed on 2008 Apr. 3, entitled "Methods and Systems for Routing a Data Packet Based on Geospatial Information";
Application Ser. No. 12/170,833, filed on 2008 Jul. 10, entitled "Methods and Systems for Resolving a Query Region to a Network Identifier";
Application Ser. No. 12/170,833, filed on 2008 Jul. 10, entitled "Methods and Systems for Resolving a Query Region to a Network Identifier";
Application Ser. No. 12/170,829, filed on 2008 Jul. 10, entitled "Methods and Systems for Resolving a Location Information to a Network Identifier";
Application Ser. No. 12/170,821, filed on 2008 Jul. 10, entitled "Methods and Systems for Resolving a Geospatial Query Region to a Network Identifier";
Application Ser. No. 12/272,989, by the present inventor, filed on 2008 Nov. 18, entitled "Methods and Systems for Incrementally Resolving a Host Name to a Protocol address";
Application Ser. No. 12/328,059, filed on 2008 Dec. 4, entitled "Methods, Systems, and Computer Program Products for Determining a Network Identifier of a Node Providing a Type of Service for a Geospatial Region";
Application Ser. No. 12/328,038, filed on 2008 Dec. 4, entitled "Methods, Systems, and Computer Program Products for Associating Resources of a First Geospace with a Second Geospace";
Application Ser. No. 12/328,048, filed on 2008 Dec. 4, entitled "Methods, Systems, and Computer Program Products for Resolving a Network Identifier Based on a Geospatial Domain Space Harmonized with a Non-Geospatial Domain Space"
Application Ser. No. 12/328,063, filed on 2008 Dec. 4, entitled "Methods, Systems, and Computer Program Products for Accessing a Resource Having a Protocol address Associated With a Location on a Map";

Application Ser. No. 12/339,675, filed on 2008 Dec. 19, entitled "Methods, Systems, and Computer Program Products for Maintaining Consistency Between Non-Geospatial and Geospatial Address space directories";

Application Ser. No. 12/401,707, filed on 2009 Mar. 11, entitled "Methods and Systems for Resolving a Source node Identifier in a First Identifier Domain Space to a Second Node Identifier in a Second Identifier Domain Space"; and Application Ser. No. 12/414,007, filed on 2009 Mar. 30, entitled "Methods, Systems, and Computer Program Products for Resolving a First Source Node Identifier to a Second Source Node Identifier".

BACKGROUND

It is unlikely that the designers of the early network that is now referred to as the "Internet" expected it to become as large as it has become. The fact that the global Internet Protocol (IP) address space for 32-bit addresses has been fully allocated is evidence of this. As the Internet grows, new problems will arise and some current problems are getting worse. For example, while network speeds and bandwidth are increases, so are causes of network latency.

The Internet Engineering Task Force (IETF) has taken steps at various times in the past and are presently taking steps to address a number of problems resulting from the Internet's growth. Problems addressed by the IETF are described in a number of "Request for Comments" (RFC) documents published the IETF. Documents referenced herein include: "Request for Comments" (RFC) document RFC 791 edited by J. Postel, titled ""Internet Protocol, DARPA Internet Protocol Specification", published by the IETF in September, 1981;

"Request for Comments" (RFC) document RFC 1519 by V. Fuller, et al, titled "Classless Inter-Domain Routing (CIDR): An Address Assignment and Aggregation Strategy", published by the Internet Engineering Task Force (IETF), in June, 1999;

"Request for Comments" (RFC) document RFC 2410 by S. Deering, et al, titled "Internet Protocol, Version 6, (IPv6) Specification", published by the IETF in December, 1998;

"Request for Comments" (RFC) document RFC 3513 by R. Hinden, et al, titled ""Internet Protocol Version 6 (IPv6) Addressing Architecture", published by the IETF in April, 2003; and "Request for Comments" (RFC) document RFC 2374 by R. Hinden, et al, titled ""Aggregatable Global Unicast Address Format", published by the IETF in July, 1998.

The authors of RFC 1519 in dealing with a number of issues state that their proposal".

RFC 791 states, "The internet protocol implements two basic functions: addressing and fragmentation". RFC 791 goes on to state, "A distinction is made between names, addresses, and routes. A name indicates what we seek. An address indicates where it is. A route indicates how to get there. The internet protocol deals primarily with addresses. It is the task of higher level (i.e., host-to-host or application) protocols to make the mapping from names to addresses. The internet module maps internet addresses to local net addresses. It is the task of lower level (i.e., local net or gateways) procedures to make the mapping from local net addresses to routes".

Further new protocols and platforms for building new protocols, such as OpenFlow of the Open Network Foundation (ONF), have been introduced, and will continue to be introduced. Such protocols and platforms are within the scope of the subject matter of the present disclosure. The OpenFlow protocol is specified in "OpenFlow Switch Specification", by Pfaff, B, et al, and published by the ONF in Feb. 29, 2011.

In order to address a number of current and future problems facing the Internet, the subject matter described herein challenges the distinctions asserted in RFC 791 and establishes new relationships between and among names, addresses, and routes. The description herein further demonstrates that current internet addresses do not indicate where a node or network interface component (NIC) of a node is. They provide another global identifier space for identifying nodes and their network interfaces. This global identifier space to some extent is duplicative of the domain name space, which is also a global identifier space for identifying nodes and network interfaces. This duplication of roles is unnecessary as described below.

Accordingly, there exists a need for methods, systems, and computer program products for associating a name with a network path.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for associating a name with a network path. In one aspect, the method includes receiving a first message, from a first node by a second node via a first network path in a network, identifying a first symbolic identifier of the first node, wherein the first network path includes a first hop included in communicatively coupling the first node and the second node. The method further includes identifying second path information identifying a second hop in a second network path included in communicatively coupling the second node and a third node. The method still further includes sending a second message, identifying the first symbolic identifier and the first hop, to the third node via the second hop to associate the first symbolic identifier with a third network path that includes a node included in at least one of the first hop and the second hop. Performing at least one the preceding actions comprising the method includes execution of an instruction by a processor.

Also, a system for associating a name with a network path is described that includes at least one processor; and logic encoded in at least one data storage media for execution by the at least one processor that when executed is operable for and/or is otherwise included in receiving a first message, from a first node by a second node via a first network path in a network, identifying a first symbolic identifier of the first node, wherein the first network path includes a first hop included in communicatively coupling the first node and the second node; identifying second path information identifying a second hop in a second network path included in communicatively coupling the second node and a third node; and sending a second message, identifying the first symbolic identifier and the first hop, to the third node via the second hop to associate the first symbolic identifier with a third network path that includes a node included in at least one of the first hop and the second hop.

Further, a system for associating a name with a network path is described. The system includes a processor that executes an instruction included in at least one of a resolver component, a topology space component, and a topology relay component during operation of the system. During operation of the system the resolver component is operable for and/or is otherwise included in receiving a first message, from a first node by a second node via a first network path in a network, identifying a first symbolic identifier of the first node, wherein the first network path includes a first hop included in communicatively coupling the first node and the second node; the topology space component is operable for and/or is otherwise included in identifying second path information identifying a second hop in a second network path included in communicatively coupling the second node and a third node; and the topology relay component is operable for and/or is otherwise included in sending a second message, identifying the first symbolic identifier and the first hop, to the third node via the second hop to associate the first symbolic identifier with a third network path that includes a node included in at least one of the first hop and the second hop.

Methods and systems are described for associating a name with a network path. In one aspect, the method includes detecting, by a second node in a network, a first node in first hop included in communicatively coupling the second node and the first node. The method further includes determining a first hop identifier for the first hop. The method still further includes sending, by the second node, the first hop identifier to a topology service to include a representation of the first node in a first location in a topological space, wherein the first location is identified relative to the second node based on the first hop identifier. Performing at least one the preceding actions comprising the method includes execution of an instruction by a processor.

Also, a system for associating a name with a network path is described that includes at least one processor; and logic encoded in at least one data storage media for execution by the at least one processor that when executed is operable for and/or is otherwise included in detecting, by a second node in a network, a first node in first hop included in communicatively coupling the second node and the first node; determining a first hop identifier for the first hop; and sending, by the second node, the first hop identifier to a topology service to include a representation of the first node in a first location in a topological space, wherein the first location is identified relative to the second node based on the first hop identifier.

Further, a system for associating a name with a network path is described. The system includes a processor that executes an instruction included in at least one of a topology monitor component, a topology space component, and a topology communication component during operation of the system. During operation of the system the topology monitor component is operable for and/or is otherwise included in detecting, by a second node in a network, a first node in first hop included in communicatively coupling the second node and the first node; the topology space component is operable for and/or is otherwise included in determining a first hop identifier for the first hop; and the topology communication component is operable for and/or is otherwise included in sending, by the second node, the first hop identifier to a topology service to include a representation of the first node in a first location in a topological space, wherein the first location is identified relative to the second node based on the first hop identifier.

BRIEF DESCRIPTION OF THE DRAWINGS

Objects and advantages of the present invention will become apparent to those skilled in the art upon reading this description in conjunction with the accompanying drawings, and in which.

DETAILED DESCRIPTION

Figure 1:
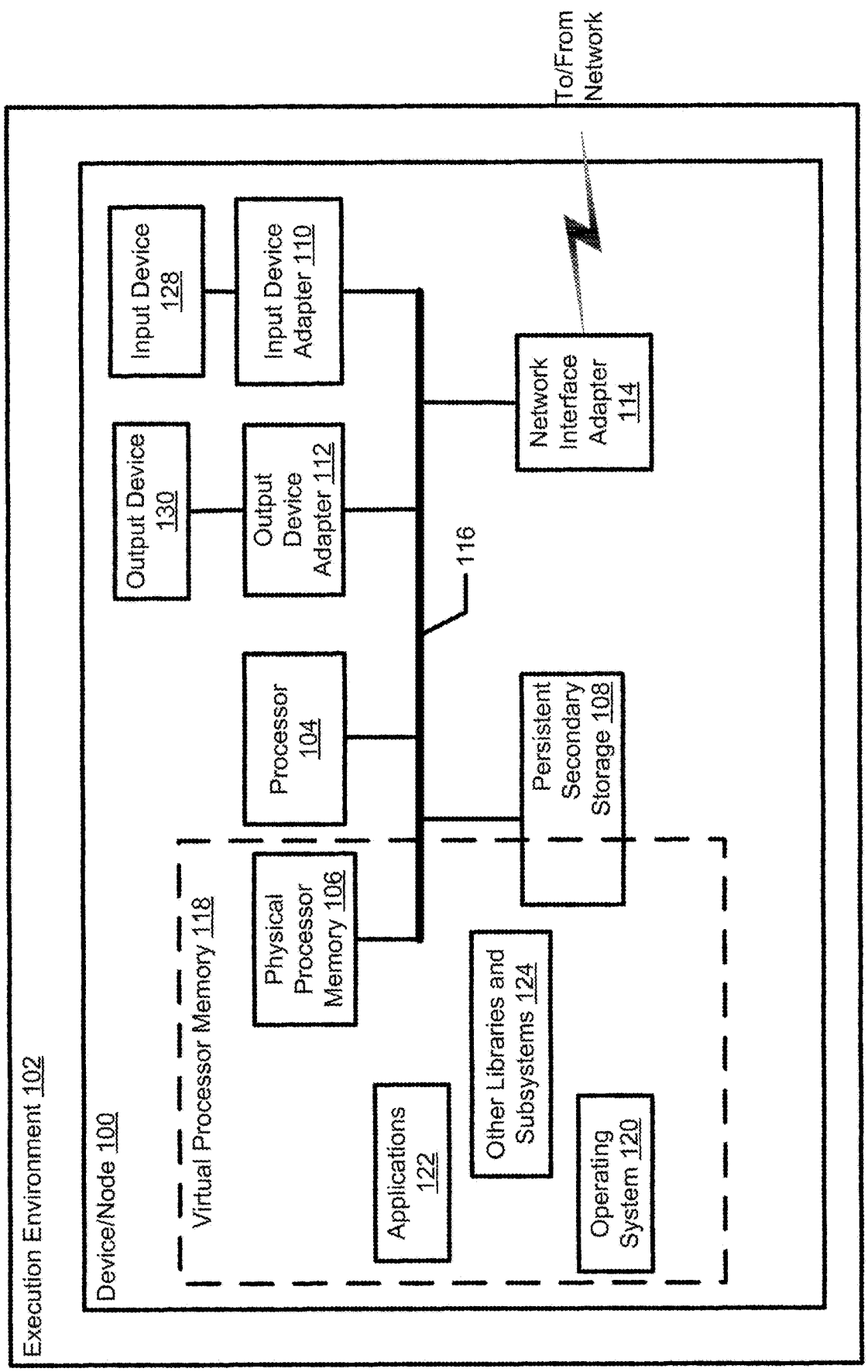
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Definitions

An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes a processor to execute an instruction included in at least one component of such an arrangement. An execution environment includes and/or is otherwise provided by one or more devices. The execution environment is said to be the execution environment "of" the device and/or devices. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications, network, and/or media device that is suitable to perform the subject matter described herein. Those skilled in the art will understand that the components illustrated in FIG. 1 are exemplary and may vary by particular execution environment. An execution environment may be and/or may include a virtual execution environment including software components operating in a host execution environment.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs).

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

A computer program may include one or more software components. As used herein, the term "software component" refers to any data representation that may be and/or may be translated into a set of machine code instructions and may optionally include associated data. Software component representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A software component may include one or more components. As used herein, the terms "application", and "service" may be realized in one or more software components and/or in one or more hardware components.

Software components typically include instructions executed by a processor in a computing context referred to as a "process". A process may include one or more "threads". A "thread" includes a sequence of instructions executed by a processor in a computing sub-context of a process. The terms "thread" and "process" may be used interchangeably herein when a process includes only one thread.

As used herein, the term "network protocol" refers to a set of rules, conventions, and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit ", frame", data packet", and "packet" are used interchangeably herein. One or more data units of a first network protocol may transmit a "message" of a second network protocol. For example, one or more data units of the IP protocol may include a TCP message. In another example, one or more TCP data units may transmit an HTTP message. A message may be empty.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a data unit than a data unit in which the data is forwarded by the node.

A "protocol address", as the term is used herein, for a network protocol is an identifier of a protocol endpoint that may be represented in a data unit of the network protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

The term "hop" as used herein refers to a pair of consecutive nodes in a network path to transmit, via a network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface components. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

The term "network topology" or "topology", for short, as used herein refers to a representation of protocol endpoints and/or nodes in a network, and representations of hops representing communicative couplings between and/or among the protocol endpoints and/or nodes in the network. A network may have different network topologies with respect to different network protocols. A network topology may represent physical communicative couplings between nodes in the network. A network topology may represent logical couplings between protocol endpoints and/or nodes of a particular network protocol or a particular type of network protocol.

The domain name system (DNS) of the Internet operates based on an application layer protocol defined by the DNS. The nodes in the DNS are communicatively coupled via the DNS protocol and may be represented by a logical network topology. A DNS system includes nodes connected via the DNS protocol. The DNS system has a network topology defined by nodes that include protocol endpoints of the DNS protocol. In still another example, a token-ring network has a circular topology at the link layer, but may have a star topology at the physical layer.

As used herein, an "entity-specific address space" refers to an address space defined for a specific entity where the addresses in the address space operate as identifiers in the context of the entity. An address from an entity-specific address space is referred to herein as an "entity-specific address". An address is "entity-specific" in that what it identifies is based on the entity to which it is specific. Another address having the same form and content may identify an entity when in an address space specific to another entity. Addresses in an entity-specific address space operate as identifiers in the context of an entity to which they are "specific" as defined by the specific association of the address space and the entity. Without knowledge of the entity to which an entity-specific address space is specific, what an address in the entity-specific address space identifies is indeterminate. The terms "entity-specific address" and "entity-specific identifier" are used interchangeably herein. An entity-specific address may identify an entity included in the entity to which the address is specific or may identify an entity external to the entity to which the address is specific. The fact that an address is entity-specific does not define a scope for the address.

A portion of a network is a type of entity. A type of entity-specific address space described herein is a scope-specific address space. As used herein, a "scope-specific address space", specific to a particular region of a network, is an address space defined for the particular network region, where an address in the scope-specific protocol address operates as identifier, according to a network protocol, of a protocol endpoint in a node outside of the particular region when processed in the context of a node in the particular region. The region is indicated by the span of an indicated scope. The terms "region" and "zone" are used interchangeably herein. An address from a scope-specific address space is referred to herein as a "scope-specific protocol address". An address is "scope-specific" in that what protocol endpoint it identifies depends on the region to which it is specific. Another address having the exact same form and content may identify a protocol endpoint when in an address space that is specific to another region. A protocol address in a scope-specific address space serves as an identifier in the context of a node in a region to which the scope-specific address space is "specific" as defined by an association of the address space and the region indicated by the scope. Without knowledge of the particular region to which a scope-specific address space is specific, what a scope-specific protocol address in the scope-specific address space identifies is indeterminate. The terms "scope-specific protocol address" and "scope-specific protocol identifier" are used interchangeably herein. Types of scope-specific address spaces indicating exemplary spans include site-specific, LAN-specific, subnet-specific, city-specific, business-specific, and node-specific.

For a network protocol, an address in a scope-specific address space serves as an identifier of a protocol endpoint in a node. Data may be received via the protocol endpoint from a network via one or more network interfaces that operatively couple the node to the network. Data may be sent via the protocol endpoint to transmit over the network via the one or more network interfaces in the node. Since a protocol endpoint of a network protocol is included in a node and is accessible via a network via a network interface, a protocol address identifying the protocol endpoint also identifies the node and identifies a network interface of the node.

As used herein, a "node-specific address space" is a scope-specific address space defined for a specific node in a network, where the addresses in the node-specific address space operate as identifiers of nodes and/or network interfaces in the network when processed in the context of the specific node. An address from a node-specific address space is referred to herein as a "node-specific address". An address is "node-specific" in that what it identifies depends on the node to which is defined as specific. Another address having the exact same form and content may identify a node when in an address space specific to another node. Addresses in a node-specific address space operate as identifiers in the context of a node to which they are "specific" as defined by the specific association of the address space and the node. Without knowledge of the node to which a node-specific address space is specific, addresses in the node-specific address space are indeterminate. The terms "node-specific address" and "node-specific identifier" are used interchangeably herein. A node-specific address space is a type of scope-specific address space.

The term "node" is defined above. Note that an identifier of a network interface in a network also identifies a node that includes the network interface. Thus, a network interface-specific address is also a node-specific address. Network interfaces in a node may have their own respective network interface-specific address spaces that are also node-specific. The network interface-specific address spaces may be combined to form a node-specific address space and/or may be managed as separate address spaces. The adjectives "node-specific" and "network interface-specific" may be used interchangeably.

A scope-specific identifier differs from a scoped address as described in "Request for Comments" (RFC) document RFC 4007 by S. Deering, et al, titled "IPv6 Scoped Address Architecture", published by the IETF in December, 2006 and further described in application Ser. No. 11/962,285, by the present inventor, filed on 2007 Dec. 21, entitled "Methods and Systems for Sending Information to a zone Included in an Internet Network". A scoped address space is shared by nodes in a given scope. While a link-local scoped address is specific to a particular node, a link-local scoped address simply identifies a network interface component local to the particular node. A loop-back internet address is specific to a node as well. Neither link-local scoped addresses nor loop-back addresses identify one node to another. As such, neither serves as a node-specific identifier as defined above.

A "scoped address" is described by RFC 3513 and RFC 4007 as an identifier that, in a particular region of a network, serves as a protocol address of a network interface and/or a node in the particular region. The extent of the particular region is referred to as the scope of the region and thus the scope within which the identifier serves as a protocol address. A particular region included within a scope is indicated by its span. A scoped address is a valid protocol address only within a particular region as indicated by the address's indicated scope. Examples of scope indicators include node-scope where identifiers are valid only to a single node in the indicated span, LAN-scope where identifiers are valid for nodes in the span of a particular LAN, and subnet-scope where identifiers are valid only for nodes in a particular subnet. RFC 3513 currently defines support for link-local scope, site-local scope, and global scope. A data unit transmitted with a scoped address should not be delivered to node that does not have a network interface in the span indicated by the scope.

"Path information" is any information that identifies a network path and/or a hop path for data transmitted via one a specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

The term "path-based address" is defined above. A "node-based address" is a path-based address where some or all of the address includes node identifiers that identify a sequence of nodes in a network path. A "network-interface-based address" is a path-based address where some or all of the address includes identifiers of network interfaces in a sequence in a network path. A "NIC-based address" is a type of network-interface-based address that identifies a sequence of network interface components. A "hop-based address" is a path-based address where some or all of the address identifies one or more hops in a network path. The protocol address types defined are not mutually exclusive.

The term "metric space", as used herein, refers to a set, as defined in mathematics, where a distance between elements of the set is defined according to a metric. Metric spaces defined in Euclidean geometry are well-known examples. Those skilled in the art of metric spaces, such as Euclidian spaces, will appreciate that a one-to-one mapping may be determined and/or otherwise identified for mapping addresses from a first coordinate space having a first origin for a metric space to addresses from a second coordinate space having a second origin in the metric space. Given a mapping rule between a first scope-specific address space and a second scope-specific address space and a mapping between the second scope-specific address space and a third scope-specific address space based on a third coordinate space identifying a third origin in the metric space, a mapping from the first coordinate space to the third coordinate space may be determined. A mapping between coordinate spaces for a metric space may be included a coordinate shift and/or a rotation, for example. The mapping may be pre-specified and accessible to the nodes in one or both address spaces. Mapping between locations in a number of different metric spaces is well known in mathematics. For example, a top half of the surface of sphere may be mapped to a plane. Some will further appreciate that some metric spaces may be mapped to other metric spaces. Some of these mappings are one-to-one and/or onto.

Execution Environment:

An exemplary device included in an execution environment that may be programmed, adapted, modified, and/or otherwise configured according to the subject matter is illustrated in FIG. 1. FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter to present information to a user; a network interface component, illustrated by a network interface adapter 114, to communicate via a network such as a LAN and/or WAN; and a mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

Processor 104 may access instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of an instruction and/or may be identified by a register and/or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. Both physical processor memory 106 and virtual processor memory 118 are processor memory, as defined above.

Physical processor memory 106 may include various types of memory technologies. Exemplary memory technologies include static random access memory (SRAM), Burst SRAM or Synch Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDRTM DRAM. Physical processor memory 106 may include volatile memory as illustrated in the previous sentence and/or may include non-volatile memory such as non-volatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, software components, and other data.

Execution environment 102 may include software components stored in persistent secondary storage 108, in remote storage accessible via a network, and/or in a processor memory. FIG. 1 illustrates execution environment 102 including an operating system 120, one or more applications 122, and other software components and/or data components illustrated by other libraries and subsystems 124. In an aspect, some or all software components may be stored in locations accessible to processor 104 in a shared memory address space shared by the software components. The software components accessed via the shared memory address space may be stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding network interfaces such as a serial port, a parallel port, and/or a universal serial bus (USB) port. Input device adapter 110 may receive input and provide a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component. Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

Figure 2:
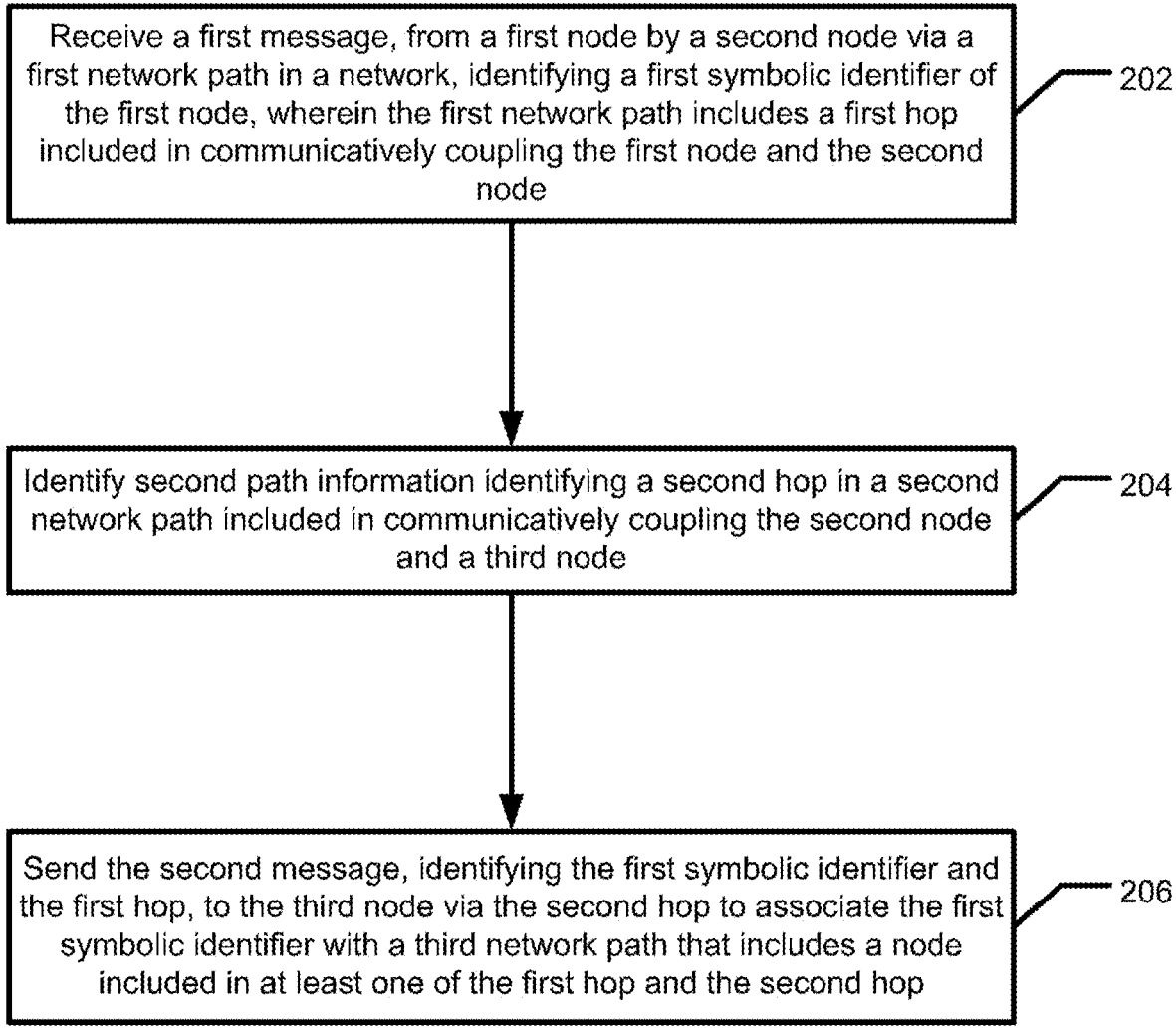
FIG. 2 is a flow diagram illustrating a method for associating a name with a network path according to an aspect of the subject matter described herein.
Figure 3:
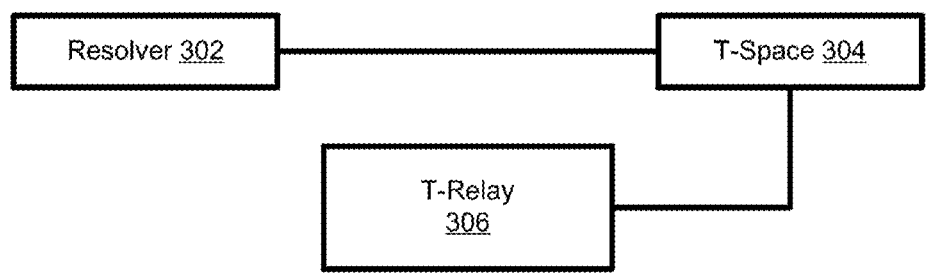
FIG. 3 is a block diagram illustrating an arrangement of components for associating a name with a network path according to another aspect of the subject matter described herein.

FIG. 3 illustrates an arrangement of components in a system that operates in an execution environment, such as execution environment 102 in FIG. 1. The arrangement of components in the system operates to perform the method illustrated in FIG. 2. The system illustrated includes a resolver component 302, a topology space component 304, and a topology relay component 306. A suitable execution environment includes a processor, such as processor 104, to process an instruction in at least one of a resolver component, a topology space component, and a topology relay component.

Some components, illustrated in the drawings are identified by numbers with an alphanumeric suffix. A component may be referred to generically in the singular or the plural by dropping a suffix of a portion thereof of the component's identifier. For example, execution environments; such as execution environment 401a, execution environment 401b, and their adaptations and analogs; are referred to herein generically as an execution environment 401 or execution environments 401 when describing more than one. Other components identified with an alphanumeric suffix may be referred to generically or as a group in a similar manner.

Figure 4A:
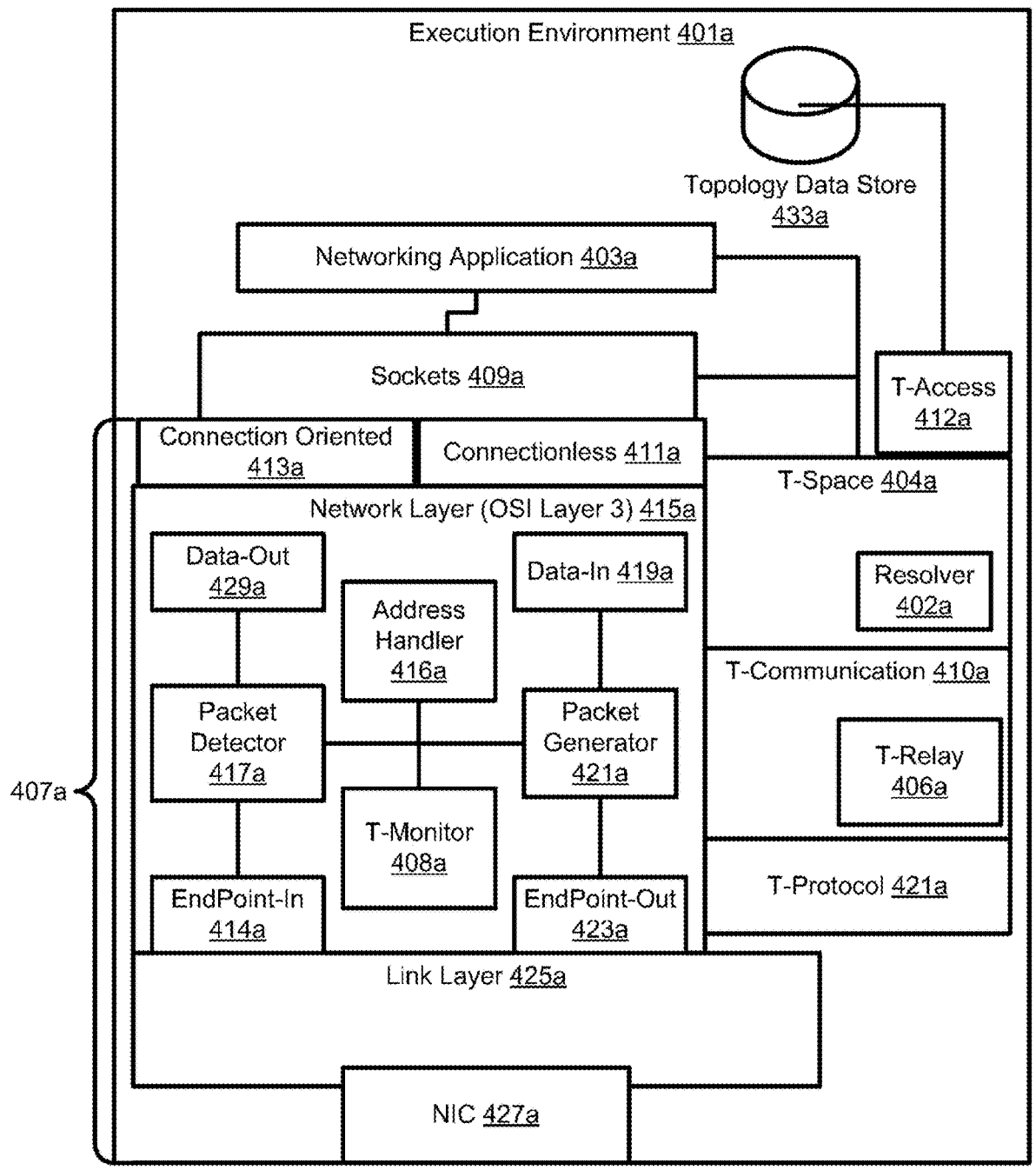
FIG. 4A is a block diagram illustrating an arrangement of components for associating a name with a network path according to another aspect of the subject matter described herein.
Figure 4B:
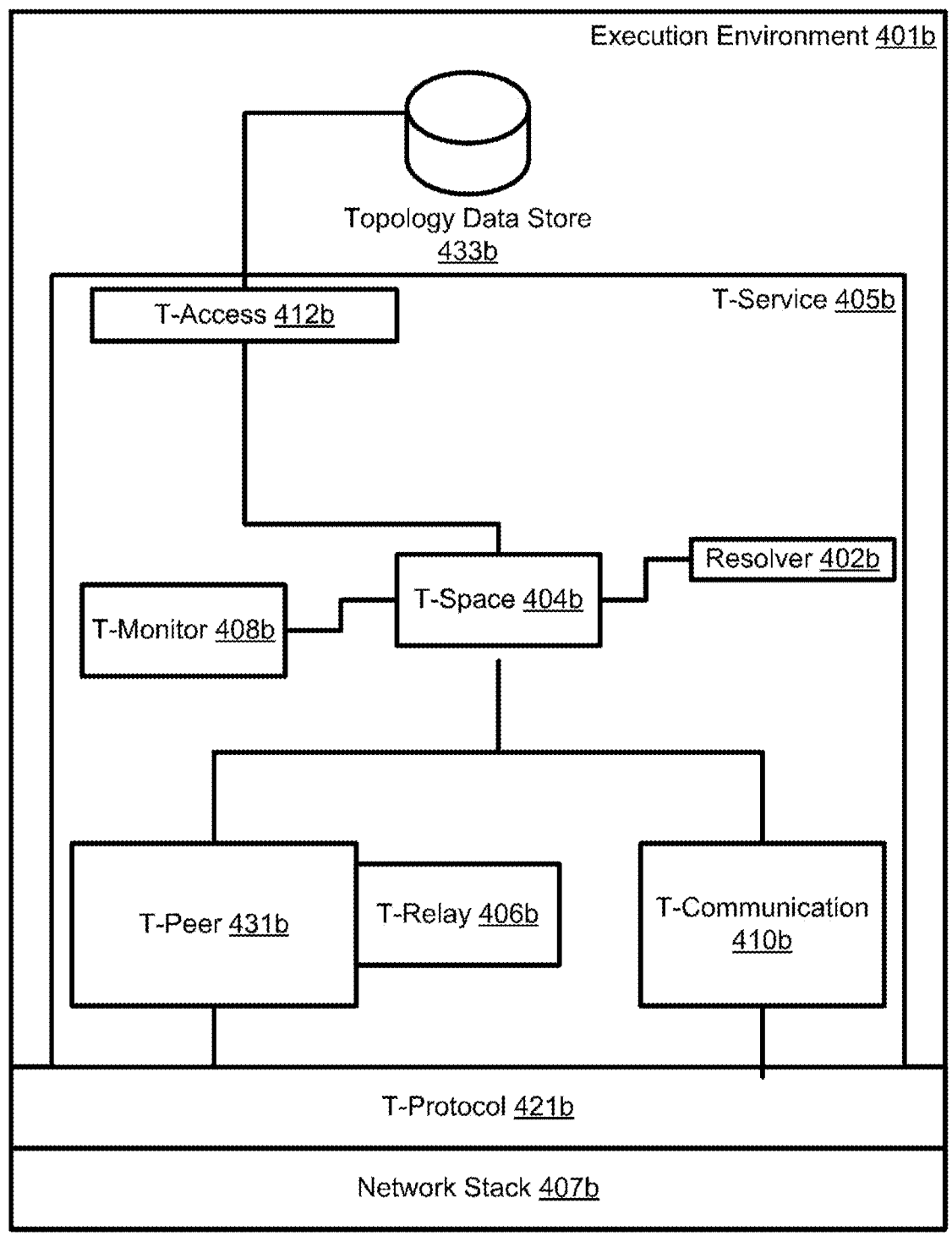
FIG. 4B is a block diagram illustrating an arrangement of components for associating a name with a network path according to another aspect of the subject matter described herein.

Some or all of the exemplary components illustrated in FIG. 3 may perform the method illustrated in FIG. 2 in a number of execution environments. FIGS. 4A-B are block diagrams illustrating the components of FIG. 3 and/or analogs of the components of FIG. 3 respectively adapted for operation in an execution environment 401 that includes and/or otherwise is provided by one or more nodes.

FIG. 1 illustrates components of an exemplary device that may at least partially provide and/or otherwise be included in an execution environment. The components illustrated in FIG. 4A-B may be included in or otherwise combined with one or more of the components of FIG. 1 to create a variety of arrangements of components according to the subject matter described herein. Those skilled in the art will understand that other execution environments in addition to the various adaptations, analogs, and instances of the execution environments described herein are suitable for hosting an adaptation of the arrangement in FIG. 3.

Figure 5A:
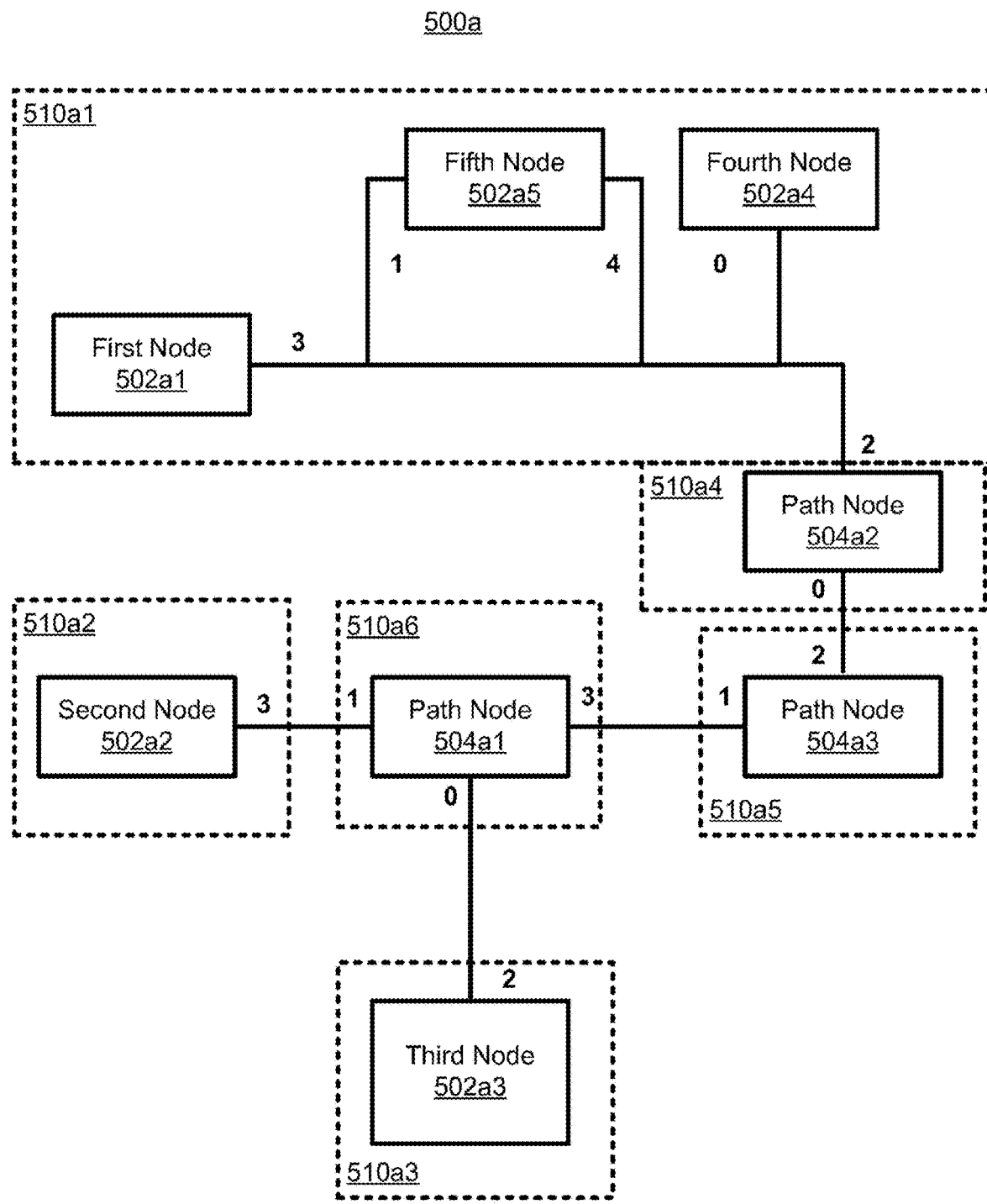
FIG. 5A is a network diagram illustrating an exemplary system for associating a name with a network path according to another aspect of the subject matter described herein.
Figure 5B:
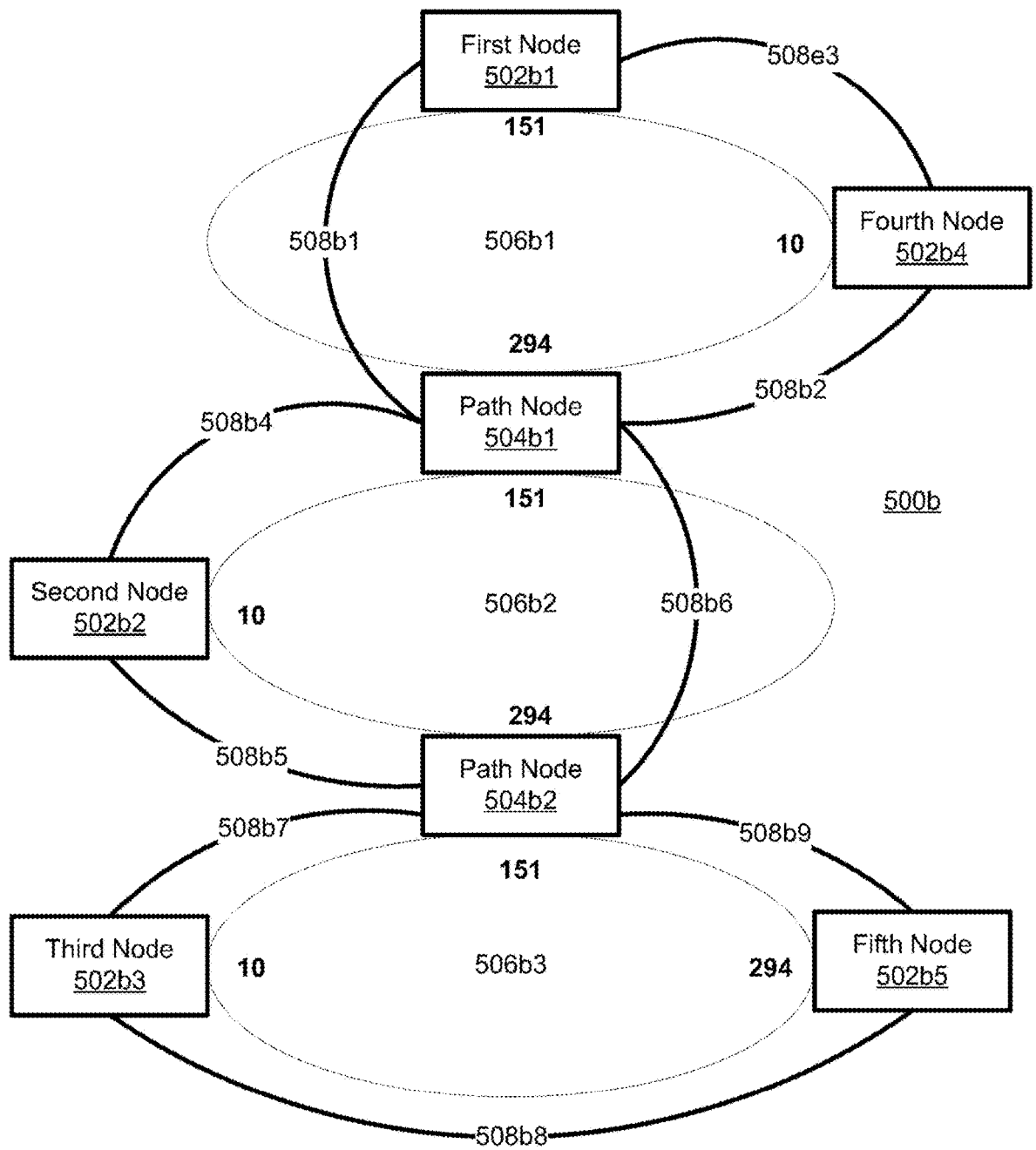
FIG. 5B is a network diagram illustrating an exemplary system for associating a name with a network path according to another aspect of the subject matter described herein.
Figure 5C:
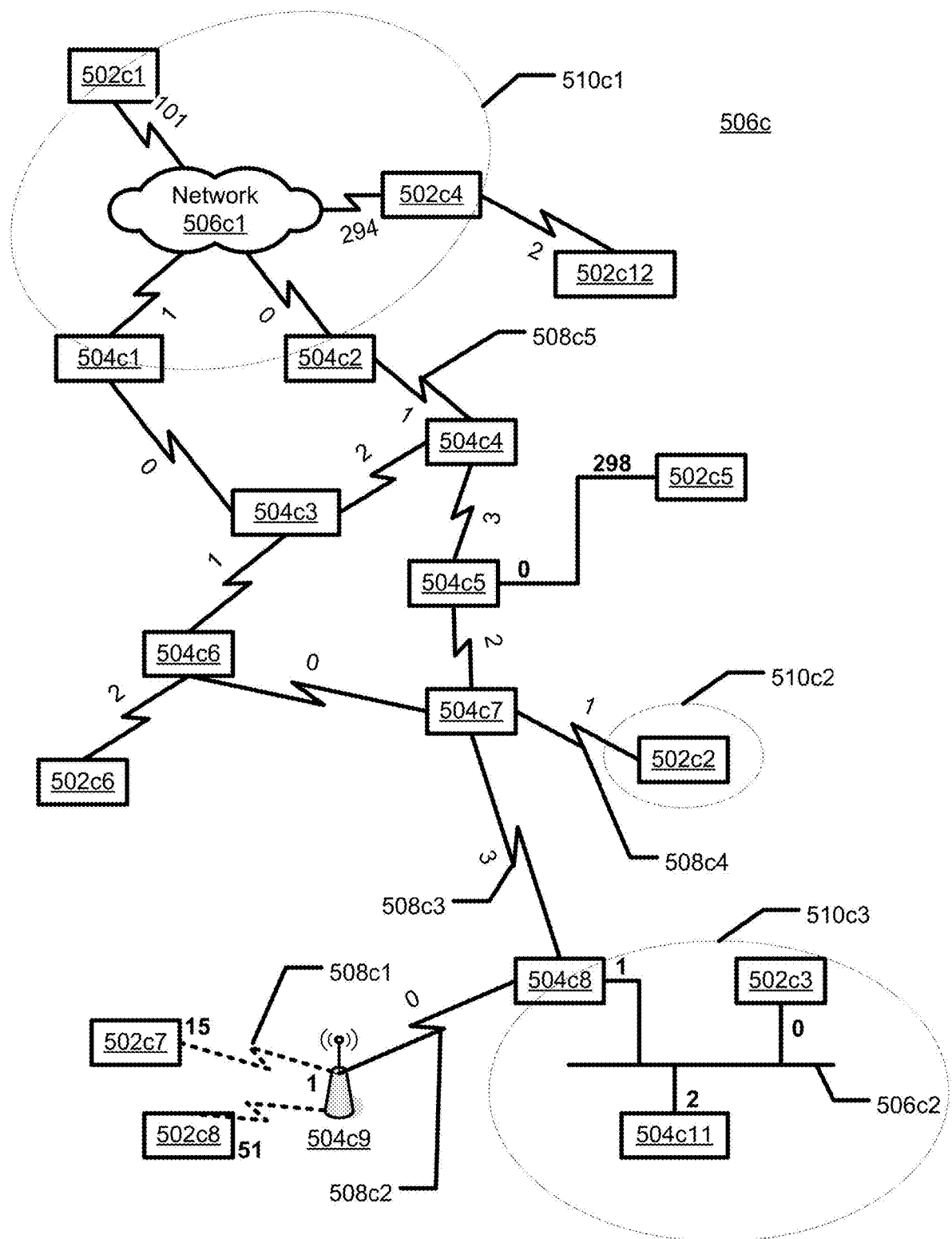
FIG. 5C is a network diagram illustrating an exemplary system for associating a name with a network path according to another aspect of the subject matter described herein.

FIGS. 5A-C respectively illustrate networks 500 including nodes that in various aspects may include adaptations, analogs, and instances of any of the execution environments 401, illustrated in FIG. 4A-B. The various illustrated nodes are operatively coupled via network interface components to the respective networks 500 in FIGS. 5A-C. While any node may perform the method illustrated in FIG. 2, for ease of illustration, each of FIGS. 5A-C includes nodes 502 for describing adaptations of the arrangement in FIG. 3 performing different aspects of the method illustrated in FIG. 2. An adaptation, analog, and/or instance of execution environment 401a, in FIG. 4A, may be described as being included in and/or operating in a node 502 in describing some aspects of the method illustrated in FIG. 2. In describing other aspects, a node 502 may be described as including and/or otherwise providing an adaptation, analog, and/or instance of execution environment 401b in FIG. 4B. Other nodes, such as path nodes 504, in FIGS. 5A-C are described in terms of one or more roles they may play in interoperating with one or more nodes 502. Exemplary path nodes 504 include a router, a gateway, a switch, a virtual private network concentrator, a modem, a wireless access point, a bridge, a hub, a repeater, a firewall, a proxy server, an application for relaying messages, and the like.

FIG. 4A illustrates an execution environment 401a hosting a program, illustrated by a networking application 403a that sends and/or receives data via a network stack 407a. FIG. 4B illustrates an execution environment 401b including a topology service (t-service) 405b, that sends and receives data by interoperating directly and/or indirectly with one or more components of a network stack 407b. The network stacks 407 in FIGS. 4A-B may be structured according to a layered architecture or model. FIG. 4A illustrates components that may be included in a network stack having a layered structure. The network stack 407b may be structured analogously or may be structured in another manner known to those skilled in the art. Some components illustrated in the network stack 407a correspond to components of the layered architecture specified by the Open System Interconnection (OSI) model, known to those skilled in the art. For example, network stacks 407 may comply with the specifications for protocols included in the TCP/IP protocol suite. The OSI model specifies a seven-layer stack. The TCP/IP protocol suite may be mapped to layers three and four of the seven layers. Those skilled in the art will understand that fewer or more layers may be included in various adaptations, analogs, and/or instances of execution environments 401 illustrated in FIG. 4A and in FIG. 4B, and in aspects described herein as well as other execution environments suitable for hosting an adaptation of the arrangement of components illustrated in FIG. 3.

An application, such as a networking application 403a and/or a t-service 405b, operating in a node 502, may exchange data via a network with another node 502 by interoperating with one or more components of a corresponding network stack 407. In FIG. 4A, a networking application 403a in an execution environment 401a of a node 502 may interoperate with a sockets component 409a to access a protocol endpoint, via a socket, to send data via one or more data units to send and/or to receive data via a one or more data units from another node 502. The application may specify an attribute of a network protocol to the sockets component 409a to open a specified type of protocol endpoint of the network protocol supporting the specified attribute.

FIG. 4A illustrates a sockets component 409a operatively coupled to a connectionless component 411a supporting an unreliable transport layer protocol where delivery of data is not guaranteed and a connection-oriented component 413a configured to support a reliable transport layer protocol designed to guarantee data delivery or to otherwise notify the application of a delivery failure. The user datagram protocol (UDP) in the TCP/IP protocol suite is currently the most widely used connectionless transport layer protocol. The most widely used connection-oriented transport layer protocol currently in use is the transmission control protocol (the TCP) also included in the TCP/IP protocol suite.

Transport layer protocols supported by connectionless component 411a and by connection-oriented component 413a generate transport layer data units to include data received from an operatively coupled application and/or a higher layer protocol component to deliver the data via the data units according to a network layer protocol to a transport layer protocol endpoint, accessed via a socket, in another node 502. Analogously, data sent via an application in another node via a transport layer component may be received according to the network layer protocol by a compatible transport layer component, such as a connection-oriented component 413a and/or by a connectionless component 411a, to deliver to another protocol layer and/or to an application operating in the execution environment 401a in the receiving other node 502.

FIG. 4A illustrates a network layer component 415a that delivers data according to a network layer protocol from a source node to a destination node across a link, a LAN, a WAN, and/or an internet, such as the Internet and/or an intranet. A network layer may include a component representing an endpoint of a network protocol of the network layer. In FIG. 4A, the network layer component include an endpoint-in component 414a to receiving data according to the network protocol from a data-out component (not shown) of a linker layer component 425a. Data in one or more data units of the network protocol may be provided to a protocol endpoint in an application or higher layer protocol component. An endpoint-in component 414a may provide a data unit to packet detector component 417a to extract data to deliver to via a data-out component 429a to a protocol endpoint of a higher layer protocol and/or application. A protocol layer component may receive data from an endpoint-out component (not shown) of a higher layer protocol component and/or application via a data-in component 419a. The data-in component 419a may interoperate with a packet generator component 421a to generate a data unit of a network layer protocol which may be transmitted via an endpoint-out component 423a.

A network layer protocol is designed and configured to deliver data across one or more communication links and/or networks between nodes in a network or internet. In FIG. 4A, a network layer component 415a may receive a transport layer data unit from a connection-oriented component 413a or a connectionless component 411a, or data from another component in execution environment 401a. The network layer component 415a may format and/or otherwise package the data in network layer data units of the supported network layer protocol. The data units may be sent, via a linker layer protocol, to a next node in a network path to a destination node.

One or more link layer protocols may be included in communicatively coupling a source node 502 and a destination node 502 via a network path that includes one or more path nodes 504 as illustrated in FIGS. 5A-C. In FIG. 4A, a network layer component 415a may provide a network layer data unit as data (i.e. a message) to a component supporting a link layer protocol compatible with exchanging data via a physical data transmission medium coupled to a NIC. A link layer component 425a, in FIG. 4A, illustrates a component in execution environment 401a supporting a link layer protocol. Exemplary link layer protocols include Ethernet, Token-ring, and asynchronous transfer mode (ATM), to name a few. Some or all of a link layer component 425a may be included in a NIC, as illustrated in FIG. 4A by a NIC 427a. A portion of a link layer component may be external to an operatively coupled NIC. The external portion may be realized, at least in part, as a device driver for the NIC. Exemplary physical data transmission media include Ethernet cables of various types, co-axial cable, and fiber optic cable, and various media suitable for carrying various types of wireless signals.

For ease of illustration, the description that follows focuses on IP networks and protocols in the TCP/IP suite due to their wide use and because they are well-known in the art. Those skilled in the art will understand that the scope of the subject matter described is not limited to IP networks nor is it limited to network layer protocols. For example, the subject matter of this disclosure is applicable to the exchanging data via one or more link layer protocols via one or more physical links.

With respect to FIG. 4A, a link layer component 425a may receive a network layer data unit for a network layer component 415a. The network layer data unit may be formatted as one or more IP protocol packets from the network layer component 415a supporting the Internet Protocol (IP). The link layer component 425a packages IP packets from network layer component 415a according to the particular link layer protocol supported. The link layer component 425a may include a network layer data unit in one or more link layer data units. Analogously, the link layer component 425a interprets data, received as signals transmitted by the physical medium operatively coupled to the NIC 427a, according to a particular link layer protocol supported to receive network layer data units in one or more link layer data units. The link layer component 425a may strip off link layer specific data and transfer the payload of the link layer data units to the network layer component 415a to process the included network layer data unit.

A network layer component 415a operating in a node 502 may communicate with one or more nodes 502 over a LAN, a link, and/or a network of networks such as an intranet or the Internet. A network layer component 415a in the node 502 may receive transport layer data units, for example, formatted as TCP packets from a connection-oriented layer component 413a and/or transport layer data units formatted as UDP packets from a connectionless component 411a illustrated in FIG. 4A. The network layer component 415a packages transport layer data units from the connection-oriented component 413a and/or the transport layer data units from the connectionless component 411a into network layer data units, such as IP packets, to transmit across a network 500, such as illustrated in FIGS. 5A-C.

Analogously, the network layer component 415a may interpret data, received from a link layer component 425a in the node 502b, as IP protocol data and may detect IP packets in the received data. The network layer component 415a may strip off IP layer specific data and transfer the payload of one or more IP packets to the connection-oriented layer component 413a and/or to the connectionless component 411a to process as transport layer data units according to a particular transport layer protocol.

As described above, FIGS. 4A-B each illustrate adaptations of network stacks 407 that send and receive data over a network, such as networks 500 illustrated in FIGS. 5A-C, via a network interface component, such as a NIC 427a. For example, a networking application 403a in FIG. 4A operating in a first node 502 may interoperate with a t-service 405b and/or another application operating in a second node 502 via their respective network stacks: the network stack 407a and the network stack 407b.

In addition to the protocols described above, protocols corresponding to layers in the OSI model above the transport layer may be included in communicating via a network. The term "application protocol" as used herein refers to any protocol or combination of protocols that correspond to one or more layers in the OSI reference model above the transport layer. Programs and executables operating in execution environments 401 may communicate via one or more application protocols. Exemplary application protocols include a hypertext transfer protocol (HTTP), various remote procedure call (RPC) protocols, various instant messaging protocol, email protocols, and various presence protocols.

Data exchanged between nodes 502 in a network 500 may be exchanged via data units of one or more protocols. Each layer of a network stack may provide a layer specific protocol component. Some protocols, combine services from multiple layers of the OSI model into a single layer such as the SYSTEMS NETWORK ARCHITECTURE (SNA) protocol. Still others may take a hybrid approach. With the advent of software defined networking and flexible protocols such as OPENFLOW, new protocols and variations of existing protocols are being introduced and will be introduced that are within the scope of the subject matter of the present disclosure.

A network protocol is defined by one or more formatting rules and/or a vocabulary referred to as a schema. The schema defines valid data units to exchange between and/or among protocol endpoints defined by the respective network protocol. A network protocol also specifies and/or otherwise is compatible with one or more address spaces for identifying protocol endpoints for exchanging data. The terms "identifier space" and "address space" are used interchangeably herein. For example, various versions of hypertext transfer protocol (HTTP) specify a format for HTTP uniform resource locators (URL). HTTP specifies a location in an HTTP header that identifies a URL as an identifier or address from the HTTP address space that identifies both a resource and recipient of an HTTP data unit. The transmission control protocol (TCP) specifies a format and vocabulary for a TCP header including a destination protocol endpoint field for including what the TCP refers to as a destination port number that, when combined with a destination protocol address from an IP packet, identifies a transport layer protocol endpoint of a receiver of data included in a TCP data unit. A sending endpoint is similarly identified by a source port number included in a source protocol endpoint field of a TCP data unit and a source protocol address from an IP data unit.

Other exemplary address spaces that identify protocol endpoints in various protocols include an email address space identifying a protocol endpoint for the simple mail transfer protocol (SMTP), a telephone number address space for various telephony protocols, instant message address spaces for various instant message protocols, and media access control (MAC) addresses for various link layer protocols, to name just a few examples.

Since addresses from address spaces at various layers of a network stack are often not suited for remembering and/or identifying by users, an address space of symbolic identifiers or names may be used to provide aliases for addresses in an address space identifying protocol endpoints corresponding to a protocol supported by a layer of a network stack. The domain name space is a well-known identifier space of names for identifying nodes and/or network interfaces as protocol endpoints of the IP protocol in the Internet, private internets, and intranets. The domain name system (DNS) is a collection of domain name system services maintaining databases that associate names from the domain name space with protocol addresses, in particular with IP addresses. The domain name space defines a global name space shared across the Internet.

FIG. 4B illustrates an execution environment 401*b* hosting a t-service 405*b*, such as a DNS service. An adaptation of the arrangement of components in FIG. 3 is illustrated operating in the t-service 405*b*. The t-service 405*b* is configured to receive a request from a topology communication (t-communication) component 410*a* in FIG. 4A to resolve a symbolic identifier to a protocol address of a protocol endpoint. A networking application 403*a* or other component in an execution environment 401*a* may communicate with a t-service 405*b* via an application specific topology protocol supported by a t-communication component 410*a* illustrated in FIG. 4A and a topology service protocol (t-protocol) component 421*b* in each of FIGS. 4A-B. A t-service 405*b* may communicate with other t-services in other nodes included in a topology service system via a topology peer (t-peer) component 431*b*. Exemplary topology protocols include the DNS protocol, the lightweight directory access protocol (LDAP), and the X.500 protocol.

FIG. 5B illustrates a network path, as defined above, for transmitting data via a network protocol from a first node 502*b*1 to a fifth node 502*b*5 in a network 500*b* that includes a sequence of nodes including of the first node 502*b*1, a first path node 504*b*1, a second path node 504*b*2, and the fifth node 502*b*5. In FIG. 5C, a first network path communicatively coupling a seventh node 502*c*7 and an eighth path node 504*c*8 includes a first sequence of nodes including the seventh node 502*c*7, a ninth path node 504*c*9, and the eighth path node 504*c*8. The first network path, as FIG. 5C illustrates, is included in a second network path communicatively coupling the seventh node 502*c*7 and a second node 502*c*2 that includes a second sequence of nodes including the nodes in the first sequence, a seventh path node 504*c*7, and the second node 502*c*2. A network path may be a physical network path and/or a logical network path based on a particular network protocol defining the protocol endpoints.

FIG. 5B, illustrates a number of network paths and hop paths communicatively coupling a first node 502*b*1 and a fifth node 502*b*5 in a network 500*b*. One hop path illustrated includes a sequence of hops including a first hop 508*b*1, a sixth hop 508*b*6, and a ninth hop 508*b*9. In FIG. 5C, the first network path described above communicatively coupling the seventh node 502*c*7 and the eighth path node 504*e*8 includes a first sequence of hops including a first hop 508*c*1 and a second hop 508*c*2. The first network path is included in the second network path described above that includes a second sequence of hops including the first sequence of hops, a third hop 508*c*3, and a fourth hop 508*c*4.

In FIG. 5B, the network path described above communicatively coupling the first node 502*b*1 and the fifth node 502*b*5 includes a sequence of network interfaces including a network interface in the first path node 504*b*1 in the first hop 508*b*1, a network interface in the second path node 504*b*2 in the sixth hop 508*b*6, and a network interface in the fifth node 502*b*5 in the ninth hop 508*b*9. The network paths, in FIG. 5C and described above, may analogously be described as a sequence of network interfaces.

Operational Details and Aspects

With reference to FIG. 2, a block 202 illustrates that the method includes receiving a first message, from a first node by a second node via a first network path in a network, identifying a first symbolic identifier of the first node, wherein the first network path includes a first hop included in communicatively coupling the first node and the second node. Accordingly, a system for associating a name with a network path includes means for receiving a first message, from a first node by a second node via a first network path in a network, identifying a first symbolic identifier of the first node, wherein the first network path includes a first hop included in communicatively coupling the first node and the second node. For example, the arrangement in FIG. 3, includes resolver component 302 that is operable for and/or is otherwise included in receiving a first message, from a first node by a second node via a first network path in a network, identifying a first symbolic identifier of the first node, wherein the first network path includes a first hop included in communicatively coupling the first node and the second node. The system for associating a name with a network path includes one or more processors and logic encoded in one or more computer readable media for execution by the one or more processors that when executed is operable for and/or is otherwise included in receiving a first message, from a first node by a second node via a first network path in a network, identifying a first symbolic identifier of the first node, wherein the first network path includes a first hop included in communicatively coupling the first node and the second node.

FIG. 4A-B illustrate resolver components 402 as adaptations and/or analogs of the resolver component 302 in FIG. 3. One or more resolver components 402 operate in an execution environment 401. In FIG. 4A, a resolver component 402*a* is illustrated as a component of a topology space (t-space) component 404*a*. In FIG. 4B, a resolver component 402*b* may be included in a t-service 405*b*. A node 502 may include a resolver component 402*a* and/or a resolver component 402*b* A path node 504 may also include an adaptation and/or an analog of a resolver component.

With reference to FIG. 2, a block 204 illustrates that the method includes identifying second path information identifying a second hop in a second network path included in communicatively coupling the second node and a third node. Accordingly, a system for associating a name with a network path includes means for identifying second path information identifying a second hop in a second network path included in communicatively coupling the second node and a third node. The system for associating a name with a network path includes one or more processors and logic encoded in one or more computer readable media for execution by the one or more processors that when executed is operable for and/or is otherwise included in identifying second path information identifying a second hop in a second network path included in communicatively coupling the second node and a third node.

For example, the arrangement in FIG. 3 includes topology space component 304 that is operable for and/or is otherwise included in identifying second path information identifying a second hop in a second network path included in communicatively coupling the second node and a third node. FIGS. 4A-B illustrate topology space components 404 as adaptations and/or analogs of the topology space component 304 in FIG. 3. One or more topology space components 404 operate in an execution environment 401. In FIG. 4A, a topology space component 404a is illustrated as component of a network layer component 415a. In FIG. 4B, a topology space component 404b is illustrated as component of a t-service component 405b. A node 502 may include a topology space component 404a and/or a topology space component 404b. A path node 504 may also include an adaptation and/or an analog of a topology space component.

In FIG. 2, a block 206 illustrates that the method includes sending a second message, identifying the first symbolic identifier and the first hop, to the third node via the second hop to associate the first symbolic identifier with a third network path that includes a node included in at least one of the first hop and the second hop. Accordingly, a system for associating a name with a network path includes means for sending a second message, identifying the first symbolic identifier and the first hop, to the third node via the second hop to associate the first symbolic identifier with a third network path that includes a node included in at least one of the first hop and the second hop. The system for associating a name with a network path includes one or more processors and logic encoded in one or more computer readable media for execution by the one or more processors that when executed is operable for and/or is otherwise included in sending a second message, identifying the first symbolic identifier and the first hop, to the third node via the second hop to associate the first symbolic identifier with a third network path that includes a node included in at least one of the first hop and the second hop.

For example, the arrangement in FIG. 3, includes topology relay component 306 that is operable for and/or is otherwise included in sending a second message, identifying the first symbolic identifier and the first hop, to the third node via the second hop to associate the first symbolic identifier with a third network path that includes a node included in at least one of the first hop and the second hop. FIGS. 4A-B illustrate topology relay components 406 as adaptations and/or analogs of the topology relay component 306 in FIG. 3. One or more topology relay component 406 operate in an execution environment 401. In FIG. 4A, a topology relay component 406a is illustrated as component of a t-communication component 410a. In FIG. 4B, a topology relay component 406b is illustrated as component of a t-service component 405b. For example, a node 502 may include a topology relay component 406a and/or a topology relay component 406b. A path node 504 may also include an adaptation and/or an analog of a topology relay component.

Address information and path information may be detected in various ways as described herein. With respect to FIG. 5A and FIG. 4A, an instance of an execution environment 401a may be included and/or otherwise may be provided by a first node 502a1 in a first region 510a1 including a portion of a network 500a. An address handler component 416a in the first node 502a1 may receive and/or otherwise detect address information from a networking application 403a and/or one or more of a sockets component 409a, a connection-oriented component 413a, a connectionless component 411a, and a t-communication component 410a. The address handler component 416a may receive the address information via a data-in component 419a that provides an interface for network layer component 415a to receive data to transmit via a network. The address information may include and/or otherwise identify a protocol address. The protocol address may be formatted as required by the network protocol supported by the network layer component 415a. Schemas for various types of protocol addresses, such as those included scope-specific address spaces and/or path-based address spaces, are illustrated in FIGS. 6A-E described below. Alternatively or additionally, the protocol address may be represented in another form, such as a text string.

The first node 502a1 may identify a protocol endpoint in a node outside the first region 510a1 by a protocol address from, for example a first scope-specific address space specific to the first region 510a1. The protocol address identifies the node including the protocol endpoint and identifies a network interface of the node. With respect of FIG. 5A, a first protocol address, in the address space, may serve as an identifier of a network interface of a second node 502a2. The second node 502a2 is illustrated in a second region 510a2 that may include only the second node 502a2. Some or all of a protocol address may be a scoped address, which may have a scope that spans the first region 510a1 and identifies a node in the first region 510a1 to another node in the first region 510a1.

The address information and/or path information may be received in a data unit of a network protocol supported by a network layer component 415a. Networking application 403a in the first node 502a1 may provide data to send to the second node 502a2 by providing address information identifying a protocol address that in the first region identifies the second node 502a2. The address information may be detected by the address handler component 416a. The address handler component 416a may include instructions to generate and/or to store a representation of the protocol address as address information in a data unit specified according to the network protocol, such as the Internet Protocol or an Ethernet protocol, supported by the network layer component 415a or the link layer component 425a. The address handler component 416a may interoperate with a packet generator component 421a to include the address information in the data unit as specified by the corresponding network protocol. The address information may include and/or or may otherwise identify path information that identifies a network path that communicatively couples the first node 502a1 and the second node 502a2.

In FIG. 5A, an identifier, 2.2.3.3, identifies a sequence of network interfaces of nodes in a network path that identifies the second node 502a2 with respect to the nodes in the first region 510a1. Exemplary representations of the identifier as a protocol address are described below with respect to FIGS. 6A-E. The identifier, 2.2.3.3, when specific to a node outside the first region 510a1 may serve as a protocol address for another node other than the second node 502a2 or may not identify any nodes with respect to the other node, as is the case illustrated in FIG. 5A.

The packet generator component 421a in the first node 502a1 may include one or more instructions that when executed by the first node 502a1 identify a source protocol address based on address information represented in the data unit to identify the first node 502a1 as the source node of the data in the data unit. The packet generator component 421a may interoperate with a t-space component 404a to receive the source address information to include a representation of the source protocol address in the data unit.

A t-space component 404a in the first node 502a1 may identify a source protocol address that, in a second scope-specific address space specific to the second region 510a2 that includes the second node 502a2, identifies the first node 502a1. The second scope-specific address space may be node-specific. The identifier, 1.1.0.3, identifies a sequence of network interfaces and hops in a network path from the second node 502a2 to the first node 502a1. In a second node-specific address space specific to the second node 502a2, the identifier identifies the first node 502a1. The source protocol address may be pre-specified to the first node 502a1 via a user and/or may be determined based on a previous communication with the second node 502a2. The source protocol address may be retrieved via a request to a network directory service, as described in more detail below and referred to herein as a "topology service".

A packet generator component 421a may receive source address information that identifies a scoped address that identifies the first node 502a1 in the first region 510a1. In one aspect, illustrated in FIG. 5A, the number '3' may identify a network interface of the first node 502a1 and or a hop in the scope of the first region 510a1. As the data is transmitted via the network path identified by source address information included in one or more data units, included in transmitting the data, may be augmented and/or otherwise updated to provide source address information from which the second node 502a2 may detect and/or may otherwise determine a protocol address that identifies the first node 502a1 in an address space usable by the second node 502a2.

The second node 502a2, in FIG. 5A, may identify path information, such as the identifier, 1.2, as an identifier of a sequence of network interfaces of nodes and/or hops in a network path that communicatively couples the second node 502a2 and a third node 502a3. The identifier, 1.2, when specific to a node outside the second region 510a2 may serve as a protocol address for another node other than the third node 502a3 or may not identify any nodes with respect to the other node, as is the case illustrated in FIG. 5A.

The second node may receive a first message via one or more data units that identify 2.2.3.3 as a protocol address of the second node 502a2. The first message may be sent by a t-communication component 410a operating in an execution environment 401a of the first node 502a1. The first message may include a symbolic identifier, such as a domain name, of the first node 502a1 to register in a topology service system including a t-service 405b illustrated in FIG. 4B.

In an aspect, a topology monitor (t-monitor) component 408a in an execution environment of the second node 502a2 may detect the path information, 2.2.3.3 in address information detected in an address field of a data unit and/or from an application operating in the second node 502a2. The t-monitor component 408a may provide path information to a t-space component 404a. The t-space component 404a may associate the symbolic identifier received via the resolver component 402a with a location in a topological space identified based on the path information. The location may be associated with symbolic identifier to identify address information which may include an identifier of the first node 502a1 with respect to the second region 510a1. The t-space component 404a may save the association in a local topology data store 433a, which in an aspect may serve as a cache. Additionally, the second node 502a2 may forward the symbolic identifier in a second message to be registered in a topology service system, such as the domain name system or an analog of the domain name system. The t-space component 404a may interoperate with a t-access component 412a to identify address information stored in a topology data store 433a to send along with the symbolic identifier. The t-space component 404a may interact with a topology relay (t-relay) component 406a to generate the second message to send to deliver to a node including a t-service to register the symbolic identifier.

The second node 502a2 may send a message to the third node 502a3 in one or more data units identifying the identifier, 1.2, in a destination address field of the respective data unit(s). The message may include and/or otherwise identify the symbolic identifier received from the first node 502a1.

In another aspect, the second node 502a2 may be included in and/or may otherwise provide an instance of the execution environment 401b. In FIG. 4B, a symbolic identifier sent in a message sent by a t-communication component 410a via a t-protocol component 421a in the first node 502a1 may be received in a message sent by the second node 502a2. The message from the first node 502a1 may include address information received and/or otherwise identified by a t-communication component 410b, illustrated in FIG. 4B, in the second node 502a2. The message may include a symbolic identifier which is detected by a resolver component 402b. The message may include and/or otherwise identify path information identifying a network path included in communicatively coupling the first node 502a1 and the second node 502a2. For example, the path information in the message may identify a network path that communicatively couples the first node 502a1 and the second node 502a2. Path information that identifies a network path that communicatively couples the second node 502a2 and the third node 502a3 may be included in and/or otherwise identified by address information of a data unit included in transmitting the message from the second node 502a2 to the third node 502a3. The message may be received by the t-communication component 410b to create and/or update a record associating the symbolic identifier with address information and/or path information that identifies the first node with respect to another node in the network 500a.

The t-communication component 410b may provide information received in the message, directly and/or indirectly, to a t-space component 404b to create and/or update the record. Path information may alternatively be received in a request to resolve a symbolic identifier to address information identifying a protocol address. A request to resolve a symbolic identifier may be received by the t-communication component 410b and/or by a t-peer component 431b.

The t-space component 404b may interoperate with a t-monitor component 408b in execution environment 401b of the second node 502a2. The t-monitor component 408b may receive the address information identifying the sequence, 2.2.3.3, along with a symbolic identifier of the first node 502a1. The t-monitor component 408b may provide the address information to a t-space component 404b to associate with the symbolic identifier as described above. The address information may be associated by determining a location for the first node 502a1 in a topological space representing some or all of a network. A topological space, stored in a topology data store 433b, and representing part or all of the network may be updated, via a topology access (t-access) component 412b, to represent the first node 502a1 at the location. For example, a record associating the symbolic identifier and the location in the topological space may be created and/or otherwise updated. Such a record may be stored in a topology data store 433b illustrated in FIG. 4B. The t-access component 412b may interoperate with a t-space component 404b to represent the first node 502a1 in one or more topological spaces maintained by the t-service 405*b* in the topology data store 433*b*.

The t-space component 404*b* may additionally forward the symbolic identifier in a second message to be registered in another node, such as the third node 502*a*3, in a distributed topology service system. The t-space component 404*b* may interoperate with a resolver component 402*b* to identify address information and/or location information locating the first node 502*a*1 to send along with the symbolic identifier. Location information may identify a location relative to another entity and/or location in a topological space and/or may identify an absolute location based on a coordinate system. The resolver component may interact with a t-relay component 406*b* to generate the second message to deliver to a node, such as the third node 502*a*3 of an execution environment 401*b* including a t-service 405*b*, which may register the symbolic identifier and/or forward to yet another t-service in the topology service system.

The second node 502*a*2 may send a message to the third node 502*a*3 in one or more data units identifying the sequence, 1.2, in a destination address field of the data unit(s). The message may include and/or otherwise identify the symbolic identifier of the first node 502*a*1.

As described, the third node 502*a*3 may be included in and/or may otherwise provide an instance of the execution environment 401*b*, in FIG. 4B. A symbolic identifier of the first node 502*a*1 may be sent in a message by a t-communication component 410*a* via a t-protocol component 421*a* in the first node 502*a*1. The message may be received by the second node 502*a*2. A message from the second node 502*a*2 to the third node 502*a*3 may include address information and/or path information, which may be received and/or otherwise identified by a t-communication component 410*b*, illustrated in FIG. 4B, in the third node 502*a*3. The message received by the third node 502*a*3 may include the symbolic identifier of the first node 502*a*1, such as a DNS name, and may include and/or otherwise may be received based on address information and/or path information for communicating with the first node 502*a*2. The data may be received by the t-communication component 410*b* to create and/or update a record associating the symbolic identifier with some or all of the address information and/or path information.

The t-communication component 410*b* may provide the data unit or a suitable portion thereof, directly and/or indirectly, to the t-monitor component 408*b* in interoperating, directly or indirectly, with a t-space component 404*b* to create and/or update a representation of a node in a topological space. Address information may alternatively be received in a request to resolve a symbolic identifier to address information identifying a protocol address. A request to resolve a symbolic identifier may be received by the t-communication component 410*b* and/or by a t-peer component 431*b*.

The third node may associate the symbolic identifier with a third sequence of network interface identifiers, 2.2.3.3.1.2, that identifies the third node 502*a*3 in an address space specific to the first node 502*a*1. Thus, the first node may be registered with a t-service operating in an execution environment of the third node 502*a*3 by the second node 502*a*2. The first node 502*a*1 need not have access to an address of the t-service 405*b* in the third node to register the symbolic identifier of the first node 502*a*1. A first node may register with a t-service, unknown to the first node, by sending its symbolic identifier to another node that does have access to a protocol address of node included in and/or providing an execution environment hosting the t-service. If a node receives a symbolic identifier of another node to register and the receiving node does not know the address of a topology node hosting a t-service, the receiving node may forward the symbolic identifier to still another node that might have access to a protocol address of the topology node. The symbolic identifier may be forwarded among nodes until a node including a t-service (i.e. a topology node) is located. As the symbolic identifier is forwarded path information, hop information, network interface information, and scope specific address information may be collected to deliver to a t-service.

As described herein, a first node may detect address information and/or path information that identifies a first-second protocol address that, in a first scope-specific address space specific to a first region that includes the first node, identifies the second node. Alternatively or additionally, the second node may detect address information that identifies a second-first protocol address that, in a second scope-specific address space specific to a second region that includes the second node, identifies the first node to the second node. Alternatively or additionally, the second node may receive address information identifying the first-second protocol address. The second node may determine the second-first protocol address based on the first-second protocol address. Alternatively or additionally, the first node may receive the second-first protocol address. The first node may determine the first-second protocol address based on the second-first protocol address.

Returning to FIG. 4B and FIG. 5A, address information and/or path information may be detected by and/or otherwise may be identified based on a t-space component 404*b* operating in a t-service 405*b* in an address representation in a data unit received via the network 500*a*. An instance of an execution environment 401*b* may include and/or otherwise may be provided by the third node 502*a*3 in a third region 510*a*3 in the network 500*a*. A t-monitor component 408*b* in the third node 502*a*3 may receive and/or otherwise detect address information and/or path information in a data unit received from another node, such as the second node 502*a*2 via a NIC and a link layer component operating in the third node 502*a*3, as described above. The data unit may be received from the link layer component via a t-protocol component 421*b* by a t-peer component 431*b*.

A t-space component 404*b* in the third node 503*a*3 may determine an address space that includes a protocol address identified by the address information. For example, the t-space component 404*b* may identify that a protocol address detected in the address information is in a third scope-specific address space specific to a third region 510*a*3 that includes the third node 502*a*3 in detecting an identifier of a node, such as the second node 502*a*2, that sent the data in the received data unit.

When the protocol address, identified in address information is detected by the t-space component 404*b*, is not in an address space that is usable for sending data to another node, the t-space component 404*b* may determine a protocol address in a suitable address space as described in more detail below. In one aspect, the t-space component 404*b* may receive address information that identifies the third node, in a second scope-specific address space of the second node that sent the data unit. The t-space component 404*b* may determine a third-second protocol address, that in a third node-specific address space specific to the third node, identifies the second node 502*a*2. In another aspect, the address information may identify a global or local scoped address.

FIGS. 6A-E illustrate a number of exemplary address representations 602 illustrating various address formats and vocabularies for representing scope-specific addresses, path-based addresses, hop-based addresses, network interface based addresses, scoped address based addresses, and/or hybrid addresses. Various portions of the respective address representations 602 are illustrated as contiguous, but need not be so in various embodiments according to the subject matter described herein. Each of the types of address representation 602 shown in FIGS. 6A-E may be included in a destination protocol address portion and/or a source protocol address portion of an IPv4 data unit header, an IPv6 data unit header, or a link layer protocol header. The address type, such as scope-specific, may be identified by a bit pattern or identifier defined to identify a protocol address type. The bit pattern or identifier may be stored in a type bits portion of an IP packet and/or in some other specified location.

Figure 6A:
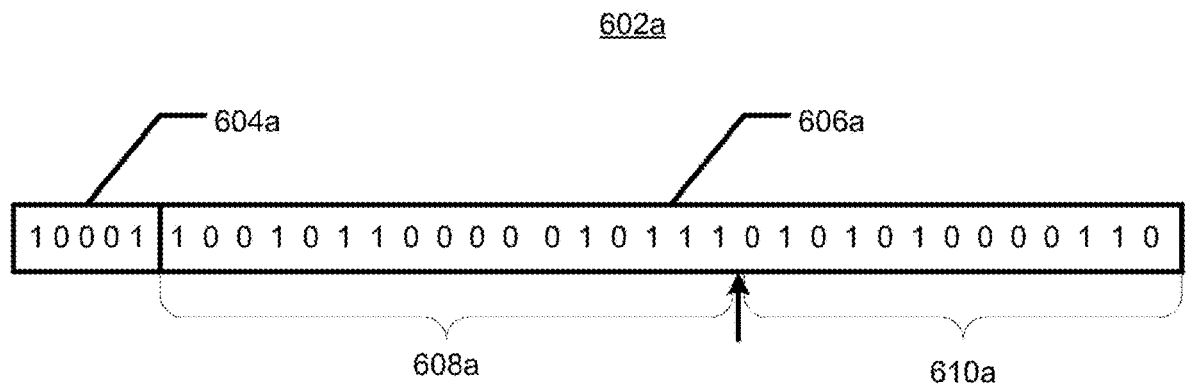
FIG. 6A is a diagram illustrating an exemplary representation of a protocol address according to another aspect of the subject matter described herein.

FIG. 6A illustrates an address representation 602a that may be included in a data unit or packet of a network layer protocol, such the Internet Protocol, and/or a frame or packet of a link layer protocol. An address representation 602a may identify one or more scope-specific addresses for one or more respective nodes in a network path for transmitting data from one path end node to another. In an aspect, an address representation 602a may be processed as including at least three portions. An address separator field 604a is illustrated including a binary number. In FIG. 6A, the binary number illustrated equals seventeen in base ten. The number in the address separator field 604a identifies a boundary in an address information field 606a separating a first address field 608a and a second address field 610a. The first address field 608a may identify a first protocol address that, in a first scope-specific address space of a first node, identifies a second node included in the network path. The second address field 610a may identify a second protocol address that, in a second scope-specific address space of the second node, identifies the third node.

With respect to FIG. 5A, an address representation 602a may be included in a data unit including data from the first node 502a1 to transmit to the second node 502a2. As described above, the sequence, 2.2.3.3, may be represented in an address information field 606a to identify a first-second protocol address that, for the first node 502a1, identifies the second node 502a2. The first-second protocol address may be an identifier that, in the first scope-specific address space, identifies the second node 502a2.

At the first node 502a1, an address handler component 416a and/or a t-space component 404a operating in the first node 502a1 may set and/or otherwise detect a value in the address separator field 604a that indicates a first address field 608a has a zero size. The entire address information field 606a, thus, constitutes a second address field 610a at the first node 502a1 and identifies the first-second protocol address that may be set and/or otherwise detected by the address handler component 416a.

At a third path node 504a3, an address separator field 604a in a data unit including the data from the first node 502a1 may be set to and/or otherwise may be detected, by a address handler component 416a and/or a t-space component 404a in the third path node 504a3, as a value that identifies 2.2 in a first address field 608a. The information in the first address field 608a identifies a protocol address that, in the first scope-specific address space identifies the third path node 504a3. The value in the address separator field also identifies a second address field 610a that identifies 3.3 as a protocol address that, in a fifth scope-specific address space specific to a fifth region 510a5 including the third path node 504a3, identifies the second node 502a2.

At the second node 502a2 a data unit including the data from the first node 502a1 may include a value, set and/or detected by an address handler component in the second node 502a2, in an address separator field 604a that indicates that the address information field 606a includes only a first address field 608a identifying 2.2.3.3 as the first protocol address.

As the data from the first node 502a1 is transmitted from node to node in the network path the value represented in an address separator field 604a in an address information field 606a in a data unit including the data or a portion thereof may be adjusted by respective address handler components 416a in the nodes in the network path to identify a protocol address in a suitable address space for the respective nodes.

In an aspect, at the second node 502a2, the value in the separator address field may indicate to a t-space component 404a that address information field 606a also includes information for determining and/or otherwise identifying a second-first protocol address, that in the second scope-specific address space, identifies the first node 502a1. An example and description are provided below.

The above describes an address representation 602a in the role of identifying destination address information in a data unit of a network protocol, such as an IP protocol or an Ethernet frame. An address representation 602a may include source address information with respect to a node receiving a data unit sent from the first node 502a1 to the second node 502a2. An address information field 606a including source address information at the third path node 504a3 may include a first address field 608a identifying the sequence, 0.3, that identifies a protocol address that, in the fifth scope-specific address space specific to the first region 510a5, identifies the first node 502a1 as the source node for the data in the data unit. The address information field 606a including the source address information at the third path node 504a3 may include a second address field 610a identifying the sequence, 1.1, that identifies a protocol address that, in the second node-specific address space specific to the second region 510a2, identifies the third path node 504a3 as a path node in the network path traversed by the data sent from the first node 502a1.

A data unit may include separate address representations for destination address information and source address information as, for example, current IP packet headers are specified. Alternatively, a data unit such as an IP packet may include an address representation that identifies source address information in the context of one address space specific to a node, in a region, in a network path traversed by the data unit and identifies destination address information to another node, in another region in the network path. Rather than requiring separate source and destination representations, a single address representation may identify some or all of a destination protocol address with respect to one scope-specific address space and some or all of a source protocol address with respect to another scope-specific address space. More details, as well as examples, are described below.

Figure 6B:
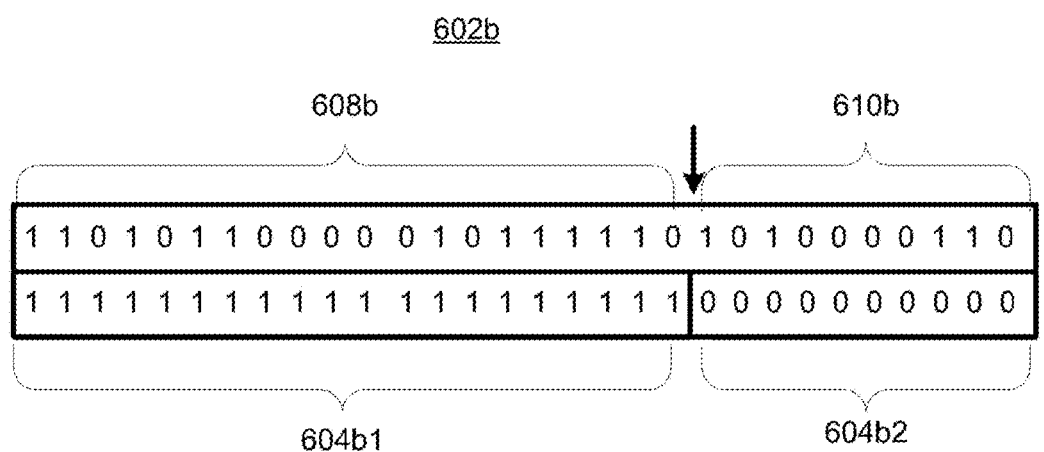
FIG. 6B is a diagram illustrating an exemplary representation of a protocol address according to another aspect of the subject matter described herein.

FIG. 6B illustrates another type of address representation 602b that may be included in a data unit to provide address information according to a particular network protocol, such as IP, IPX, or Ethernet. Instead of or in addition to including an address separator field 604 that distinguishes a first address field 608 from a second address field 610 based on a bit count, a bit-mask may be specified as one or more address separator fields 604b to identify a first address field 608b and a second address field 610b in an address information field 606b. Address information represented as illustrated in FIG. 6B may be processed in an analogous manner to that described for the address information represented in FIG. 6A based on the bit mask address separator field(s) 604*b* rather than and/or in addition to a size address separator field 604*a* illustrated in FIG. 6A.

Figure 6C:
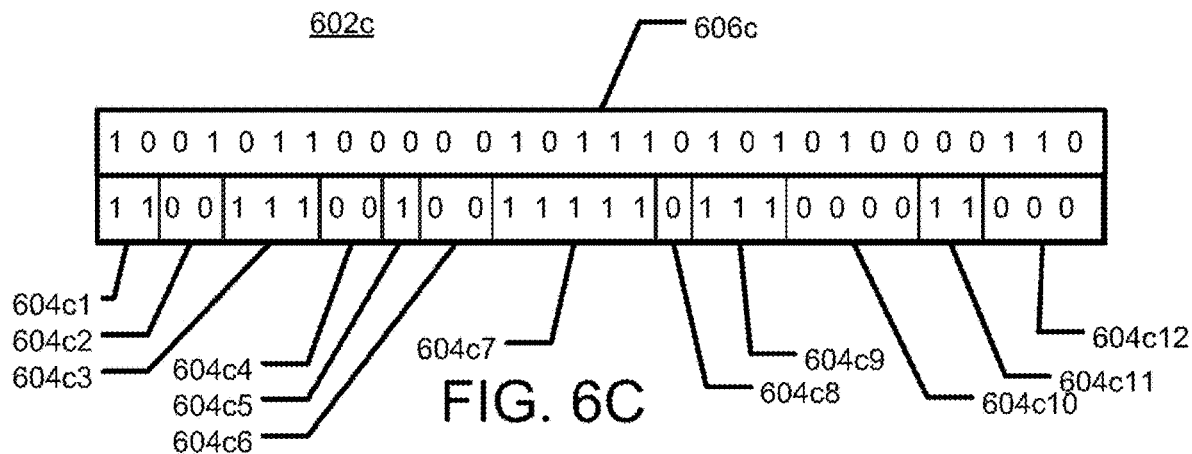
FIG. 6C is a diagram illustrating an exemplary representation of a protocol address according to another aspect of the subject matter described herein.

FIG. 6C illustrates an address representation 602*c* identifying one or more scope-specific addresses. An address information field 606*c* may be interpreted as one or more scope-specific addresses based on one or more address separator field(s) 604*c*. Address separator fields 604*c* are specified according to a network protocol to distinguish one node-specific address from another in an address information field 606*c*. FIG. 6C illustrates an address separator field 604 that distinguishes and/or identifies hop identifiers that may be scope-specific addresses and/or included in a scope-specific address. A scope-specific address may identify a node one hop away from the region for which the address is specific. The address separator fields 604*c* distinguish separate hop identifiers based on changes in values of bits in consecutive address separator fields 604*c*. In FIG. 6C, a first address separator field 604*c*1 includes one or more 1-valued bits that correspond to bit positions in the address information field 606*c* to identify a first address field referred to in FIG. 6C as a first hop information field. Scope-specific addresses that include more than one hop may be distinguished similarly as shown in FIG. 6B. Combinations of hop identifiers and path identifiers may be distinguished as scope-specific addresses by address separator fields 604. An illustrated second hop information field 604*c*2 includes one or more 0-valued bits to identify a second hop information field in address information field 606*c*. Additional alternating sequences of 1-valued bits and 0-valued bits illustrated by address separator fields 604*c*3-12*c* correspond to and identify other hop information fields identifying hops in a network path communicatively coupling a pair of path end nodes and identified by a scope-specific address.

In FIG. 5C, a hop may be identified by an interface identifier of a network interface in a pair of communicatively coupled nodes included in the hop. For example, the number, 1, may serve as a hop identifier specific to a second path node 504*c*2 to identify a fifth hop 508*c*5 including the second path node 504*c*2 and a fourth path node 504*c*4. The number, 1, also identifies a network path for exchanging data between the two nodes. The number, 1, may also be a protocol address, that in a second path node-specific address space specific to the second path node 504*c*2, identifies the fourth path node 504*c*4. The number 1 may also identify a hop for the fourth path node 504*c*4 to exchange data with the second path node 504*c*2, may also be a protocol address that, in a fourth path node-specific address space specific to the fourth path node 504*c*4 identifies the second path node 504*c*2, and may identify a particular network interface of the second path node 504*c*2 and/or of the fourth path node 504*c*4.

A first node 502*c*1 may identify a second node 502*c*2 by a first-second protocol address, that in a first scope-specific address space specific to a first region 510*c*1 including the first node 502*c*1, identifies the second node 502*c*2. The first-second protocol address may include and/or otherwise may be based on a sequence of hop identifiers 0.0.1.3.2.1. Note that other network paths are illustrated for transmitting data from the first node 502*c*1 to the second node 502*c*2 and may also be and/or otherwise may identify protocol addresses in the first scope-specific address space that identify the second node 502*c*2 to nodes in the first region 510*c*1. Note that the second path node 504*c*2 includes a network interface that is in the first region 510*c*1 and a network interface that is not in the first region. In communicating with the second node 502*c*2 via the network interface outside the first region 510*c*1 the second path node 504*c*2 is defined to be outside the first region 510*c*1. When the second path node 504*c*2 communicates with a node outside the first region 510*c*1 via the second path node's 504*c*2 network interface in the first region 510*c*1, the second path node 504*c*2 is defined to be in the first region 510*c*1. For example when the second path node 504*c*2 communicates with a twelfth node 502*c*12 via fourth node 502*c*4, the second path 504*c*2 is in the first region 510*c*2 with respect to the twelfth node 502*c*12.

The second node 502*c*2 may identify a third node 502*c*3 by a second-third protocol address that, in a second node-specific address space specific to the second node 502*c*2 in the second region 510*c*2, identifies the third node 502*c*3. The protocol address may be based on a sequence of hop identifiers, 1.3.0, that identifies the third node 502*c*3 with respect to the second node 502*c*2. The third node 502*c*3 is in a third region 510*c*3. Within the third region 510*c*3, the third node 502*c*3 may be identified by a local-scope address 0. Nodes in the third region 510*c*3 may identify nodes outside the third region 510*c*3 with identifiers from a third scope-specific address space specific to the third region 510*c*3.

The hop identifiers, 0.1.3.2.1, may be represented in an address representation 602*c* in a data unit for sending data from the first node 502*c*1 to the second node 502*c*2. The hop identifiers, 1.3.0, may be represented in an address representation 602*c* in a data unit for sending data from the second node 502*c*2 to the third node 502*c*3. The identifiers may be given a bit or binary representation and the hop identifiers may be distinguished or separated via address separator fields 604*c* as described above with respect to FIG. 6C. An address separator field analogous to that shown in FIG. 6A may also or alternatively be included and processed as described above. Assignment of hop identifiers is described in application Ser. No. 13/727,649 filed on 2012 Dec. 27, entitled "Methods, Systems, and Computer Program Products for Assigning an Interface Identifier to a Network Interface"; application Ser. No. 13/727,655 filed on 2012 Dec. 27, entitled "Methods, Systems, and Computer Program Products for Determining a Shared identifier for a Hop in a Network", and application Ser. No. 13/727,657 filed on 2012 Dec. 27, entitled "Methods, Systems, and Computer Program Products for Determining a Hop Identifier for a Network Protocol", by the present inventor.

Note that the address information that identifies protocol addresses for the second node 502*c*2 and for the third node 502*c*3 in the preceding description may include information for identifying a return path or a portion thereof. For example, the second-third protocol address, 1.3.0, identifies 3.1, which may be a portion of a third-second protocol address that, in the third scope-specific address space, identifies the second node 502*c*2 for nodes in the third region 510*c*3. The first-second protocol address, 0.1.3.2.1, identifies 1.2.3.1 that, in the second-node-specific address space, identifies a network path from the second node to the first region 510*c*1. Note that the second node may be in a region that includes only one node. The sequence, 1.2.3.1, however, does not identify any network interfaces of nodes in the first region 510*c*1. Separate source address information may be included in a data unit sent to the second node 502*a*2 that includes data sent from the first node 502*c*1. The source address information may identify 1.2.3.1.101 as a second-first protocol address that, in the second node-specific address space, identifies the first node 502*c*2. In, the first region 510c1, 101 may be a scoped address that identifies the first node 502c1 in the scope of the first region 510c1. Thus, a scope-specific address may include a scoped address.

As described in the previous paragraph, a hop may be assigned an identifier that is shared by the pair of nodes in the hop. Thus, a sequence of hop identifiers may serve as a scope-specific address in one scope-specific address space when processed in one order of the sequence and may serve as another scope-specific address specific to another node when processed according to another order of the sequence. Any of the address types illustrated in FIGS. 6A-C, along with various variants and analogs, are suitable including reversible address information.

Figure 6D:
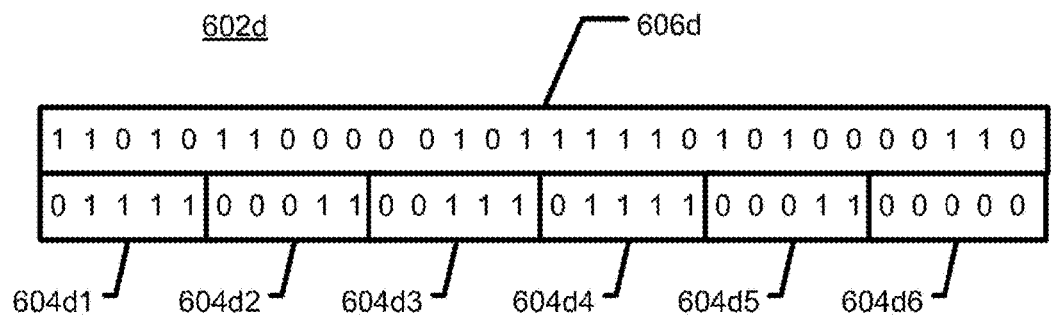
FIG. 6D is a diagram illustrating an exemplary representation of a protocol address according to another aspect of the subject matter described herein.

FIG. 6D includes an address representation 602d illustrating aspects of a schema for representing path information based on identifiers of network interfaces or other suitable pairs of numbers for identifying protocol endpoints of a hop and/or a network path. An address information field 606d includes path information identifying a network path for communicating data between a pair of path end nodes in the network path. FIG. 6D illustrates that an address representation 602d may include one or more address separator fields 604d that correspond to and/or otherwise identify respective one or more portions of the address information field 606d that are based on a pair of identifiers of protocol endpoints.

An address separator field 604d includes series of 1-valued bits and 0-valued bits. A change from a 1-value to a 0-value and vice versa may indicate a boundary that separates protocol endpoint identifiers and/or interface identifiers. An address separator field 604d1 includes one 0-valued bit followed by four 1-valued bits. The 0-valued bit may be defined to indicate that a first network interface in a first hop identifier is one bit long with a corresponding position in the address information field 606d.

FIG. 6D identifies the first interface identifier as the number, 1, in base ten. The four 1-valued bits in the first address separator field 604d1 may be similarly defined to identify the location of a second interface identifier in the first hop identifier. The second interface identifier, as illustrated in FIG. 6D, has the value 10 in base ten. The first hop identifier includes the numbers 1 and 10. The first hop identifier may be represented as a string, 1-10. A second hop identifier is located by the end of the series of four 1-valued bits in the first address separator field 604d1 to a series of three 0-valued bits that identify a boundary of a second address separator field 604d2 for second hop information identifying a second hop identifier, and the three 0-valued bits also identify the location of a first interface identifier in second hop information in the address information field 606d. Two subsequent 1-valued bits identify the location in the address information field 606d of a second interface identifier in the second hop information. The second hop identifier includes the numbers 6 and 0 in base ten. The remaining address separator fields 604d may be processed similarly. The protocol address illustrated in FIG. 6D may be represented textually as 1-10.6-0.0-5.1-14.5-0.6.

Note that the address separator field 604d6 does not identify a pair of identifiers and is similar to address separator fields 604c in FIG. 6C. Alternatively, an address separator field 604d may correspond to a portion of an address information field 606d that identifies a scoped address. This is illustrated to demonstrate that protocol addresses may be uniform or non-uniform in their format and content.

In FIG. 5B, a first node 502b1 and a second node 502b2 may be included in regions that respectively include the nodes. Each of the two nodes may identify the other by a protocol address in a respective node-specific address space. For example, a sequence of pairs of interface identifiers, 151-294.151-10, may be a protocol address, that in a first node-specific address space specific to the first node 502b1, identifies the second node 502b2. The first node may send a data unit including an address representation 602d of the type illustrated in FIG. 6D.

Note that reversing the interface identifiers yields the identifier, 10-151.294-151, that may be a protocol address that, in a second node-specific address space specific to the second node 502b2, identifies the first node 502b1. The second node 502b2 and a third node 502b3 may be included in regions that respectively include the nodes. Each of the two nodes may identify the other by a protocol address in a respective node-specific address space. A sequence of pairs of interface identifiers, 10-294.151-10, may be a protocol address, that in the second node-specific address space, identifies the third node 502b3. Reversing the interface identifiers yields the identifier, 10-151.294-10, that may be a protocol address, that in a third node-specific address space specific to the third node 502b3, identifies the second node 502b2.

A sequence of hop identifiers based on interface identifiers may serve as a scope-specific address in one scope-specific address space when processed in one order of the sequence and may serve as another scope-specific address specific to another node when processed according to another order of the sequence.

Figure 6E:
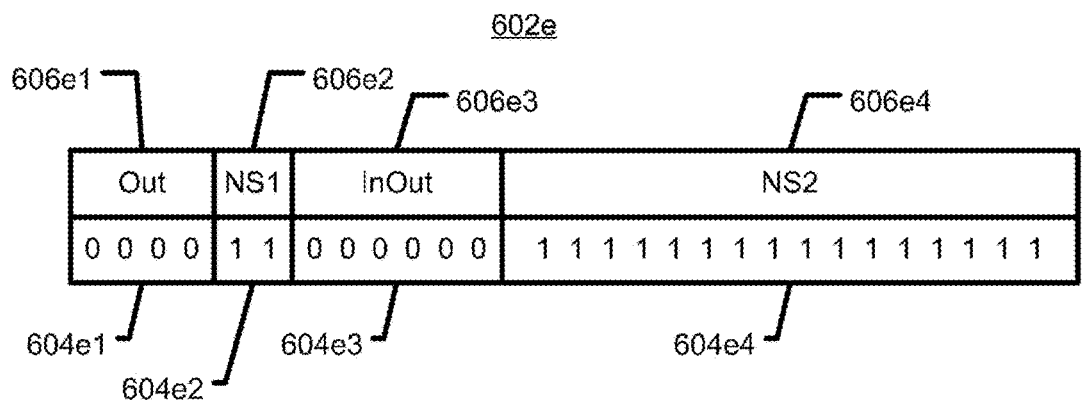
FIG. 6E is a diagram illustrating an exemplary representation of a protocol address according to another aspect of the subject matter described herein.

FIG. 6E illustrates an address representation 602e that further demonstrates that a protocol address may be based on path information and/or may be based on address information that does not identify a network path. An address representation 602e may include portions that include path information and/or portions that include scoped addresses. An address separator field 604e is defined to distinguish address fields in a manner similar to the method described for distinguishing hop identifiers in FIG. 6C. A first address information field 606e1 corresponding to the first address separator field 604e1 includes a single interface identifier for an outbound network interface for a first node as described above with respect to FIG. 6A and FIG. 5C. A second address information field 606e2 corresponding to a second address separator field 604e2 may include a scoped address having an inside scope, an outside scope, or both. A node processing the second address information field 606e2 may be included in a portion of a network spanned by the scope of the scoped address. The node may process the scoped address accordingly.

See application Ser. No. 11/962,285, by the present inventor, filed on 2007 Dec. 21, entitled "Methods and Systems for Sending Information to a Zone Included in an Internet Network" for a description of addresses having outside scope and/or inside scope and processing of such addresses. A third address information field 606e3 corresponding to a third address separator field 604e3 may include a pair of identifiers as described with respect to FIG. 6D. A fourth address information field 606e4 corresponding to a fourth address separator field 604e4 may include a protocol address analogous to one of the types of addresses described with respect to the second address information field 606e2 such as a local-scoped address. FIG. 6E illustrates that a scope-specific address specific to a node may include an address and/or a portion of an address that are/is not from a scope-specific address space.

In FIG. 5B, a first node 502b1 may be included in a first region that includes network interfaces coupling nodes to a first network 506*b*1 included in the network 500*b*. A second node 502*b*2 may be included in a second region that includes network interfaces coupling nodes to a second network 506*b*2. Each of the two nodes may identify the other by a protocol address in their respective scope-specific address spaces. For example, a sequence of scoped addresses, 294.10, may be a protocol address that, in a first scope-specific address space specific to the first network 506*b*1, may identify the second node 502*b*2 to the first node 502*b*1, as well as to other nodes in the first region defined by the first network 506*b*1. A data unit including an address represented as in 602*e* in FIG. 6E may identify a scope-specific address based on a sequence of scoped addresses. Similarly, a sequence of scoped addresses, 294.10, may be a protocol address that, in a second scope-specific address space specific to the second network 506*b*2, identifies a third node 502*b*3 to the second node 502*b*2 as well as to other nodes in the second region defined by the second network 506*b*2.

In another aspect, scope-specific addresses for a first node, a second node, and a third node may conform to a currently known schema defining a valid Internet Protocol address as specified by RFC 791 and/or RFC 3513. The protocol addresses may be processed as scope-specific as opposed to interpreting them as from a global address space as is currently done. A pattern in a type field may indicate a protocol address is scope-specific. In a further aspect, a mapping may be specified between scope-specific address spaces. A mapping may be ruled-based and/or may be specified by associations such as represented by a lookup table.

In an aspect, a node, referred to as a first origin node, in a network in a first region having a first scope-specific address space may assign a protocol address, of a network protocol, identifying a location of a representation of the node as an origin according to a coordinate system for a metric space that includes a network topology representing the network based on the network protocol. Alternatively or additionally, a network interface of an origin node may be identified by a coordinate identifying the origin of the coordinate space in the metric space. Another node, referred to as a second origin node, in the network in a second region having second scope-specific address space may assign a protocol address identifying a location of a representation of the other node as an origin according to a second coordinate system for the metric space that includes the network topology representing the network. The first scope-specific address space includes identifiers from the first coordinate system based on the first origin node location and the second scope-specific address space includes identifiers from the second coordinate system based on the second origin node location Those skilled in the art of metric spaces, such as geometric spaces, will appreciate that a one-to-one mapping may be determined and/or otherwise identified for mapping addresses from a first coordinate space having a first origin for a metric space to addresses from a second coordinate space having a second origin in the metric space. Given a mapping rule between the first scope-specific address space and the second scope-specific address space and a mapping between the second scope-specific address space and third scope-specific address space based on a third coordinate space identifying a third origin in the metric space, a mapping from the first coordinate space to the third coordinate space may be determined. A mapping between coordinate spaces for a metric space may include a coordinate shift and/or a rotation, for example. The mapping may be pre-specified and accessible to nodes in one or both address spaces. Mapping between locations in a number of different metric spaces are well known in mathematics.

Nodes may exchange mapping information. In an aspect, the address information may identify a mapping rule when exchanged between nodes. The mapping rule may be determined by second node and sent to a first node. The mapping rule may include mapping information for mapping addresses from the third scope-specific address space to the first scope-specific address space. Those skilled in the art will see that given address information for protocol addresses from any two scope-specific address spaces identifying respective origin locations in a metric space including a representation of a network and given a protocol address of third node not included in a region of either of the two scope-specific address spaces, a mapping rule may be determined by a resolver component to map the protocol address of the third node in one of the two scope-specific address spaces to the other to identify the third node in the other scope-specific address space.

Exemplary metric spaces include Euclidean spaces, non-Euclidean spaces, and geometric spaces. A Cartesian coordinate system is an exemplary address space for a Euclidean space. Another example of a geometric address space is a geospatial address space such as used currently in geo-location services. Networks have topologies that may be represented in a geo-space including locations addressed via a geometric address space. A metric space including a network topology of a network may be multi-dimensional space. For example, nodes are included in a real-world three-dimensional space that may be associated with a geospatial address space. In one aspect, locations of nodes in a network topology in a metric space may be located based on any suitable metric. Exemplary metrics may measure and/or otherwise may be based on physical distance in the real world between nodes, data transmission times, energy unitization, network congestion, latency, and the like. Exemplary metric spaces include non-Euclidean spaces as well as Euclidean spaces.

A first node, a second node, and a third node may be represented in a metric space. A first path in the metric space connecting the representation of the first node to the representation of the second node may be identified based on a first path location identifier that identifies a location in the first path of a representation of a node, a network interface in the node, a NIC in the network interface, and/or a hop that includes the node in a first network path communicatively coupling the first node and the second node. A second path in the metric space connecting the representation of the second node to the representation of the third node may be identified based on a second path location identifier that identifies a location in the second path of a representation of a node, a network interface in the node, a NIC in the network interface, and/or a hop that includes the node in a second network path communicatively coupling the second node and the third node. A first-third protocol address, that identifies the third node with respect to the first node for a network protocol, may be determined based on the first path location identifier and/or the second path location identifier. The first-third protocol address may include the first path location identifier and/or the second path location identifier.

The first path location identifier may be a relative identifier that identifies the representation in the first path relative to a first location identifier identifying a first location, in the metric space, that includes a representation of the first node or relative to a second location identifier identifying a second location, in the metric space, that includes a representation of the second node. Analogously, the second path location identifier may also be a relative identifier that identifies the representation in the second path relative to the second location identifier or relative a third location identifier identifying a third location, in the metric space, that includes a representation of the third node. The first-third protocol address may be determined based on at least one of the first path location identifier and the third path location identifier. The first-third protocol address may be relative identifier that identifies the third node relative to the first node. The first-third protocol address may include a third location identifier that identifies the third location relative to the first location identifier.

Figure 7A:
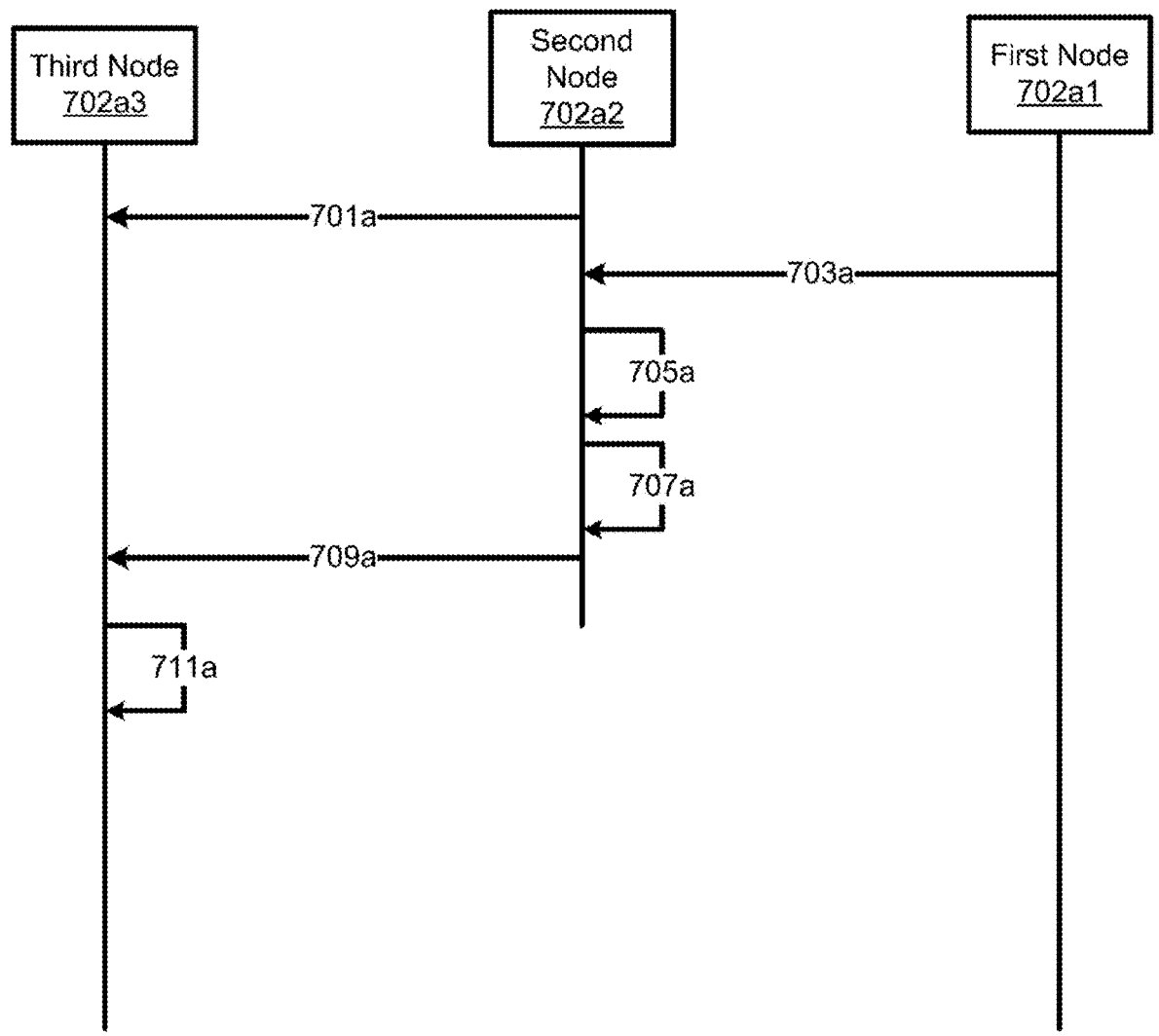
FIG. 7A is a message flow diagram illustrating messages exchanged between nodes in another aspect of the subject matter described herein.

In FIG. 7A, messages are exchanged between a first node 702a1, a second node 702a2, and a third node 702a3. The nodes in FIG. 7A may represent nodes in networks described above illustrated in FIGS. 5A-C. In FIG. 7A, in one aspect, the first node 702a1 is included in and/or otherwise provides an instance of the execution environment 401a including a t-communication component 410a. The second node 702a2, in the aspect, may host a t-service and/or a t-communication component. The third node 702a3 may host a t-service and/or a t-communication component compatible with the t-service in the second node 702a2.

FIG. 7A illustrates a first message 701a including a second symbolic identifier of the second node 702a2 to register in a t-service operating in the third node 702a3. The second message may be sent via a second network path that communicatively couples the second node 702a2 and the third node 702a3. A protocol address that identifies the third node 702a3 to the second node 702a2 may be user configured and/or may be received via the network. IP addresses of DNS servers are configured in such a manner.

FIG. 7A illustrates a second message 703a including a first symbolic identifier of the first node. Some or all of the third message and/or a data unit that includes some or all of the message may identify first path information and/or first address information. The second message 703a may be sent in one or more data units including and/or otherwise identifying the first path information in an address representation, such as illustrated in FIGS. 6A-E. The first path information may identify a first network path that communicatively couples the first node 702a1 and the second node 702a2. The first path information may include first hop information that identifies a first hop in the first network path. The second message 701a may include a request to register the symbolic identifier of the first node 702a1 with a t-service. The second message 703a may be sent by a t-communication component in the first node 702a1 via a network stack. The second message 703a may be received by a resolver component in an execution environment of the second node 702a2 via a compatible stack and a t-protocol component operating in the second node 702a2.

A third message 705a illustrates interoperation between the resolver component 402a and a t-space component 404a to associate the first path information with the symbolic identifier as describe above. The registration request in the second message 703a may be provided to the t-service in the second node 702a2 to create and/or update a record associating the symbolic identifier and the first information and/or with topology information for determining the first path/address information.

A fourth message 707a illustrates a data flow included in identifying the second path information by the t-space component 404a in the second node 702a2. The second path information may be identified to relay the first symbolic identifier to the t-service in the third node 702a3 to register the first node 702a1. The second path information may be accessed from a t-service as described above and/or may be detected by a t-monitor component 408a in address information in a data unit exchanged between a node communicatively coupled to the second node 702a2 via the third node 702a3 and/or from a node communicatively coupled to the third node 702a3 via the second node 702a2.

FIG. 7A illustrates a fifth message 709a sent by a t-relay component to the third node 702a3 from the second node 702a2 via the second network path. The fifth message 709a may include the first symbolic identifier and path information identifying the first network path. A resolver component 402b and a t-space component 404b in the third node 702a3 may associate the first path information and the second path information with the symbolic identifier, as illustrated by a sixth message 711a. The t-service may create and/or update a record associating the first symbolic identifier and third path information, based on the first and second path information and/or with topology information for determining the first path/address information. The third path information may identify a third network path the communicatively couples the third node 702a3 and the first node 702a1.

The t-service 405b in the third node 702a3 may represent a domain in a structured domain space, such as the domain name space of the Internet that has a hierarchical structure. When the symbolic identifier is not in a domain of the t-service 405b in the second node 702a2, the t-service 405b may forward the request for routing by a t-relay component 406b interoperating with a t-peer component 431b in a topology service system a t-service in another node that represents the domain of the symbolic identifier. Additionally or alternatively, the third node 502a3 may forward the request for delivery to yet another node in the topology service system.

Exemplary topology service systems include the Internet domain name system, a lightweight directory access protocol (LDAP) system, and a Windows® directory. In addition to storing information for lookup based on a symbolic identifier, a t-service may include and/or may interoperate with one or more services that maintain a topology of some or all of a network based on address information exchanged between and among nodes. Resolving a symbolic identifier may include determining some or all of a route between nodes in a topological space. A symbolic identifier may be resolved to more than one instance of address information, which may identify more than one protocol address for transmitting data from one node to another.

Once the third node 702a3 resolves a symbolic identifier it may cache and/or otherwise store an association between the symbolic identifier and the determined protocol address for later use. Note that a symbolic identifier may be resolved to one or more protocol addresses from the same scope-specific address space and/or different scope-specific address spaces, path-based address spaces, and the like.

The description above with respect to FIGS. 6A-E and FIGS. 5A-C demonstrates that not only are nodes identifiable via scope-specific addresses from scope-specific address spaces, but a hop in a network may be identified by a scope-specific identifier from a scope-specific identifier space. In FIG. 5C, a third hop 508c3 between a seventh path node 504c7 and an eighth path node 504c8 may be identified with respect to a first node 502c1 by a hop identifier from a first scope-specific address space specific to the first node 502c1. The sequence, 0.1.3.2.3, identifies the third hop 508c1 that includes a seventh path node 504c7 and the eighth path node 504c8. The third hop 508c3 identified with respect to a sixth path node 504c6 may be identified by the sequence, 0.3, in node-specific address space specific to the sixth path node 504*c*6. The sequence, 1.3, is an identifier that, in the third scope-specific address space specific to the third region 510*c*3, identifies the third hop 508*c*3. The number, 3, is an identifier that, in the seventh node-specific address space specific to the seventh path node 504*c*7, identifies the third hop 508*c*3.

FIG. 5C illustrates that the third hop 508*c*3 includes the seventh path node 504*c*7 and the eighth path node 504*c*8. A third hop identifier from the first scope-specific address space specific to the first region 510*c*1 may be represented as 1.0.1.0.3, as FIG. 5C illustrates. The third hop identifier includes a hop identifier 3 that identifies the third hop 508*c*3 with respect to an eighth path node 504*c*8. "1.0.1.0.3" is scope-specific to the nodes in the first region 510*c*1. The seventh path node 504*c*7 is included in a network path from the first node 502*c*1 to the eighth path node 504*c*8 that includes the third hop Returning to FIG. 5A and FIG. 4B, the second node 502*a*2 may receive a request from the first node 502*a*1 that includes a symbolic identifier of the third node 502*a*3. The request may be received by the t-communication component 410*b* as described above. The request may include a command to resolve the symbolic identifier to address information that identifies a first-third protocol address that, in the first scope-specific address space, identifies the third node 502*a*3 to the first node 502*a*1. The protocol address may be identified in a data unit by the first node 502*a*1 to send data in the data unit to the third node 502*a*3. The t-communication component 410*b* may interoperate with a resolver component 402*b* to determine the first-third protocol address that identifies the third node 502*a*3 to the first node 502*a*1. The resolver component may determine whether the symbolic identifier is in a name domain managed by the t-service 405*b*. If the symbolic identifier is in a domain managed by the t-service 405*b*, the resolver component 402*b* in the second node 502*a*2 may request a t-space component 404*b* to lookup address information for determining the first-third protocol address.

The t-space component 404*b* may locate address information associated with the symbolic identifier stored in a record or via another association in a topology data store 433*b*. If the symbolic identifier is located in the topology data store 433*b*, the t-space component 404*b* receives and/or otherwise detects address information associated with the symbolic identifier. If the resolver component 402*b* determines that the symbolic identifier is not in a domain of the t-service 403*a* in the second node 502*a*2, the resolver component may request that the t-space component 404*b* lookup and/otherwise determine the address information based on routing information collected by topology service system services in various nodes to determine the first-third protocol address via a lookup in a cache (not shown) that stores information received from other t-services operating in other nodes that manage other domains in the name space of symbolic identifiers.

If the symbolic identifier is not located in the cache, the resolver component 402*b* may instruct the t-peer component 431*b* in the second node 502*a*2 to send the symbolic identifier to a node that includes a t-service that manages the domain that includes the symbolic identifier. The other node may resolve the symbolic identifier, partially resolve the symbolic identifier, and/or may send address information back to the second node 502*a*2 for the resolver component 402*a* to resolve the symbolic identifier.

As described various types of protocol addresses may conform to various schemas defining rules for formatting valid protocol addresses and/or defining vocabularies specifying valid content of a protocol address. Given first address information identifying a first protocol address and second address information identifying a second protocol address as described above with respect to the method illustrated in FIG. 2, a t-space component 404 may determine a scope-specific first-third protocol address based on one or more of a schema of one or more of the first protocol address, a schema of the second protocol address, a schema of the third protocol address, a mapping between two or more of the schemas or portions thereof, relationships between the nodes to which the protocol addresses are specific, relationships between the scope-specific address spaces of the protocol addresses, and/or relationships between the nodes in a network that includes them. Some of the relationships listed may be represented in a network topology of the network. A t-space component 404 may detect some or all of the network topology in determining the first-third protocol address.

As described above with respect to FIG. 5A and FIG. 6A, the sequence, 2.2.3.3 may be included in first address information that identifies a protocol address that, in the first scope-specific address space, identifies the second node 502*a*2. The sequence 1.1.0.3 may be a protocol address that, in the second node-specific address space, identifies the first node 502*a*1. The sequence, 1.1.0.3, may be included in the first address information in a data unit in addition to the sequence 2.2.3.3 as previously described.

Also as described above with respect to FIG. 5A and FIG. 6A, the sequence, 1.2, may be included in second address information that identifies a protocol address that, in the second node-specific address space, identifies the third node 502*a*3. The sequence, 0.3, may be a protocol address that, in a third node-specific address space specific to a third region 510*a*3 including the third node 502*a*3, identifies the second node 502*a*2. The sequence, 0.3, may be included in the second address information in the data unit in addition to the sequence, 1.2, as previously described.

One or more of the t-monitor components 408 operating in the first node 502*a*1 and/or a t-monitor component 408 in the third node 502*b*3 may detect the sequence, 2.2.3.3, and the sequence, 1.2. The sequence, 2.2.3.3, may be provided to the third node 502*a*3 by the second node 502*a*2, in an example, described in more detail below. The sequence, 1.2, may be provided to the first node 502*a*1 by the second node 502*a*2 and/or by the third node 502*a*3, in an example described in more detail below. Given the two sequences, either or both of the t-space components 404 in the first node 502*a*1 and in the third node 502*a*3 may determine a sequence, 2.2.3.3.1.2, and/or another sequence, 2.2.3.2, either or both of which may be a protocol address that, in the first scope-specific address space, identifies the third node 502*a*3 for nodes in the first region 510*a*1.

Further, t-monitor components 408 respectively operating in the first node 502*a*1 and/or in the third node 502*a*3 may similarly detect the sequence, 1.1.0.3, and the sequence, 0.3.1.1, when included in the first address information and the second address information. Given the two sequences, either or both of the t-space components 404 in the first node 502*a*1 and in the third node 502*a*3 may determine a sequence, 0.3.1.1.0.3, and/or another sequence, 0.1.0.3, either or both of which may be a protocol address that, in the third node-specific address space, identifies the first node 502*a*1 for the third node 502*a*3.

A t-space component 404 operating in the second node 502*a*2 may similarly identify protocol addresses for communicating between the first node 502*a*2 and the third node 502*a*, based on first address information and second address information, as described in the preceding paragraphs.

As FIG. 6B illustrates a variant of the address representation 602*a* illustrated in FIG. 6A, a t-monitor component 408*a* and/or a t-monitor component 408*b* may include instructions to detect first and second address information to determine a protocol address in a manner analogous to that described above with respect to FIG. 5A and FIG. 6A.

As described above with respect to FIG. 5C and FIG. 6C, the sequence, 0.1.3.2.1, may be included in first address information that identifies a protocol address that, in the first scope-specific address space, identifies the second node 502*c*2. The sequence may be reversed to identify a protocol address that, in the second node-specific address space specific to the second node 502*c*2 identifies a network path to the first region 510*c*1. The local-scoped address, 101, may be included in source address information in the first address information to identify the sequence, 1.2.3.1.101, that, in the second node-specific address space, identifies the first node 502*c*1.

Also as described above with respect to FIG. 5C and FIG. 6C, the sequence, 1.3.0, may be included in second address information that identifies a protocol address that, in the second node-specific address space, identifies the third node 502*c*3. The sequence, 1.3, may be may part of a protocol address that, in a third scope-specific address space specific to the third region 510*c*3 identifies the second node 502*c*2. The sequence, 1.3, is included in a portion of the sequence, 1.3.0, in reverse order.

One or more of the t-monitor components 408 operating respectively in the first node 502*c*1 and/or a t-monitor component 408 in the third node 502*c*3 may detect the sequence, 0.1.3.2.1, and the sequence, 1.3.0. The sequence, 0.1.3.2.1, may be provided to the third node 502*c*3 by the second node 502*c*2. The sequence, 1.3.0, may be provided to the first node 502*c*1 by the second node 502*c*2 and/or by the third node 502*c*3. Given the two sequences, either or both of the t-space components 404 in the first node 502*c*1 and in the third node 502*c*3 may determine a sequence, 0.1.3.2.1.1.3.0, and/or another sequence, 0.3.1.2.3.0, either or both of which may be a protocol address that, in the first scope-specific address space, identifies the third node 502*c*3 for nodes in the first region 510*c*1. Repeated path and/or hop identifiers may indicate a loop in a path in some address representations 602*a* as the examples illustrates. A t-space component 404 may detect loops and remove them to produce shorter protocol addresses. In other address types, loops may be detected by a t-space component 404 to detect repeated pairs of hop and/or path identifiers where one identifier from a pair is from a source address and the other identifier in the pair is from a corresponding portion of a destination address.

Further, the t-monitor components 408 respectively operating in the first node 502*c*1 and/or in the third node 502*c*3 may similarly detect the sequence, 1.2.3.1.101, and the sequence, 1.3.1, when included in the first address information and the second address information, respectively. Given the two sequences, either or both of the t-space components 404 in the first node 502*c*1 and in the third node 502*c*3 may determine a sequence, 1.3.1.1.2.3.1.101, and/or another sequence, 1.3.2.1.101, either or both of which may be a protocol address that, in the third scope-specific address space, identifies the first node 502*c*1 for nodes in the third region 510*c*3.

A t-monitor component 408 operating in the second node 502*c*2 may similarly identify protocol addresses for communicating between the first node 502*c*2 and the third node 502*c*3, based on first address information and second address information, as described in the preceding paragraphs.

As described above with respect to FIG. 5B and FIG. 6D, the sequence, 151-294.151-10, may be included in first address information that identifies a protocol address that, in a first node-specific address space specific to the first node 502*b*1, identifies the second node 502*b*2. The sequence, 10-151.294-151, is included in the first address information as a second ordering of the identifiers in the sequence, 151-294.151-10, and may be a protocol address that, in a second node-specific address space specific to the second node 502*b*2 identifies the first node 502*b*1.

In addition, as described above with respect to FIG. 5B and FIG. 6D, the sequence, 10-294.151-10, may be included in second address information that identifies a protocol address that, in the second node-specific address space, identifies the third node 502*b*3. The sequence, 10-151.294-10, is included in the first address information as a second ordering of the identifiers in the sequence, 10-294.151-10, and may be a protocol address that, in a third node-specific address space specific to the third node 502*b*3 identifies the second node 502*b*2.

One or more of the t-monitor components 408 operating respectively in the first node 502*b*1 and/or a t-monitor component 408*a* in the third node 50*b*3 may detect the sequence, 151-294.151-10, and the sequence, 10-294.151-10. The sequence 151-294.151-10 may be provided to the third node 502*b*3 by the second node 502*b*2. The sequence 10-294.151-10 may be provided to the first node 502*b*1 by the second node 502*b*2 and/or by the third node 50*bc*3. Given the two sequences, either or both of t-space components 404 in the first node 502*b*1 and in the third node 502*b*3 may determine a sequence, 151-294.151-10. "10-294.151-10" and/or another sequence, 151-294.151-294.151-10, either or both of which may be a protocol address that, in the first node-specific address space, identifies the third node 502*b*3 for the first node 502*c*1.

Further, t-space components 404 respectively operating in the first node 502*b*1 and/or in the third node 502*b*3 may similarly detect the reverse sequence, 10-151.294-151, and the reverse sequence, 10-151.294-10, when included in the first address information and the second address information, respectively. Given the two sequences, either or both of the t-space components 404 in the first node 502*b*1 and in the third node 502*b*3 may determine a sequence, 10-151.294-10. "10-151.294-151" and/or another sequence, 10-151.294-151.294-151, either or both of which may be a protocol address that, in the third node-specific address space, identifies the first node 502*b*1 for the third node 502*b*3.

A t-monitor component 408 operating in the second node 502*b*2, as described in more detail below, may similarly identify protocol addresses for communicating between the first node 502*b*2 and the third node 502*b*3, based on first address information and second address information, as described in the preceding paragraphs.

As described above, FIG. 6E illustrates that a scope-specific address specific to a node may include an address and/or one or more portions of addresses that are not from a scope-specific address space. As described above with respect to FIG. 5B and FIG. 6E, the sequence 294.10 may be included in first address information that identifies a protocol address that, in a first scope-specific address space specific to a first network 506*b*1, identifies a second node 502*b*2. The sequence, 151.151, may be included in the first address information as source address information that may be a protocol address that, in a second scope-specific address space specific to the second network 506b2 identifies the first node 502b1. Also as described above with respect to FIG. 5B and FIG. 6E, the sequence, 294.10, may be included in second address information that identifies a protocol address that, in the second scope-specific address space, identifies the third node 502b3 for nodes in the second network 506b2. The sequence, 151.10, may be included in the second address information as source address information that may be a protocol address that, in a third scope-specific address space specific to the third network 506c2 identifies the second node 506b2

One or more of the t-monitor components 408 operating respectively in the first node 502b1 and/or a t-monitor component 408 in the third node 50b3 may detect the identical sequences, 294.10, respectively included in the first scope-specific address space and the second scope-specific address space. Given the two sequences, either or both of the t-space components 404 in the first node 502b1 and in the third node 502b3 may determine a sequence, 294.10.294.10, and/or another sequence, 294.294.10, either or both of which may be a protocol address that, in the first scope-specific address space, identifies the third node 502b3 for nodes in the first network 506b1.

Further, the t-monitor components 408 respectively operating in the first node 502b1 and/or in the third node 502b3 may similarly detect the sequences, 151.151, and 151.10. Given the two sequences, either or both of the resolver components 402 in the first node 502b1 and in the third node 502b3 may determine a sequence, 151.10.151.151, and/or another sequence, 151.151.151, either or both of which may be a protocol address that, in the third scope-specific address space, identifies the first node 502b1 for nodes in the third network 506b3. A t-space component 404 may detect the duplicate identifier 10 in first corresponding positions in the sequence, along with identifiers 294 and 151 in second corresponding positions in the sequence. The t-space component 404 may also determine that all three identifiers are in the same region 506b2 where they serve as local scoped addresses. The t-space component 404 may determine that the identifier 10 is based on the order in both sequences with respect to other identifiers in the same scope. A t-space component 404 operating in the second node 502b2, as described above, may similarly identify protocol addresses for communicating between the first node 502b2 and the third node 502b3, based on first address information and second address information, as described in the preceding paragraphs.

Figure 8:
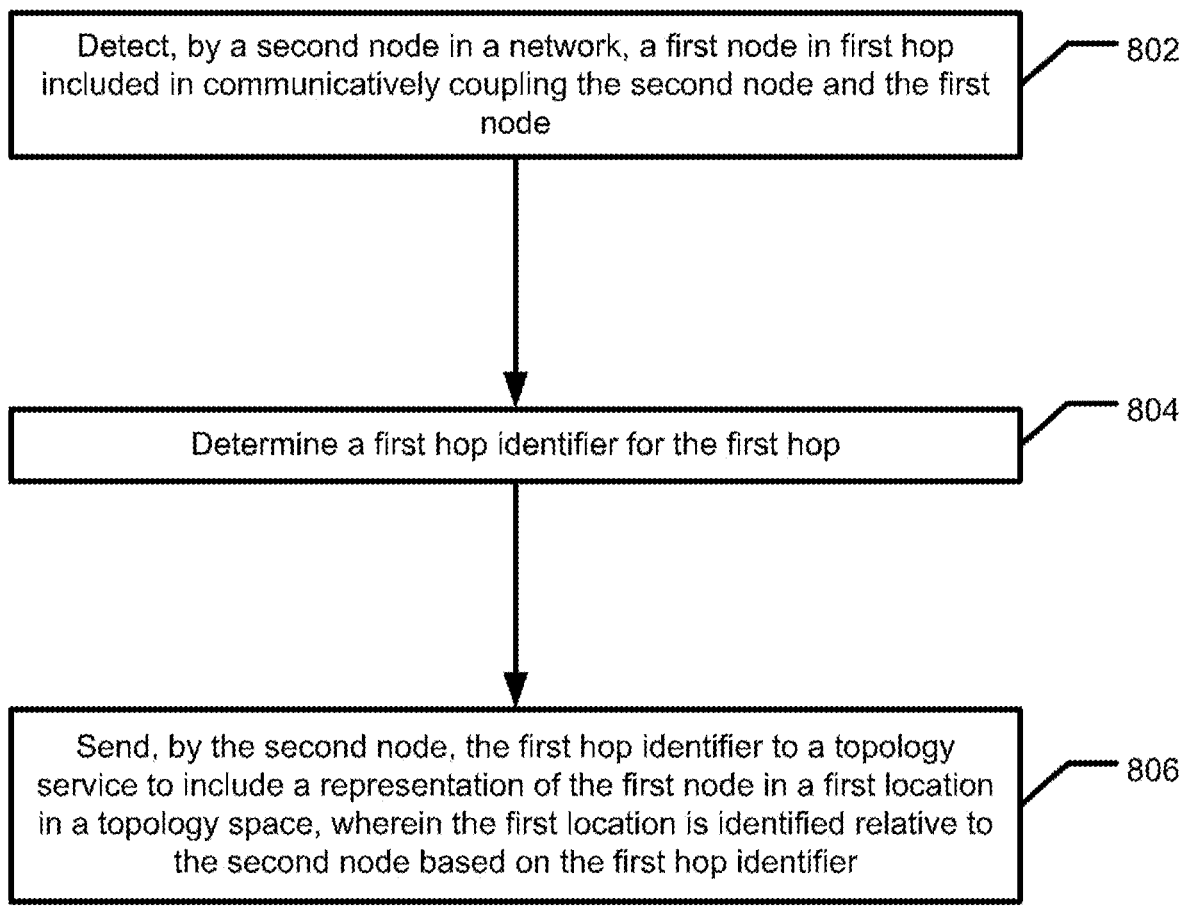
FIG. 8 is a flow diagram illustrating a method for associating a name with a network path according to an aspect of the subject matter described herein.
Figure 9:
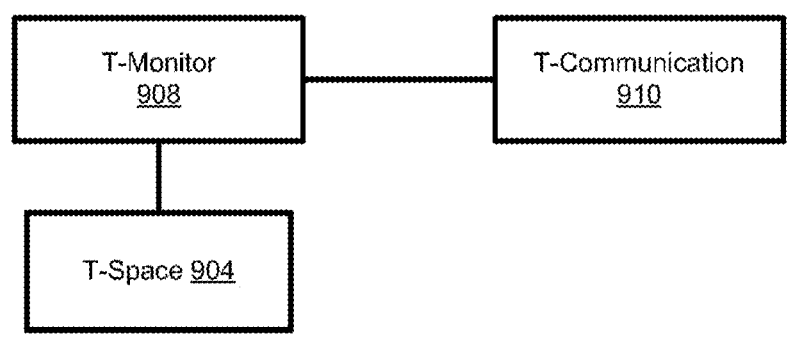
FIG. 9 is a block diagram illustrating an arrangement of components for associating a name with a network path according to another aspect of the subject matter described herein.

FIG. 9 illustrates an arrangement of components that may operate in an execution environment, such as execution environment 102 in FIG. 1 to perform a method illustrated in FIG. 8. The system illustrated by the arrangement includes a topology monitor (t-monitor) component 908 including one or more instructions to detect a hop in a network, a topology space (t-space) component 904 including one or more instructions for maintaining and/or reporting network topology information, and a topology communication component 910. A suitable execution environment includes a processor, such as processor 104, to process an instruction in at least one of a topology monitor component, a topology space component, and a topology space component.

FIGS. 4A-B are block diagrams illustrating the components of FIG. 9 and/or analogs of the components of FIG. 9 adapted for operation in an execution environment 401 that includes and/or otherwise is provided by one or more nodes. Those skilled in the art will understand that other execution environments in addition to the various adaptations, analogs, and instances of the execution environments described herein are suitable for hosting an adaptation of the arrangement in FIG. 9.

A block 802, FIG. 8, illustrates that the method includes detecting, by a second node in a network, a first node in first hop included in communicatively coupling the second node and the first node. Accordingly, the system in FIG. 9 includes means for detecting, by a second node in a network, a first node in first hop included in communicatively coupling the second node and the first node. For example, the arrangement in FIG. 9, includes a topology monitor component 908 that is operable for and/or is otherwise included in detecting, by a second node in a network, a first node in first hop included in communicatively coupling the second node and the first node. The system includes one or more processors and logic encoded in one or more computer readable media for execution by the one or more processors that when executed is operable for and/or is otherwise included in detecting, by a second node in a network, a first node in first hop included in communicatively coupling the second node and the first node.

FIGS. 4A-B illustrate topology monitor components 408 as adaptations and/or analogs of the topology monitor component 908 in FIG. 9. One or more topology monitor components 408 operate in an execution environment 401. In FIG. 4A, a topology monitor component 408a is illustrated as a component of a t-space component 404a. In FIG. 4B, a topology monitor component 408b is illustrated as a component of a t-service 405b. A node 502 may include a topology monitor component 408a and/or a topology monitor component 408b. A path node 504 may also include an adaptation and/or an analog of a topology monitor component.

With reference to FIG. 8, a block 814 illustrates that the method includes determining a first hop identifier for the first hop. Accordingly, the system in FIG. 9 includes means for determining a first hop identifier for the first hop. For example, the arrangement in FIG. 9 includes topology space (t-space) component 904 that is operable for and/or is otherwise included in determining a first hop identifier for the first hop. The system includes one or more processors and logic encoded in one or more computer readable media for execution by the one or more processors that when executed is operable for and/or is otherwise included in determining a first hop identifier for the first hop.

FIGS. 4A-B illustrate topology space components 404 as adaptations and/or analogs of the topology space component 904 in FIG. 9. One or more topology space components 404 operate in an execution environment 401. In FIG. 4A, a topology space component 404a is illustrated operating in execution environment 402a. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

With reference to FIG. 8, a block 816 illustrates that the method includes sending, by the second node, the first hop identifier to a topology service to include a representation of the first node in a first location in a topological space, wherein the first location is identified relative to the second node based on the first hop identifier. Accordingly, the system in FIG. 9 includes means for sending, by the second node, the first hop identifier to a topology service to include a representation of the first node in a first location in a topological space, wherein the first location is identified relative to the second node based on the first hop identifier. For example, the arrangement in FIG., includes topology communication component 910 that is operable for and/or is otherwise included in sending, by the second node, the first hop identifier to a topology service to include a representation of the first node in a first location in a topological space, wherein the first location is identified relative to the second node based on the first hop identifier. The system includes one or more processors and logic encoded in one or more computer readable media for execution by the one or more processors that when executed is operable for and/or is otherwise included in sending, by the second node, the first hop identifier to a topology service to include a representation of the first node in a first location in a topological space, wherein the first location is identified relative to the second node based on the first hop identifier.

FIGS. 4A-B illustrate topology communication components 410 as adaptations and/or analogs of the topology communication component 910 in FIG. 9. One or more topology communication components 410 operate in an execution environment 401. In FIG. 4A, a topology communication component 410. In FIG. 4B, a topology communication component 410b is illustrated as a component of a t-service 405b. A node 502 may include a topology communication component 410a and/or a topology communication component 410b. A path node 504 may also include an adaptation and/or an analog of a topology communication component.

Figure 7B:
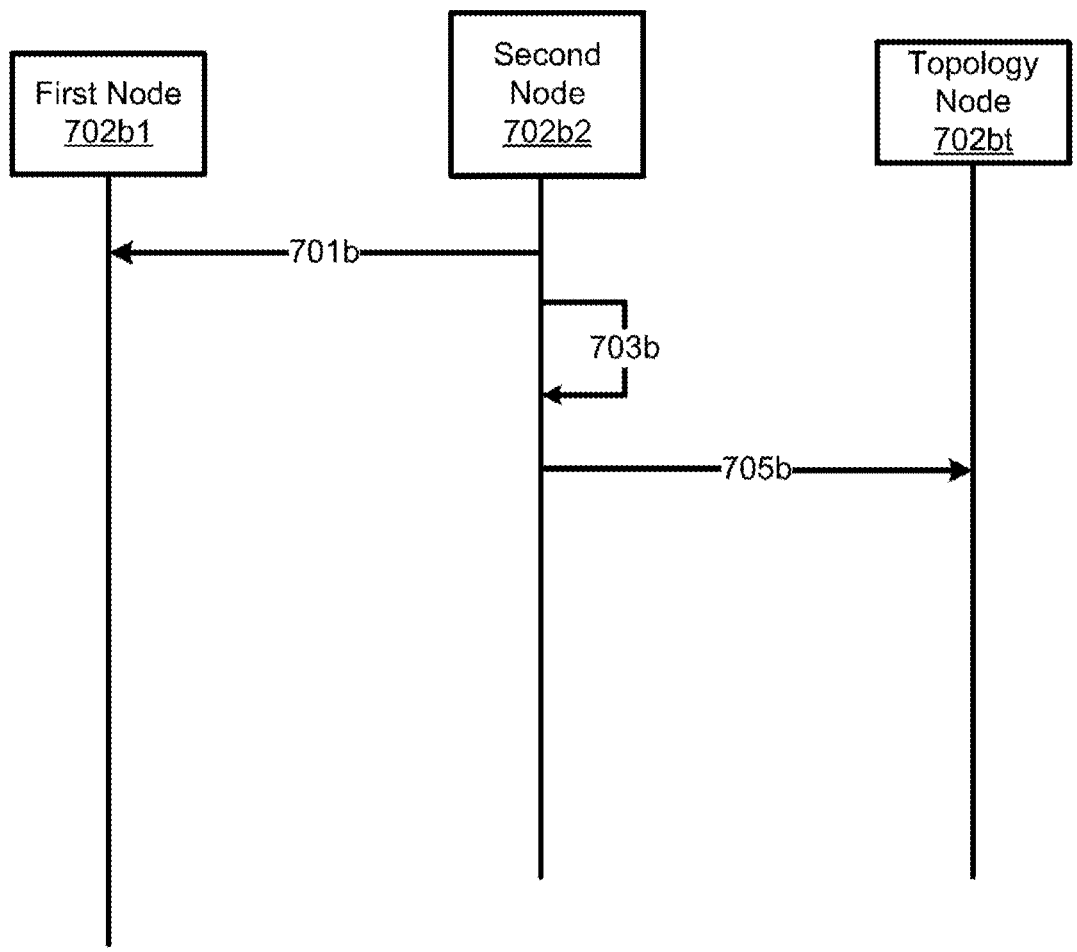
FIG. 7B is a message flow diagram illustrating messages exchanged between nodes in another aspect of the subject matter described herein.

With respect to FIG. 7B, the second node 702b2 is included in and/or otherwise provides an instance of the execution environment 401a including a t-communication component 410a. A topology node 702bt, in the aspect, may host a t-service. The second node 702b2 may host a t-communication component compatible with the t-service in the topology node 702bt. FIG. 7B illustrates a first message 701b exchanged between a first node 702b1 and the second node 702b2. A topology monitor component 408a in the second node 702a2 may detect, based on address information in a data unit included in the exchange, that the first node is in first hop included in communicatively coupling the second node and the first node. The address information may be in a data unit of a link layer protocol and/or a higher layer protocol. The t-monitor component may operate in an appropriate protocol layer of a network stack in the second node 702a2.

A second message 703b illustrates a data flow, in the second node, including the topology space component 404a, operating to determine a first hop identifier for the first hop. See application Ser. No. 13/727,649 filed on 2012 Dec. 27, entitled "Methods, Systems, and Computer Program Products for Assigning an Interface Identifier to a Network Interface", application Ser. No. 13/727,655 filed on 2012 Dec. 27, entitled "Methods, Systems, and Computer Program Products for Determining a Shared identifier for a Hop in a Network"; and application Ser. No. 13/727,657 filed on 2012 Dec. 27, entitled "Methods, Systems, and Computer Program Products for Determining a Hop Identifier for a Network Protocol".

A third message 705b illustrates a message sent by a t-communication component 410a in the second node 702b2 to send the first hop identifier to a topology service 405b in the topology node 702bt to include a representation of the first node in a first location in a topological space. The first location is identified relative to the second node based on the first hop identifier.

Figure 10:
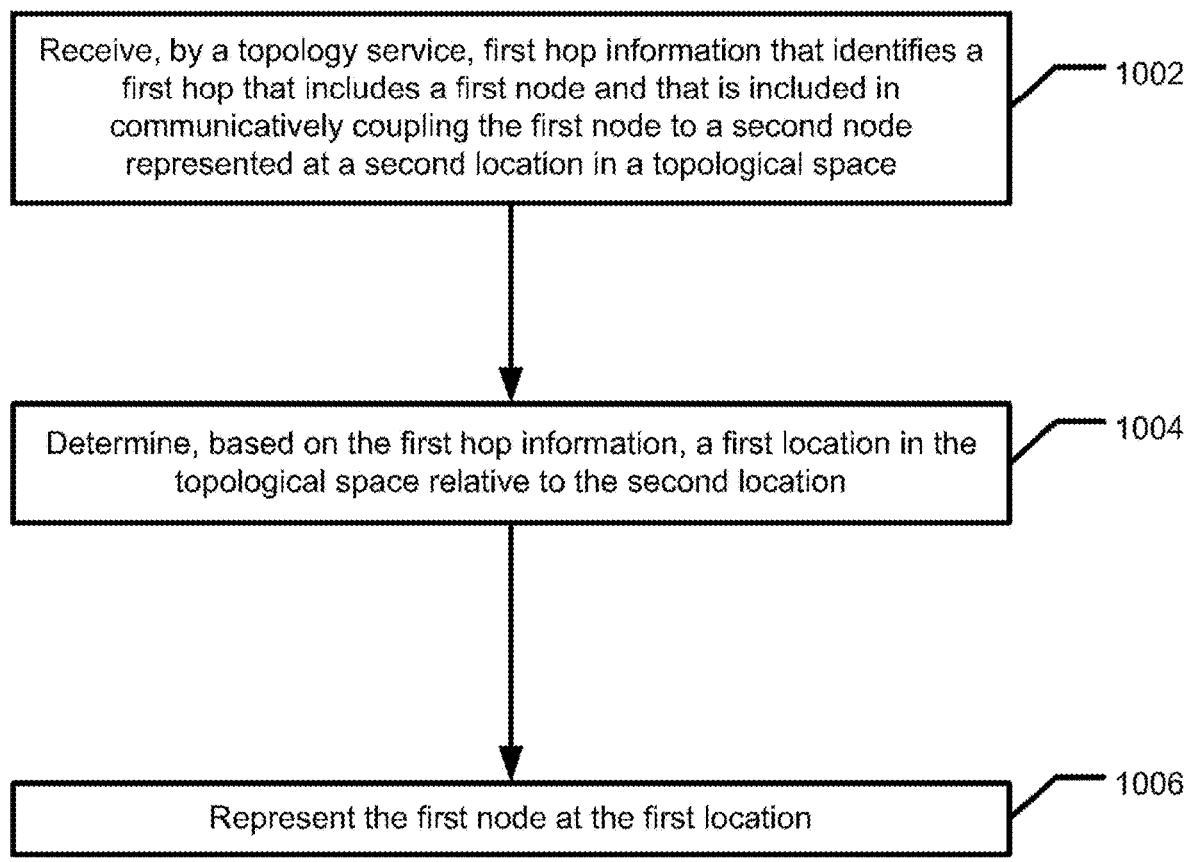
FIG. 10 is a flow diagram illustrating a method for associating a name with a network path according to an aspect of the subject matter described herein.
Figure 11:
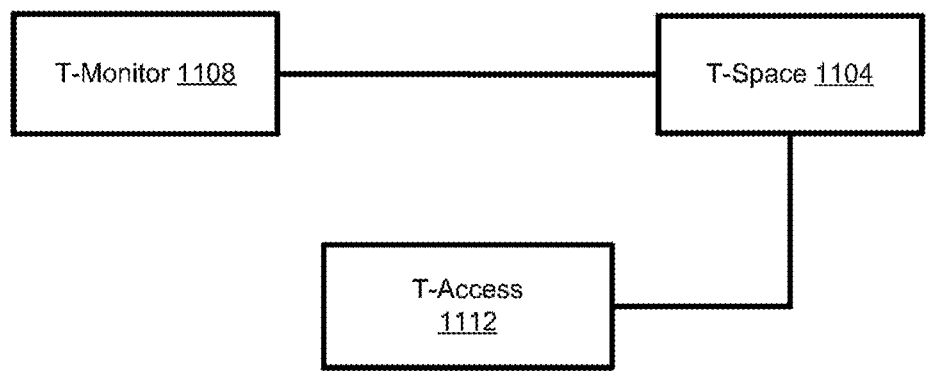
FIG. 11 is a block diagram illustrating an arrangement of components for associating a name with a network path according to another aspect of the subject matter described herein.

FIG. 11 illustrates an arrangement of components that may operate in an execution environment, such as execution environment 102 in FIG. 1 to perform a method illustrated in FIG. 10. The system illustrated by the arrangement includes a topology monitor component 1108, a topology space component 1104, and a topology access component 1112. A suitable execution environment includes a processor, such as processor 104, to process an instruction in at least one of a topology monitor component, a topology space component, and a topology access component. Those skilled in the art will understand that other execution environments in addition to the various adaptations, analogs, and instances of the execution environments described herein are suitable for hosting an adaptation of the arrangement in FIG. 10.

With reference to FIG. 10, a block 1002 illustrates that the method includes receiving, by a topology service, first hop information that identifies a first hop that includes a first node and that is included in communicatively coupling the first node to a second node represented at a second location in a topological space. Accordingly, a system for associating a name with a network path includes means for receiving, by a topology service, first hop information that identifies a first hop that includes a first node and that is included in communicatively coupling the first node to a second node represented at a second location in a topological space. For example, the arrangement in FIG. 11, includes topology monitor component 1108 that is operable for and/or is otherwise included in receiving, by a topology service, first hop information that identifies a first hop that includes a first node and that is included in communicatively coupling the first node to a second node represented at a second location in a topological space. The system for associating a name with a network path includes one or more processors and logic encoded in one or more computer readable media for execution by the one or more processors that when executed is operable for and/or is otherwise included in receiving, by a topology service, first hop information that identifies a first hop that includes a first node and that is included in communicatively coupling the first node to a second node represented at a second location in a topological space.

FIGS. 4A-B illustrate topology monitor components 408 as adaptations and/or analogs of the topology monitor component 1108 in FIG. 11. One or more topology monitor components 408 operate in an execution environment 401. In FIG. 4A, and topology monitor component 408a is illustrated as a component of a network layer component 415a. In FIG. 4B, a topology monitor component 408b is illustrated as a component of a t-service 405b. A node 502 may include a topology monitor component 408a and/or a topology monitor component 408b. A path node 504 may also include an adaptation and/or an analog of a topology monitor component.

With reference to FIG. 10, a block 1004 illustrates that the method includes determining, based on the first hop information, a first location in the topological space relative to the second location. Accordingly, a system for associating a name with a network path includes means for determining, based on the first hop information, a first location in the topological space relative to the second location. For example, the arrangement in FIG. 11 includes topology space component 1104 that is operable for and/or is otherwise included in determining, based on the first hop information, a first location in the topological space relative to the second location. The system for associating a name with a network path includes one or more processors and logic encoded in one or more computer readable media for execution by the one or more processors that when executed is operable for and/or is otherwise included in determining, based on the first hop information, a first location in the topological space relative to the second location.

FIGS. 4A-B illustrate topology space components 404 as adaptations and/or analogs of the topology space component 1124 in FIG. 11. One or more topology space components 424 operate in an execution environment 401. In FIG. 4A, and topology space component 404a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

With reference to FIG. 10, a block 1006 illustrates that the method includes representing the first node at the first location. Accordingly, a system for associating a name with a network path includes means for representing the first node at the first location. For example, the arrangement in FIG. 11 includes topology access component 1112 that is operable for and/or is otherwise included in representing the first node at the first location. The system for associating a name with a network path includes one or more processors and logic encoded in one or more computer readable media for execution by the one or more processors that when executed is operable for and/or is otherwise included in representing the first node at the first location.

FIGS. 4A-B illustrate topology access components 412 as adaptations and/or analogs of the topology access component 1112 in FIG. 11. One or more topology access components 412 operate in an execution environment 401. In FIG. 4A, a topology access component 412a may be included in an execution environment 401a to access a topology data store 433a, which may include cached topology data and/or a representation of a portion of a topological space in which a portion of the network is represented. In FIG. 4B, a topology access component 412b is illustrated as a component of a t-service 405b. A node 502 may include a topology access component 412a and/or a topology access component 412b. A path node 504 may also include an adaptation and/or an analog of a topology access component.

Figure 7C:
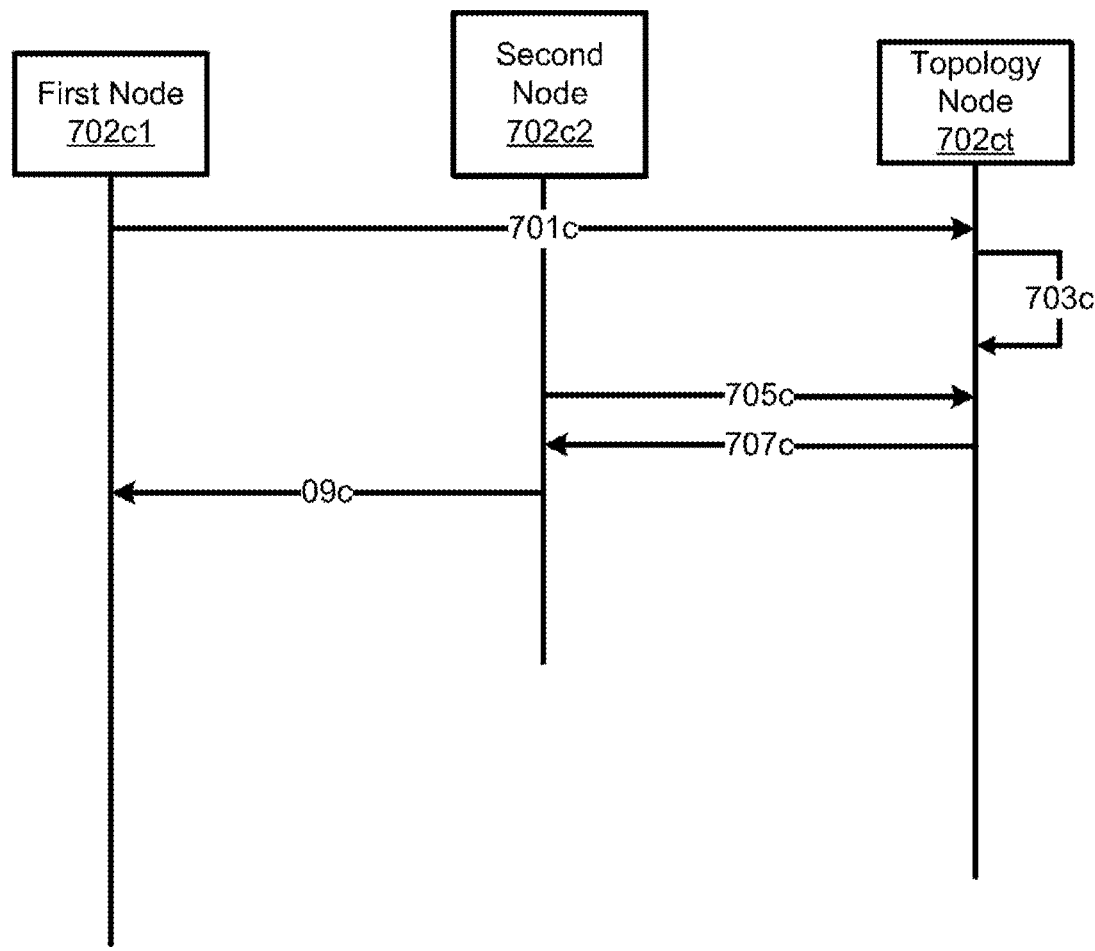
FIG. 7C is a message flow diagram illustrating messages exchanged between nodes in another aspect of the subject matter described herein.

With respect to FIG. 7C, a first node 702c2 may be included in and/or otherwise provide an instance of an execution environment 401 including a t-communication component 410. The topology node 702ct, in the aspect, may host a t-service. The first node 702c2 may host a t-communication component compatible with the t-service in the topology node 702ct. FIG. 7C illustrates a first message 701c exchanged between a first node 702c1 and the topology node 702ct. The first message 701c may include first hop information that identifies a first hop that includes the first node 702c1 and that is included in communicatively coupling the first node to a second node 702c2. The second node is represented in a topological space at a second location by a t-access component 412b. The first hop information may be detected and/or otherwise may be received by a topology monitor component 408b in the topology node 702ct.

A topology monitor component 408 in the second node 702c2 may detect, based on address information in a data unit included in the exchange, that the first node 702c1 is in the first hop that is included in communicatively coupling the second node 702c2 and the first node 702c1. The address information may be in a data unit of a link layer protocol and/or a higher layer protocol. A t-monitor component may operate in an appropriate protocol layer of a network stack in the second node 702c2. A second message 703c illustrates a data flow, in the topology node 702ct, including the topology space component 404b, operating to determine a first location in the topological space relative to the second location, based on the hop information. A third message 705c illustrates a data flow including a t-access component 412b and the t-space component 404b that operate to associate the first node 702a1 and/or an identifier (such as a symbolic identifier) of the first node 702a1 with the first location in the topological space stored in a topology data store 433b.

Figure 12:
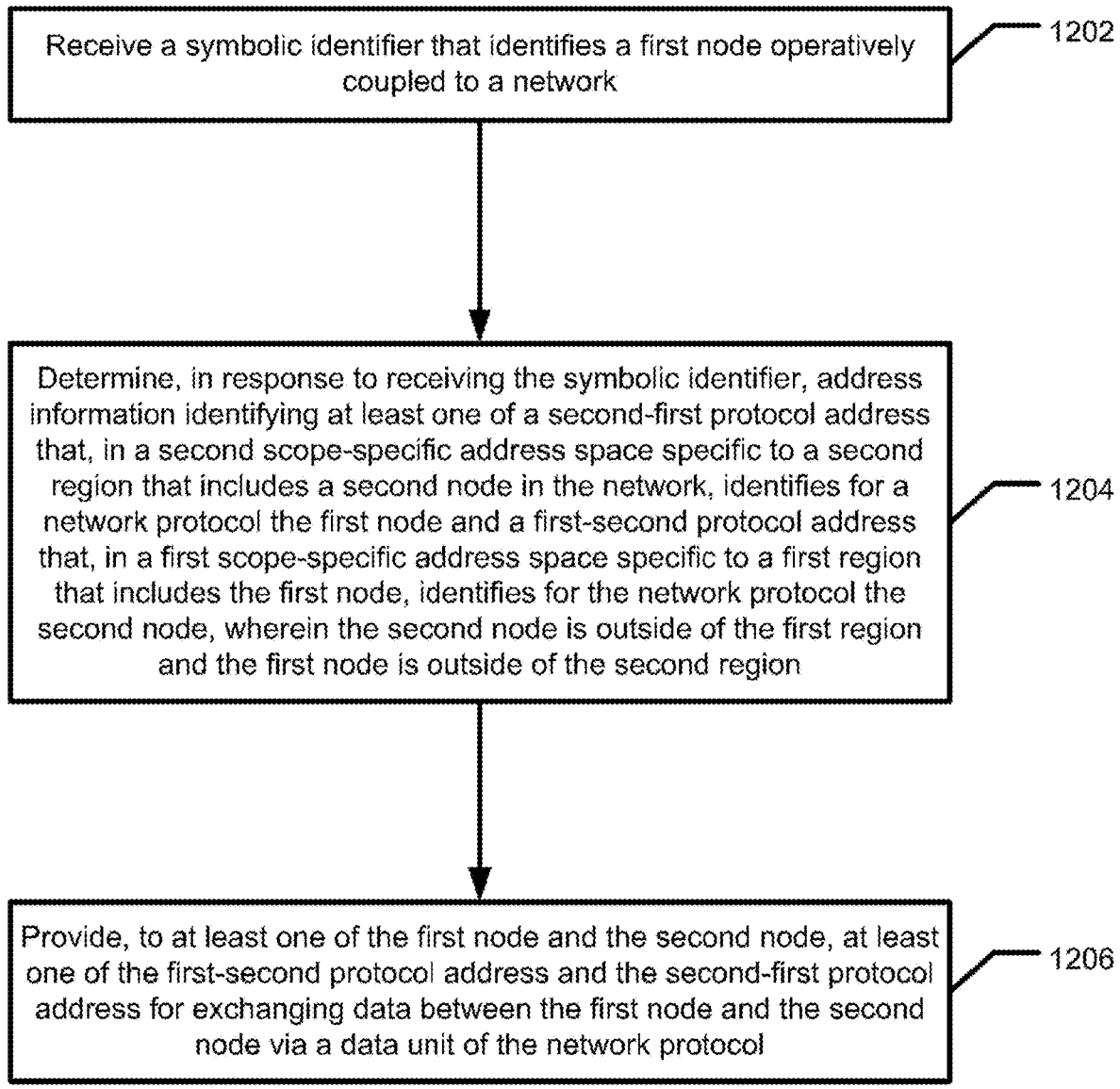
FIG. 12 is a flow diagram illustrating a method for associating a name with a network path according to an aspect of the subject matter described herein.
Figure 13:
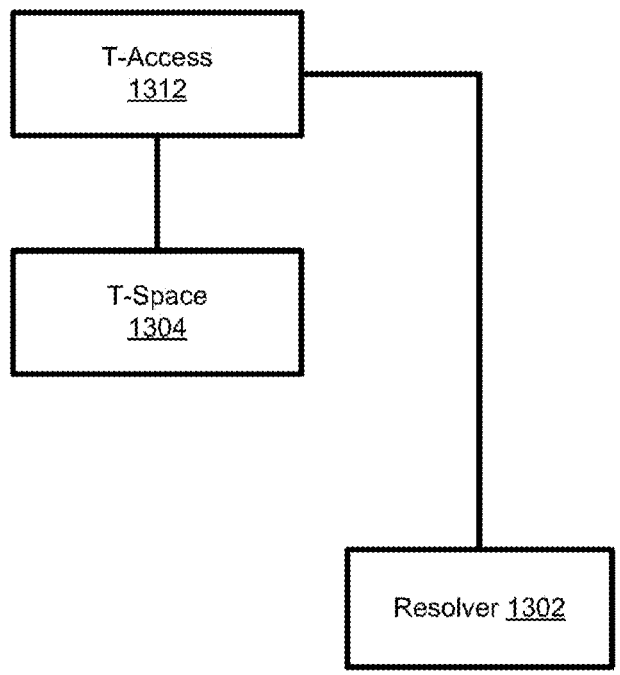
FIG. 13 is a block diagram illustrating an arrangement of components for associating a name with a network path according to another aspect of the subject matter described herein.

FIG. 13 illustrates an arrangement of components that may operate in an execution environment, such as execution environment 102 in FIG. 1 to perform a method illustrated in FIG. 12. The system illustrated by the arrangement includes a resolver component 1302, a topology access component 1312, and a topology space component 1304. A suitable execution environment includes a processor, such as processor 104, to process an instruction in at least one of a resolver component, a topology access component, and a topology space component. Those skilled in the art will understand that other execution environments in addition to the various adaptations, analogs, and instances of the execution environments described herein are suitable for hosting an adaptation of the arrangement in FIG. 12.

With reference to FIG. 12, a block 1202 illustrates that the method includes receiving a symbolic identifier that identifies a first node communicatively coupled to a network. Accordingly, a system for associating a name with a network path includes means for receiving a symbolic identifier that identifies a first node communicatively coupled to a network. For example, the arrangement in FIG. 13 includes resolver component 1302 that is operable for and/or is otherwise included in receiving a symbolic identifier that identifies a first node communicatively coupled to a network. The system for associating a name with a network path includes one or more processors and logic encoded in one or more computer readable media for execution by the one or more processors that when executed is operable for and/or is otherwise included in receiving a symbolic identifier that identifies a first node communicatively coupled to a network.

FIGS. 4A-B illustrate resolver components 402 as adaptations and/or analogs of the resolver component 1302 in FIG. 13. One or more resolver components 402 operate in an execution environment 401. In FIG. 4A, and resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

With reference to FIG. 12, a block 1234 illustrates that the method includes determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. Accordingly, a system for associating a name with a network path includes means for determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. For example, the arrangement in FIG. 13, includes topology access component 1312 that is operable for and/or is otherwise included in determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region. The system for associating a name with a network path includes one or more processors and logic encoded in one or more computer readable media for execution by the one or more processors that when executed is operable for and/or is otherwise included in determining, in response to receiving the symbolic identifier, address information identifying at least one of a second-first protocol address that, in a second scope-specific address space specific to a second region that includes a second node in the network, identifies for a network protocol the first node and a first-second protocol address that, in a first scope-specific address space specific to a first region that includes the first node, identifies for the network protocol the second node, wherein the second node is outside of the first region and the first node is outside of the second region.

FIGS. 4A-B illustrate topology access components 412 as adaptations and/or analogs of the topology access component 1312 in FIG. 13. One or more topology access components 412 operate in an execution environment 401. In FIG. 4A, a topology access component is 412a illustrated. In FIG. 4B, a topology access component 412b is illustrated as a component of a t-service 405b. A node 502 may include a topology access component 412a and/or a topology access component 412b. A path node 504 may also include an adaptation and/or an analog of a topology access component.

With reference to FIG. 12, a block 1206 illustrates that the method includes providing, to at least one of the first node and the second node, at least one of the first-second protocol address and the second-first protocol address for exchanging data between the first node and the second node via a data unit of the network protocol. Accordingly, a system for associating a name with a network path includes means for providing, to at least one of the first node and the second node, at least one of the first-second protocol address and the second-first protocol address for exchanging data between the first node and the second node via a data unit of the network protocol. For example, the arrangement in FIG. 13, includes topology space component 1304 that is operable for and/or is otherwise included in providing, to at least one of the first node and the second node, at least one of the first-second protocol address and the second-first protocol address for exchanging data between the first node and the second node via a data unit of the network protocol. The system for associating a name with a network path includes one or more processors and logic encoded in one or more computer readable media for execution by the one or more processors that when executed is operable for and/or is otherwise included in providing, to at least one of the first node and the second node, at least one of the first-second protocol address and the second-first protocol address for exchanging data between the first node and the second node via a data unit of the network protocol.

FIGS. 4A-B illustrate topology space components 404 as adaptations and/or analogs of the topology space component 1304 in FIG. 13. One or more topology space components 404 operate in an execution environment 401. In FIG. 4A, a topology space component 404a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

Figure 7D:
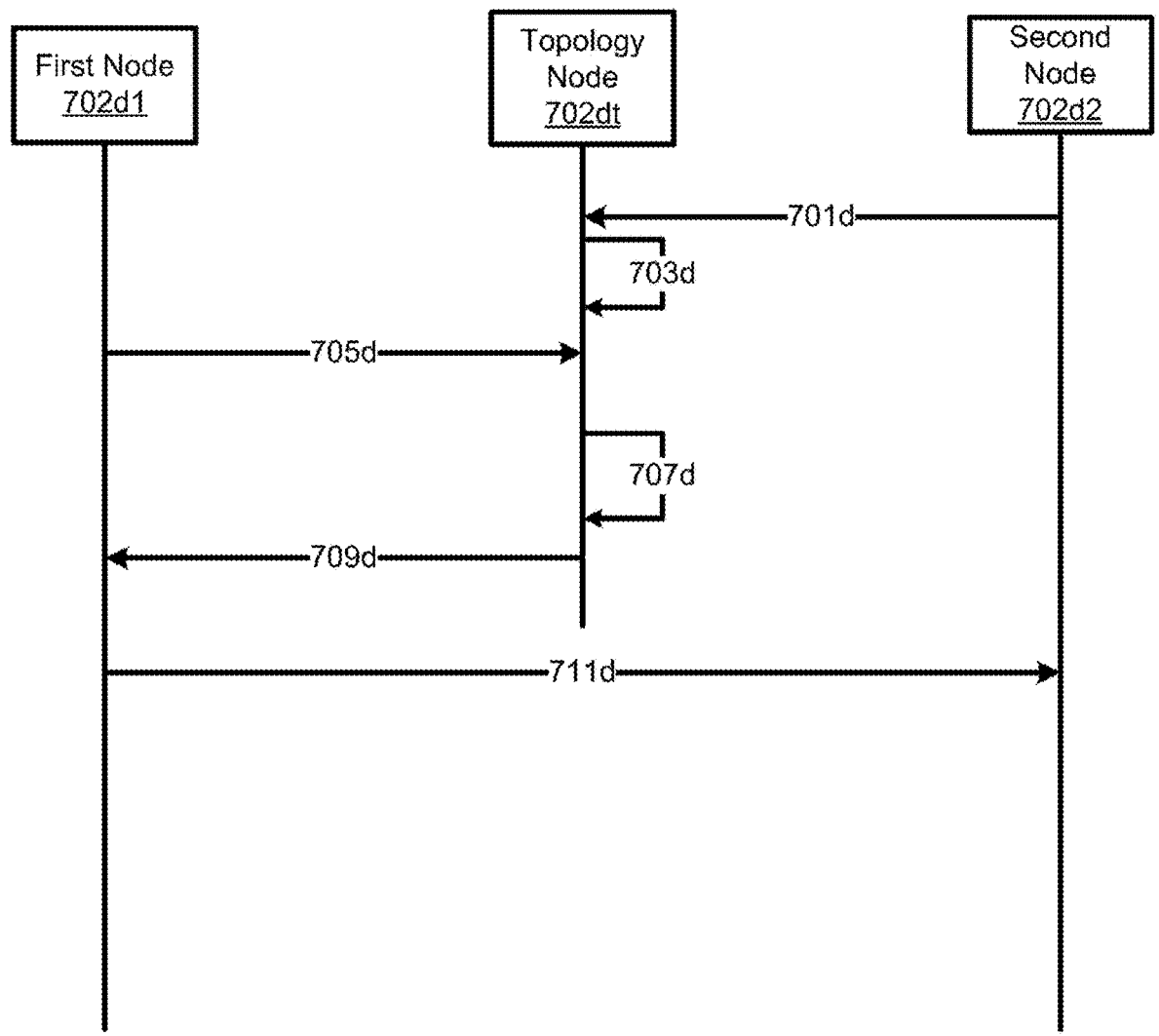
FIG. 7D is a message flow diagram illustrating messages exchanged between nodes in another aspect of the subject matter described herein.

With respect to FIG. 7D, a second node 702d2 may be included in and/or otherwise provide an instance of an execution environment 401 including a t-communication component 410. A topology node 702dt, in the aspect, may host a t-service. The second node 702d2 may host a t-communication component compatible with the t-service in the topology node 702dt. FIG. 7D illustrates a first message 701d exchanged between the second node 702d2 and the topology node 702dt. The first message 701d may include a symbolic identifier that identifies a first node 702d1 operatively coupled to a network. The symbolic identifier may be received by a resolver component 702b in the topology node 702dt. The resolver component 402b may interoperate with a t-access component 412b illustrated by a second message 703d. The interoperation may be direct and/or indirect. The interoperation may be performed to determine, in response to receiving the symbolic identifier, address information identifying at least one of a second-first protocol address that, in a second scope-specific address space specific to a second region that includes the second node 702d2 in the network, identifies for a network protocol the first node 702d1 and a first-second protocol address that, in a first scope-specific address space specific to a first region that includes the first node 702d1, identifies for the network protocol the second node 702d2, wherein the second node 702d2 is outside of the first region and the first node 702d1 is outside of the second region. A third message 705d illustrates interoperation between a t-space component 404b and a t-communication component 410b to provide address information based on the location information to at least one of the first node 702d1 and the second node 702d2 to allow the first node 702d1 and the second node 702d2 to exchange, based on at least one of the first-second protocol address and the second-first protocol address, data via a data unit of a network protocol FIG. 15 illustrates an arrangement of components that may operate in an execution environment, such as execution environment 102 in FIG. 1 to perform a method illustrated in FIG. 14. The system illustrated by the arrangement includes a topology monitor component 1508, a topology relay component 1506, a topology space component 15042 and a resolver component 1502. A suitable execution environment includes a processor, such as processor 104, to process an instruction in at least one of a topology monitor component, a topology relay component, a topology space component, and a resolver component. Those skilled in the art will understand that other execution environments in addition to the various adaptations, analogs, and instances of the execution environments described herein are suitable for hosting an adaptation of the arrangement in FIG. 14.

Figure 14:
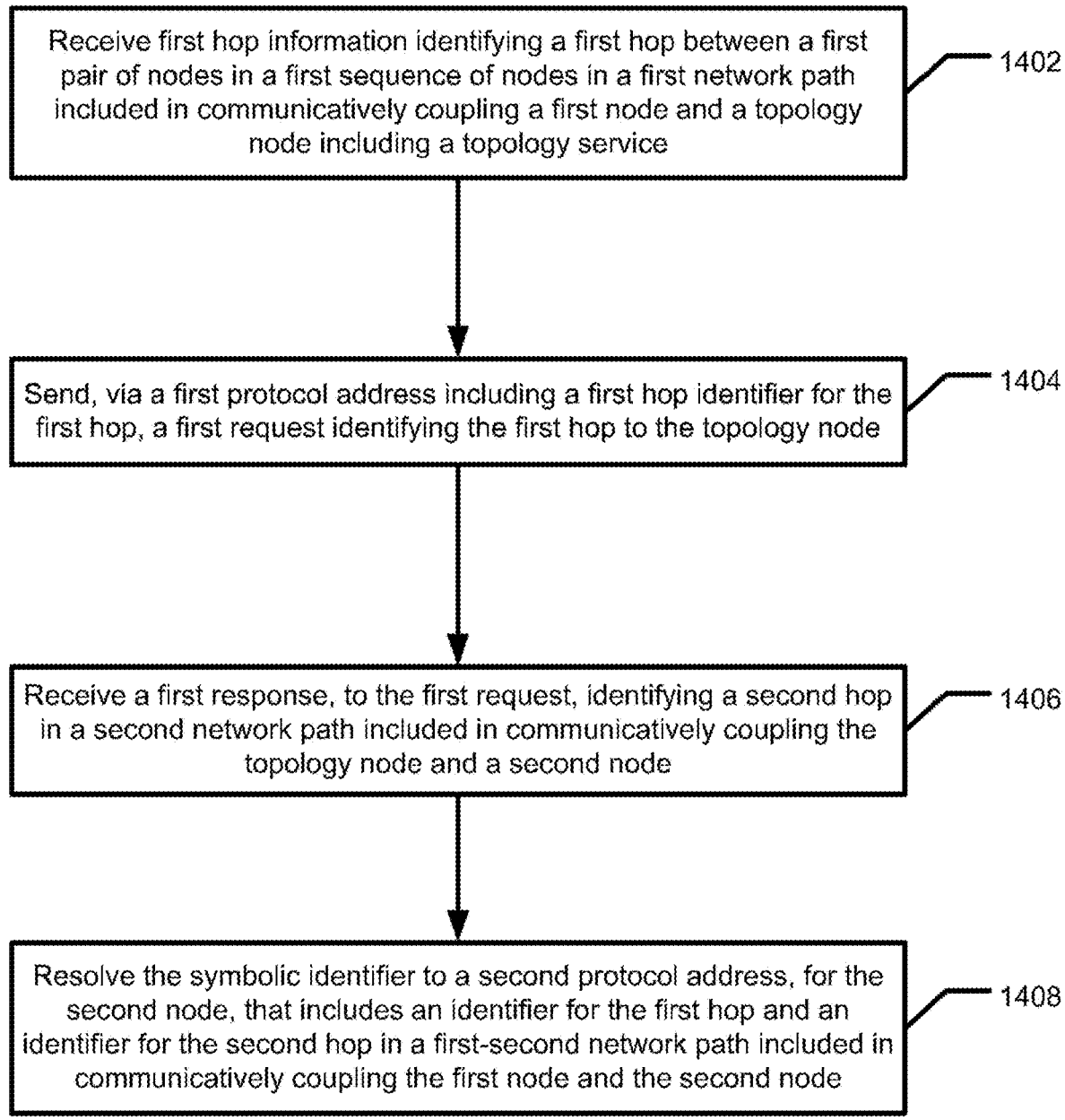
FIG. 14 is a flow diagram illustrating a method for associating a name with a network path according to an aspect of the subject matter described herein.
Figure 15:
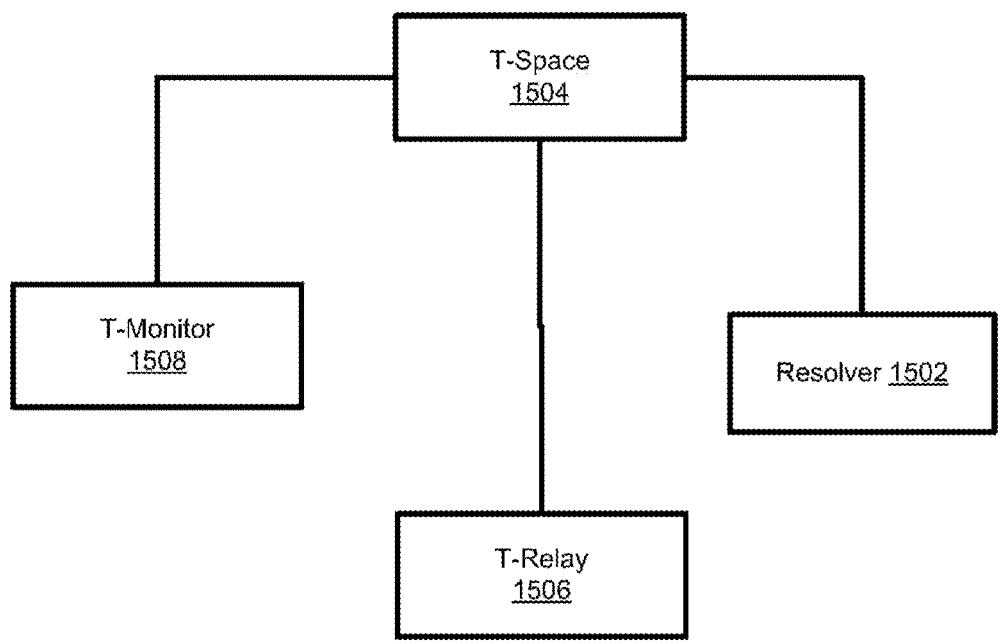
FIG. 15 is a block diagram illustrating an arrangement of components for associating a name with a network path according to another aspect of the subject matter described herein.

With reference to FIG. 14, a block 1402 illustrates that the method includes receiving first hop information identifying a first hop between a first pair of nodes in a first sequence of nodes in a first network path included in communicatively coupling a first node and a topology node including a topology service. Accordingly, a system for associating a name with a network path includes means for receiving first hop information identifying a first hop between a first pair of nodes in a first sequence of nodes in a first network path included in communicatively coupling a first node and a topology node including a topology service. For example, the arrangement in FIG. 15, includes topology monitor component 1508 that is operable for and/or is otherwise included in receiving first hop information identifying a first hop between a first pair of nodes in a first sequence of nodes in a first network path included in communicatively coupling a first node and a topology node including a topology service. The system for associating a name with a network path includes one or more processors and logic encoded in one or more computer readable media for execution by the one or more processors that when executed is operable for and/or is otherwise included in receiving first hop information identifying a first hop between a first pair of nodes in a first sequence of nodes in a first network path included in communicatively coupling a first node and a topology node including a topology service.

FIGS. 4A-B illustrate topology monitor components 408 as adaptations and/or analogs of the topology monitor component 1508 in FIG. 15. One or more topology monitor components 408 operate in an execution environment 401. In FIG. 4A, and topology monitor component 408*a* is illustrated. In FIG. 4B, a topology monitor component 408*b* is illustrated as a component of a t-service 405*b*. A node 502 may include a topology monitor component 408*a* and/or a topology monitor component 408*b*. A path node 504 may also include an adaptation and/or an analog of a topology monitor component.

With reference to FIG. 14, a block 1404 illustrates that the method includes sending, via a first protocol address including a first hop identifier for the first hop, a first request identifying the first hop to the topology node. Accordingly, a system for associating a name with a network path includes means for sending, via a first protocol address including a first hop identifier for the first hop, a first request identifying the first hop to the topology node. For example, the arrangement in FIG. 15 includes topology relay component 1506 that is operable for and/or is otherwise included in sending, via a first protocol address including a first hop identifier for the first hop, a first request identifying the first hop to the topology node. The system for associating a name with a network path includes one or more processors and logic encoded in one or more computer readable media for execution by the one or more processors that when executed is operable for and/or is otherwise included in sending, via a first protocol address including a first hop identifier for the first hop, a first request identifying the first hop to the topology node.

FIGS. 4A-B illustrate topology relay components 406 as adaptations and/or analogs of the topology relay component 1506 in FIG. 15. One or more topology relay components 406 operate in an execution environment 401. In FIG. 4A, a topology relay component 444*a* is illustrated. In FIG. 4B, a topology relay component 406*b* is illustrated as a component of a t-service 405*b*. A node 502 may include a topology relay component 406*a* and/or a topology relay component 406*b*. A path node 504 may also include an adaptation and/or an analog of a topology relay component.

With reference to FIG. 14, a block 1406 illustrates that the method includes receiving a first response, to the first request, identifying a second hop in a second network path included in communicatively coupling the topology node and a second node. Accordingly, a system for associating a name with a network path includes means for receiving a first response, to the first request, identifying a second hop in a second network path included in communicatively coupling the topology node and a second node. For example, the arrangement in FIG. 15, includes topology space component 1504 that is operable for and/or is otherwise included in receiving a first response, to the first request, identifying a second hop in a second network path included in communicatively coupling the topology node and a second node. The system for associating a name with a network path includes one or more processors and logic encoded in one or more computer readable media for execution by the one or more processors that when executed is operable for and/or is otherwise included in receiving a first response, to the first request, identifying a second hop in a second network path included in communicatively coupling the topology node and a second node.

FIGS. 4A-B illustrate topology space components 404 as adaptations and/or analogs of the topology space component 1546 in FIG. 15. One or more topology space components 404 operate in an execution environment 401. In FIG. 4A, a topology space component 404*a* is illustrated. In FIG. 4B, a topology space component 404*b* is illustrated as a component of a t-service 405*b*. A node 502 may include a topology space component 404*a* and/or a topology space component 404*b*. A path node 504 may also include an adaptation and/or an analog of a topology space component.

With reference to FIG. 14, a block 1408 illustrates that the method includes resolving the symbolic identifier to a second protocol address, for the second node, that includes an identifier for the first hop and an identifier for the second hop in a first-second network path included in communicatively coupling the first node and the second node. Accordingly, a system for associating a name with a network path includes means for resolving the symbolic identifier to a second protocol address, for the second node, that includes an identifier for the first hop and an identifier for the second hop in a first-second network path included in communicatively coupling the first node and the second node. For example, the arrangement in FIG. 15, includes resolver component 1502 that is operable for and/or is otherwise included in resolving the symbolic identifier to a second protocol address, for the second node, that includes an identifier for the first hop and an identifier for the second hop in a first-second network path included in communicatively coupling the first node and the second node. The system for associating a name with a network path includes one or more processors and logic encoded in one or more computer readable media for execution by the one or more processors that when executed is operable for and/or is otherwise included in resolving the symbolic identifier to a second protocol address, for the second node, that includes an identifier for the first hop and an identifier for the second hop in a first-second network path included in communicatively coupling the first node and the second node.

FIGS. 4A-B illustrate resolver components 402 as adaptations and/or analogs of the resolver component 1502 in FIG. 15. One or more resolver components 402 operate in an execution environment 401. In FIG. 4A, and resolver component 402*a* is illustrated as a component of a network layer component 415*a*. In FIG. 4B, a resolver component 402*b* is illustrated as a component of a t-service 405*b*. A node 502 may include a resolver component 402*a* and/or a resolver component 402*b*. A path node 504 may also include an adaptation and/or an analog of a resolver component.

Figure 16:
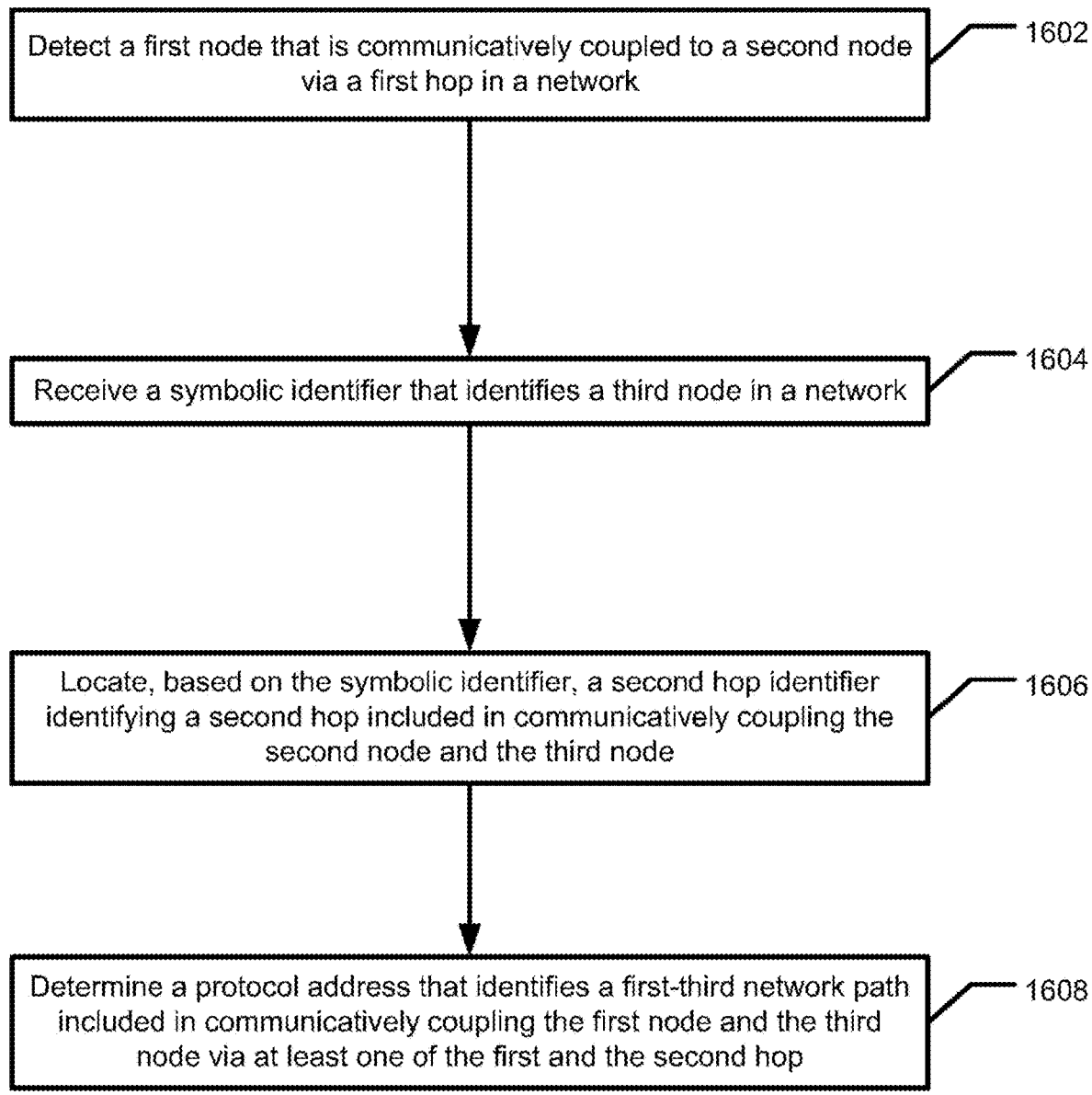
FIG. 16 is a flow diagram illustrating a method for associating a name with a network path according to an aspect of the subject matter described herein.
Figure 17:
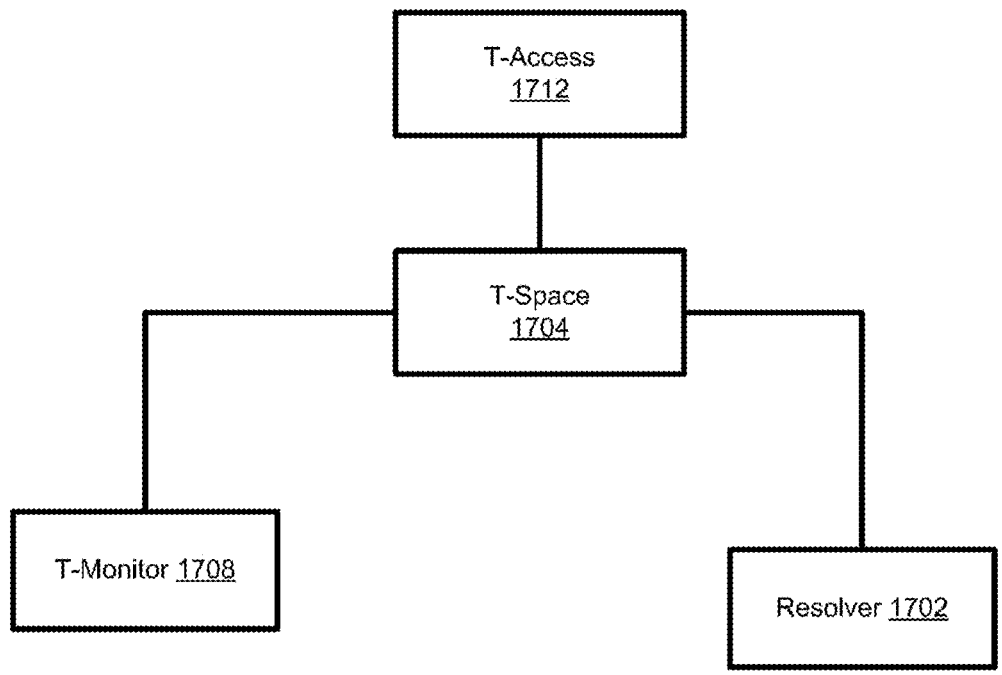
FIG. 17 is a block diagram illustrating an arrangement of components for associating a name with a network path according to another aspect of the subject matter described herein.

FIG. 17 illustrates an arrangement of components that may operate in an execution environment, such as execution environment 102 in FIG. 1 to perform a method illustrated in FIG. 16. The system illustrated by the arrangement includes a topology monitor component 1708, a resolver component 1702, a topology access component 1712, and a topology space component 1704. A suitable execution environment includes a processor, such as processor 104, to process an instruction in at least one of a topology monitor component, a resolver component, a topology access component, and a topology space component. Those skilled in the art will understand that other execution environments in addition to the various adaptations, analogs, and instances of the execution environments described herein are suitable for hosting an adaptation of the arrangement in FIG. 16.

With reference to FIG. 16, a block 1602 illustrates that the method includes detecting a first node that is communicatively coupled to a second node via a first hop in a network. Accordingly, a system for associating a name with a network path includes means for detecting a first node that is communicatively coupled to a second node via a first hop in a network. For example, the arrangement in FIG. 17 includes topology monitor component 1708 that is operable for and/or is otherwise included in detecting a first node that is communicatively coupled to a second node via a first hop in a network. The system for associating a name with a network path includes one or more processors and logic encoded in one or more computer readable media for execution by the one or more processors that when executed is operable for and/or is otherwise included in detecting a first node that is communicatively coupled to a second node via a first hop in a network.

FIGS. 4A-B illustrate topology monitor components 408 as adaptations and/or analogs of the topology monitor component 1702 in FIG. 17. One or more topology monitor components 408 operate in an execution environment 401. In FIG. 4A, a topology monitor component 408a is illustrated as a component of a network layer component 415a. In FIG. 4B, a topology monitor component 408b is illustrated as a component of a t-service 405b. A node 502 may include a topology monitor component 408a and/or a topology monitor component 408b. A path node 504 may also include an adaptation and/or an analog of a topology monitor component.

With reference to FIG. 16, a block 1604 illustrates that the method includes receiving a symbolic identifier that identifies a third node in a network. Accordingly, a system for associating a name with a network path includes means for receiving a symbolic identifier that identifies a third node in a network. For example, the arrangement in FIG. 17, includes resolver component 1702 that is operable for and/or is otherwise included in receiving a symbolic identifier that identifies a third node in a network. The system for associating a name with a network path includes one or more processors and logic encoded in one or more computer readable media for execution by the one or more processors that when executed is operable for and/or is otherwise included in receiving a symbolic identifier that identifies a third node in a network.

FIGS. 4A-B illustrate resolver components 402 as adaptations and/or analogs of the resolver component 1702 in FIG. 17. One or more resolver components 402 operate in an execution environment 401. In FIG. 4A, a resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

With reference to FIG. 16, a block 1606 illustrates that the method includes locating, based on the symbolic identifier, a second hop identifier identifying a second hop included in communicatively coupling the second node and the third node. Accordingly, a system for associating a name with a network path includes means for locating, based on the symbolic identifier, a second hop identifier identifying a second hop included in communicatively coupling the second node and the third node. For example, the arrangement in FIG. 17 includes topology access component 1712 that is operable for and/or is otherwise included in locating, based on the symbolic identifier, a second hop identifier identifying a second hop included in communicatively coupling the second node and the third node. The system for associating a name with a network path includes one or more processors and logic encoded in one or more computer readable media for execution by the one or more processors that when executed is operable for and/or is otherwise included in locating, based on the symbolic identifier, a second hop identifier identifying a second hop included in communicatively coupling the second node and the third node.

FIGS. 4A-B illustrate topology access components 412 as adaptations and/or analogs of the topology access component 1712 in FIG. 17. One or more topology access components 412 operate in an execution environment 401. In FIG. 4A, a topology access component 412a is illustrated. In FIG. 4B, a topology access component 412b is illustrated as a component of a t-service 405b. A node 502 may include a topology access component 412a and/or a topology access component 412b. A path node 504 may also include an adaptation and/or an analog of a topology access component.

With reference to FIG. 16, a block 1608 illustrates that the method includes determining a protocol address that identifies a first-third network path included in communicatively coupling the first node and the third node via at least one of the first and the second hop. Accordingly, a system for associating a name with a network path includes means for determining a protocol address that identifies a first-third network path included in communicatively coupling the first node and the third node via at least one of the first and the second hop. For example, the arrangement in FIG. 17 includes topology space component 1704 that is operable for and/or is otherwise included in determining a protocol address that identifies a first-third network path included in communicatively coupling the first node and the third node via at least one of the first and the second hop. The system for associating a name with a network path includes one or more processors and logic encoded in one or more computer readable media for execution by the one or more processors that when executed is operable for and/or is otherwise included in determining a protocol address that identifies a first-third network path included in communicatively coupling the first node and the third node via at least one of the first and the second hop.

FIGS. 4A-B illustrate topology space components 404 as adaptations and/or analogs of the topology space component 1704 in FIG. 17. One or more topology space components 404 operate in an execution environment 401. In FIG. 4A, a topology space component 404a is illustrated. In FIG. 4B, a resolver component 402b is illustrated as a component of a t-service 405b. A node 502 may include a topology space component 404a and/or a topology space component 404b. A path node 504 may also include an adaptation and/or an analog of a topology space component.

Figure 18:
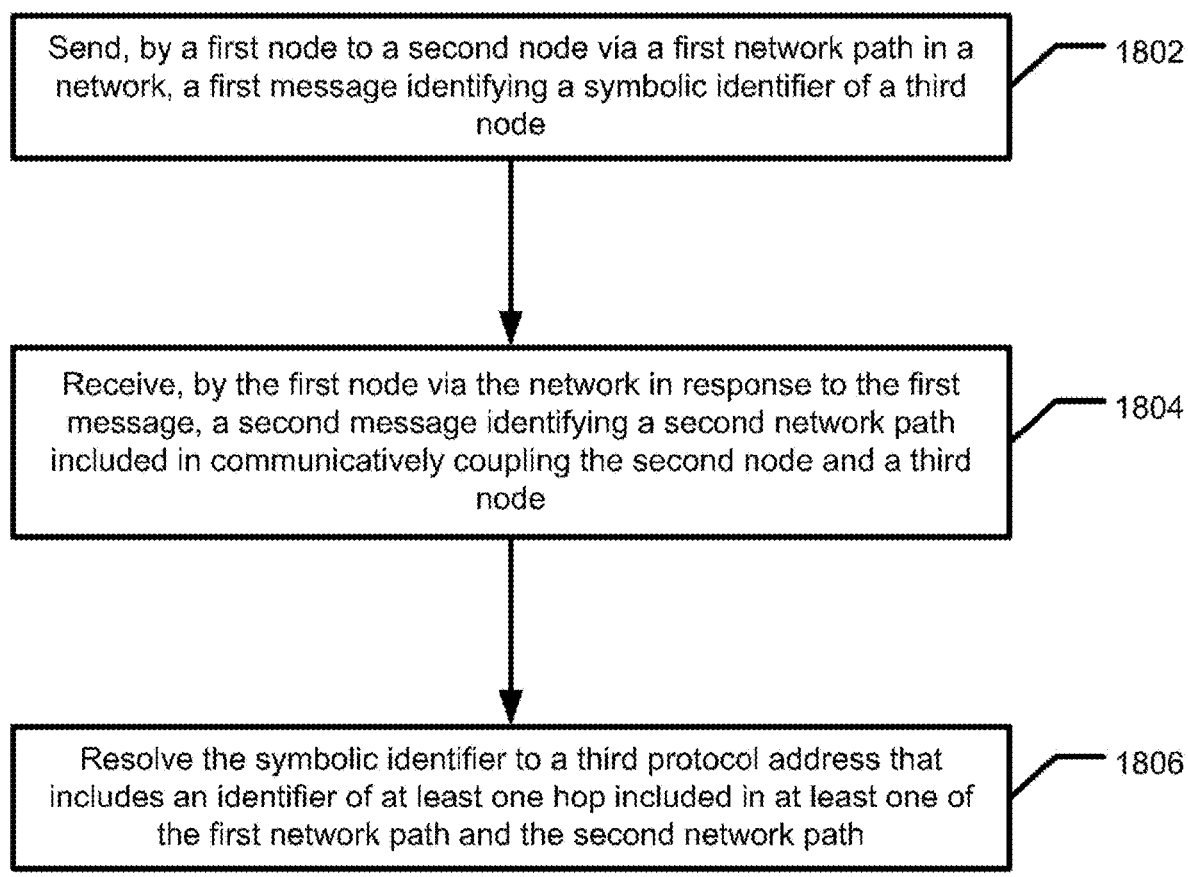
FIG. 18 is a flow diagram illustrating a method for associating a name with a network path according to an aspect of the subject matter described herein.
Figure 19:
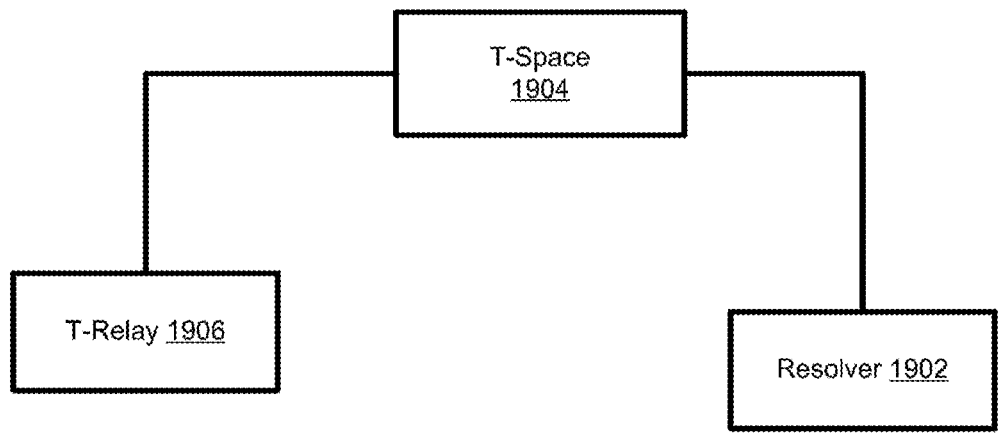
FIG. 19 is a block diagram illustrating an arrangement of components for associating a name with a network path according to another aspect of the subject matter described herein.

FIG. 19 illustrates an arrangement of components that may operate in an execution environment, such as execution environment 102 in FIG. 1 to perform a method illustrated in FIG. 18. The system illustrated by the arrangement includes a topology relay component 1906, a topology space component 1904, and a resolver component 1902. A suitable execution environment includes a processor, such as processor 104, to process an instruction in at least one of a topology relay component, a topology space component, and a resolver component 1902. Those skilled in the art will understand that other execution environments in addition to the various adaptations, analogs, and instances of the execution environments described herein are suitable for hosting an adaptation of the arrangement in FIG. 18.

With reference to FIG. 18, a block 1802 illustrates that the method includes sending, by a first node to a second node via a first network path in a network, a first message identifying a symbolic identifier of a third node. Accordingly, a system for associating a name with a network path includes means for sending, by a first node to a second node via a first network path in a network, a first message identifying a symbolic identifier of a third node. For example, the arrangement in FIG. 19, includes topology relay component 1906 that is operable for and/or is otherwise included in sending, by a first node to a second node via a first network path in a network, a first message identifying a symbolic identifier of a third node. The system for associating a name with a network path includes one or more processors and logic encoded in one or more computer readable media for execution by the one or more processors that when executed is operable for and/or is otherwise included in sending, by a first node to a second node via a first network path in a network, a first message identifying a symbolic identifier of a third node.

FIGS. 4A-B illustrate topology relay components 406 as adaptations and/or analogs of the topology relay component 1906 in FIG. 19. One or more topology relay components 406 operate in an execution environment 401. In FIG. 4A, a topology relay component 406a is illustrated as a component of a network layer component 415a. In FIG. 4B, a topology relay component 406b is illustrated as a component of a t-communication component 410b. A node 502 may include a topology relay component 406a and/or a topology relay component 406b. A path node 504 may also include an adaptation and/or an analog of a topology relay component.

With reference to FIG. 18, a block 1804 illustrates that the method includes receiving, by the first node via the network in response to the first message, a second message identifying a second network path included in communicatively coupling the second node and a third node. Accordingly, a system for associating a name with a network path includes means for receiving, by the first node via the network in response to the first message, a second message identifying a second network path included in communicatively coupling the second node and a third node. For example, the arrangement in FIG. 19 includes topology space component 1904 that is operable for and/or is otherwise included in receiving, by the first node via the network in response to the first message, a second message identifying a second network path included in communicatively coupling the second node and a third node. The system for associating a name with a network path includes one or more processors and logic encoded in one or more computer readable media for execution by the one or more processors that when executed is operable for and/or is otherwise included in receiving, by the first node via the network in response to the first message, a second message identifying a second network path included in communicatively coupling the second node and a third node.

FIGS. 4A-B illustrate topology space components 404 as adaptations and/or analogs of the topology space component 1904 in FIG. 19. One or more topology space components 404 operate in an execution environment 401. In FIG. 4A, a topology space component 404a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

With reference to FIG. 18, a block 1806 illustrates that the method includes resolving the symbolic identifier to a third protocol address that includes an identifier of at least one hop included in at least one of the first network path and the second network path. Accordingly, a system for associating a name with a network path includes means for resolving the symbolic identifier to a third protocol address that includes an identifier of at least one hop included in at least one of the first network path and the second network path. For example, the arrangement in FIG. 19, includes resolver component 1902 that is operable for and/or is otherwise included in resolving the symbolic identifier to a third protocol address that includes an identifier of at least one hop included in at least one of the first network path and the second network path. The system for associating a name with a network path includes one or more processors and logic encoded in one or more computer readable media for execution by the one or more processors that when executed is operable for and/or is otherwise included in resolving the symbolic identifier to a third protocol address that includes an identifier of at least one hop included in at least one of the first network path and the second network path.

FIGS. 4A-B illustrate resolver components 402 as adaptations and/or analogs of the resolver component 1902 in FIG. 19. One or more resolver components 402 operate in an execution environment 401. In FIG. 4A, a resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

Figure 20:
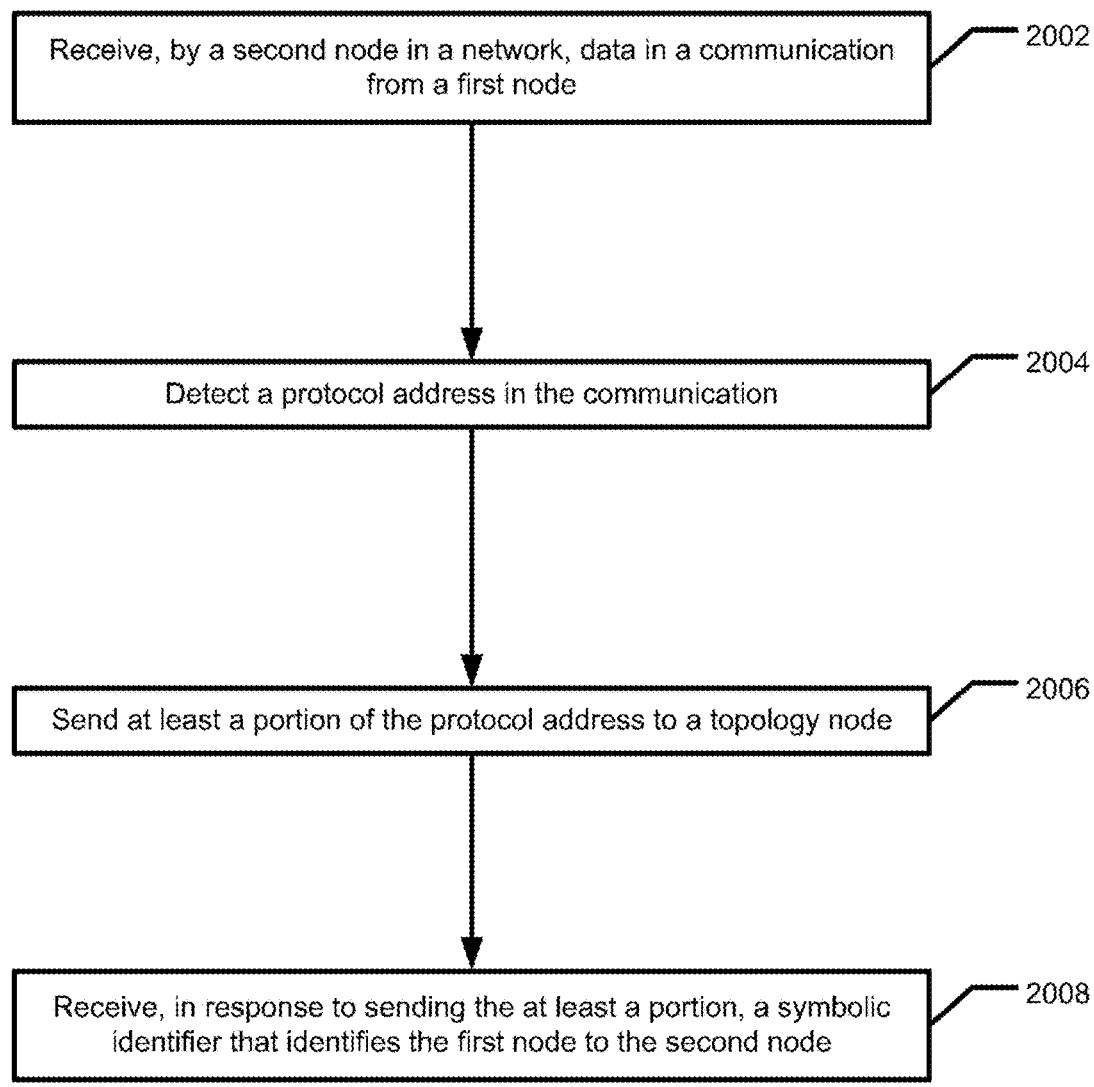
FIG. 20 is a flow diagram illustrating a method for associating a name with a network path according to an aspect of the subject matter described herein.
Figure 21:
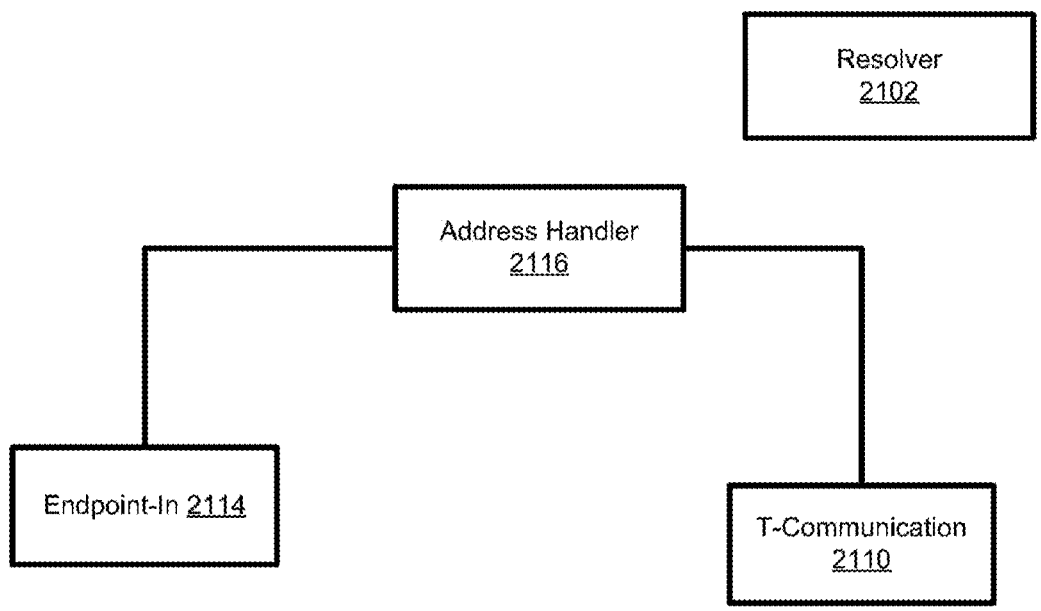
FIG. 21 is a block diagram illustrating an arrangement of components for associating a name with a network path according to another aspect of the subject matter described herein.

FIG. 21 illustrates an arrangement of components that may operate in an execution environment, such as execution environment 102 in FIG. 1 to perform a method illustrated in FIG. 20. The system illustrated by the arrangement includes an endpoint-in component 2114, an address handler component 2116, a topology communication component 2110, and a resolver component 2102. A suitable execution environment includes a processor, such as processor 104, to process an instruction in at least one of an endpoint-in component, an address handler component, a topology communication component, and a resolver component. Those skilled in the art will understand that other execution environments in addition to the various adaptations, analogs, and instances of the execution environments described herein are suitable for hosting an adaptation of the arrangement in FIG. 20.

With reference to FIG. 20, a block 2002 illustrates that the method includes receiving, by a second node in a network, data in a communication from a first node. Accordingly, a system for associating a name with a network path includes means for receiving, by a second node in a network, data in a communication from a first node. For example, the arrangement in FIG. 21 includes endpoint-in component 2114 that is operable for and/or is otherwise included in receiving, by a second node in a network, data in a communication from a first node. The system for associating a name with a network path includes one or more processors and logic encoded in one or more computer readable media for execution by the one or more processors that when executed is operable for and/or is otherwise included in receiving, by a second node in a network, data in a communication from a first node.

FIGS. 4A-B illustrate endpoint-in components 414 as adaptations and/or analogs of the endpoint-in component 2114 in FIG. 21. One or more endpoint-in components 414 operate in an execution environment 401. In FIG. 4A, an endpoint-in component 414a is illustrated as a component of a network layer component 415a. In FIG. 4B, an endpoint-in component 414b is illustrated as a component of a t-service 405b. A node 502 may include an endpoint-in component 414a and/or an endpoint-in component 414b. A path node 504 may also include an adaptation and/or an analog of an endpoint-in component.

With reference to FIG. 20, a block 2004 illustrates that the method includes detecting a protocol address in the communication. Accordingly, a system for associating a name with a network path includes means for detecting a protocol address in the communication. For example, the arrangement in FIG. 21 includes address handler component 2116 that is operable for and/or is otherwise included in detecting a protocol address in the communication. The system for associating a name with a network path includes one or more processors and logic encoded in one or more computer readable media for execution by the one or more processors that when executed is operable for and/or is otherwise included in detecting a protocol address in the communication.

FIGS. 4A-B illustrate address handler components 416 as adaptations and/or analogs of the address handler component 1916 in FIG. 21. One or more address handler components 416 operate in an execution environment 401. In FIG. 4A, an address handler component 416a is illustrated as a component of a network layer component 415a. In FIG. 4B, a handler component 416b is illustrated as a component of a t-service 405b. A node 502 may include an address handler component 416a and/or an address handler component 416b. A path node 504 may also include an adaptation and/or an analog of an address handler component.

With reference to FIG. 20, a block 2006 illustrates that the method includes sending at least a portion of the protocol address to a topology node. Accordingly, a system for associating a name with a network path includes means for sending at least a portion of the protocol address to a topology node. For example, the arrangement in FIG. 21 includes topology communication component 2110 that is operable for and/or is otherwise included in sending at least a portion of the protocol address to a topology node. The system for associating a name with a network path includes one or more processors and logic encoded in one or more computer readable media for execution by the one or more processors that when executed is operable for and/or is otherwise included in sending at least a portion of the protocol address to a topology node.

FIGS. 4A-B illustrate topology communication components 410 as adaptations and/or analogs of the topology communication component 1910 in FIG. 21. One or more topology communication components 410 operate in an execution environment 401. In FIG. 4A, a topology communication component 410a is illustrated. In FIG. 4B, a topology communication component 410b is illustrated as a component of a t-service 405b. A node 502 may include a topology communication component 410a and/or a topology communication component 410b. A path node 504 may also include an adaptation and/or an analog of a topology communication component.

With reference to FIG. 20, a block 2008 illustrates that the method includes receiving, in response to sending the at least a portion, a symbolic identifier that identifies the first node to the second node. Accordingly, a system for associating a name with a network path includes means for receiving, in response to sending the at least a portion, a symbolic identifier that identifies the first node to the second node. For example, the arrangement in FIG. 21, includes resolver component 2102 that is operable for and/or is otherwise included in receiving, in response to sending the at least a portion, a symbolic identifier that identifies the first node to the second node. The system for associating a name with a network path includes one or more processors and logic encoded in one or more computer readable media for execution by the one or more processors that when executed is operable for and/or is otherwise included in receiving, in response to sending the at least a portion, a symbolic identifier that identifies the first node to the second node.

FIGS. 4A-B illustrate resolver components 402 as adaptations and/or analogs of the resolver component 1902 in FIG. 21. One or more resolver components 402 operate in an execution environment 401. In FIG. 4A, a resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

Figure 22:
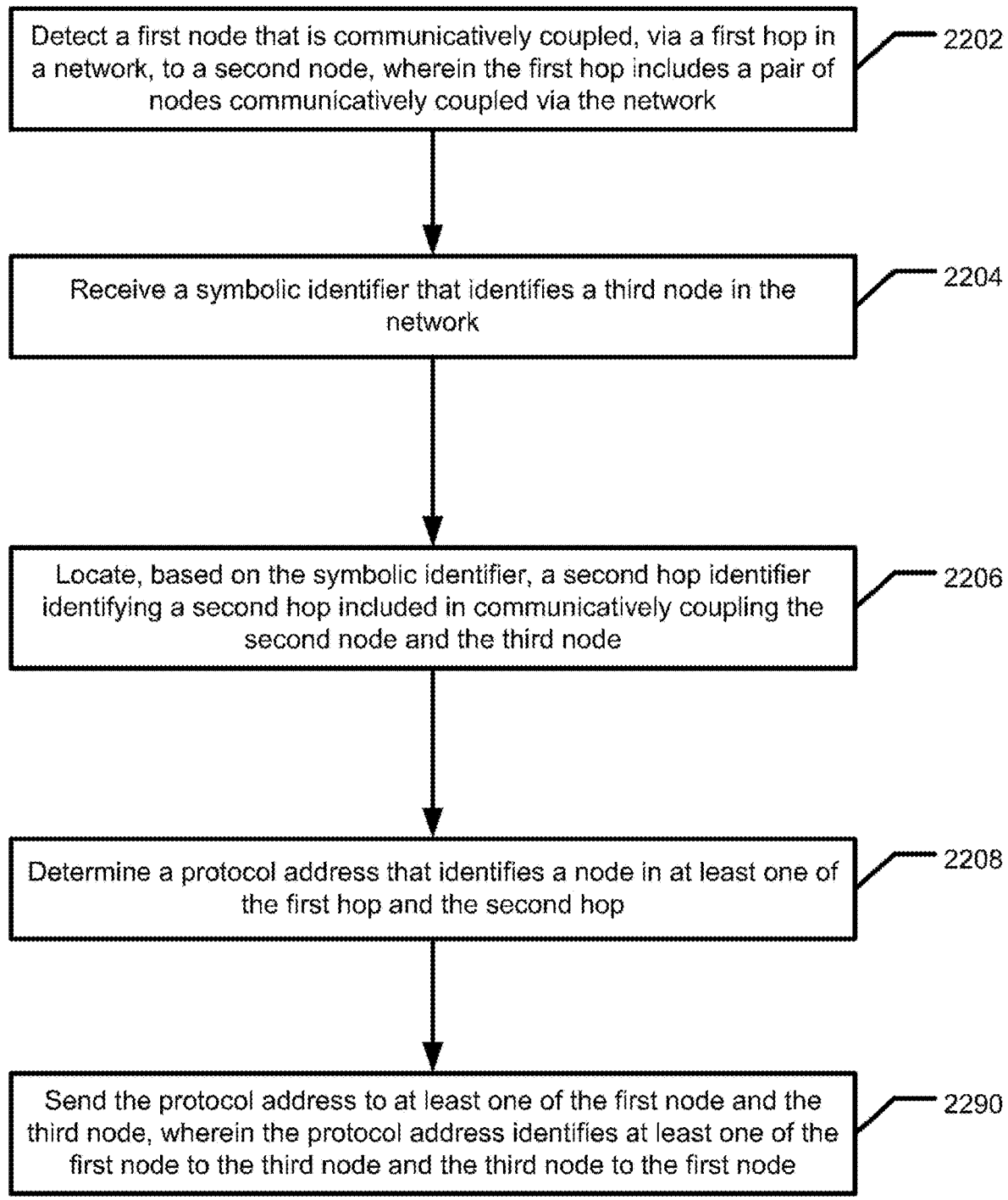
FIG. 22 is a flow diagram illustrating a method for associating a name with a network path according to an aspect of the subject matter described herein.
Figure 23:
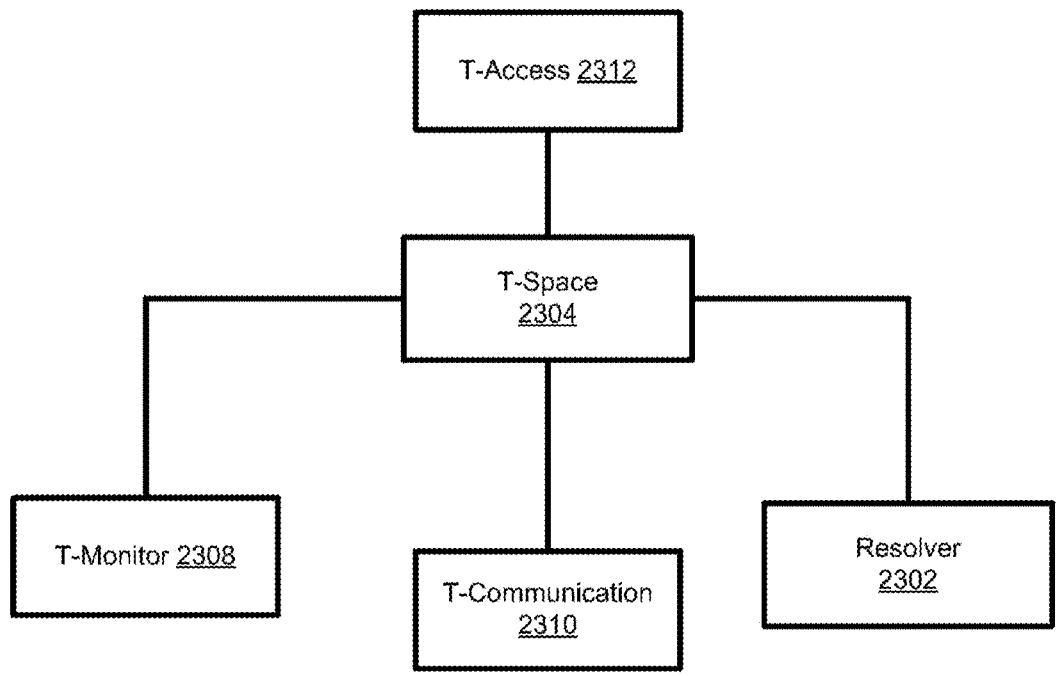
FIG. 23 is a block diagram illustrating an arrangement of components for associating a name with a network path according to another aspect of the subject matter described herein.

FIG. 23 illustrates an arrangement of components that may operate in an execution environment, such as execution environment 102 in FIG. 1 to perform a method illustrated in FIG. 22. The system illustrated by the arrangement includes a topology monitor component 2308, a resolver component 2302, a topology access component 2312, a topology space component 2304, and a topology communication component 2310. A suitable execution environment includes a processor, such as processor 104, to process an instruction in at least one of a topology monitor component, a resolver component, a topology access component, a topology space component, and a topology communication component. Those skilled in the art will understand that other execution environments in addition to the various adaptations, analogs, and instances of the execution environments described herein are suitable for hosting an adaptation of the arrangement in FIG. 22.

With reference to FIG. 22, a block 2202 illustrates that the method includes detecting a first node that is communicatively coupled, via a first hop in a network, to a second node, wherein the first hop includes a pair of nodes communicatively coupled via the network. Accordingly, a system for associating a name with a network path includes means for detecting a first node that is communicatively coupled, via a first hop in a network, to a second node, wherein the first hop includes a pair of nodes communicatively coupled via the network. For example, the arrangement in FIG. 23 includes topology monitor component 2308 that is operable for and/or is otherwise included in detecting a first node that is communicatively coupled, via a first hop in a network, to a second node, wherein the first hop includes a pair of nodes communicatively coupled via the network. The system for associating a name with a network path includes one or more processors and logic encoded in one or more computer readable media for execution by the one or more processors that when executed is operable for and/or is otherwise included in detecting a first node that is communicatively coupled, via a first hop in a network, to a second node, wherein the first hop includes a pair of nodes communicatively coupled via the network.

FIGS. 4A-B illustrate topology monitor components 408 as adaptations and/or analogs of the topology monitor component 2108 in FIG. 23. One or more topology monitor components 408 operate in an execution environment 401. In FIG. 4A, a topology monitor component 408a is illustrated as a component of a network layer component 415a. In FIG. 4B, a monitor component 408b is illustrated as a component of a t-service 405b. A node 502 may include a topology monitor component 408a and/or a topology monitor component 408b. A path node 504 may also include an adaptation and/or an analog of a topology monitor component.

With reference to FIG. 22, a block 2204 illustrates that the method includes receiving a symbolic identifier that identifies a third node in the network. Accordingly, a system for associating a name with a network path includes means for receiving a symbolic identifier that identifies a third node in the network. For example, the arrangement in FIG. 23, includes resolver component 2302 that is operable for and/or is otherwise included in receiving a symbolic identifier that identifies a third node in the network. The system for associating a name with a network path includes one or more processors and logic encoded in one or more computer readable media for execution by the one or more processors that when executed is operable for and/or is otherwise included in receiving a symbolic identifier that identifies a third node in the network.

FIGS. 4A-B illustrate resolver components 402 as adaptations and/or analogs of the resolver component 1902 in FIG. 23. One or more resolver components 402 operate in an execution environment 401. In FIG. 4A, a resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

With reference to FIG. 22, a block 2206 illustrates that the method includes locating, based on the symbolic identifier, a second hop identifier identifying a second hop included in communicatively coupling the second node and the third node. Accordingly, a system for associating a name with a network path includes means for locating, based on the symbolic identifier, a second hop identifier identifying a second hop included in communicatively coupling the second node and the third node. For example, the arrangement in FIG. 23 includes topology access component 2312 that is operable for and/or is otherwise included in locating, based on the symbolic identifier, a second hop identifier identifying a second hop included in communicatively coupling the second node and the third node. The system for associating a name with a network path includes one or more processors and logic encoded in one or more computer readable media for execution by the one or more processors that when executed is operable for and/or is otherwise included in locating, based on the symbolic identifier, a second hop identifier identifying a second hop included in communicatively coupling the second node and the third node.

FIGS. 4A-B illustrate topology access components 412 as adaptations and/or analogs of the topology access component 1912 in FIG. 23. One or more topology access components 412 operate in an execution environment 401. In FIG. 4A, a topology access component 412a is illustrated. In FIG. 4B, a manager component 412b is illustrated as a component of a t-service 405b. A node 502 may include a topology access component 412a and/or a topology access component 412b. A path node 504 may also include an adaptation and/or an analog of a topology access component.

With reference to FIG. 22, a block 2208 illustrates that the method includes determining a protocol address that identifies a node in at least one of the first hop and the second hop. Accordingly, a system for associating a name with a network path includes means for determining a protocol address that identifies a node in at least one of the first hop and the second hop. For example, the arrangement in FIG. 23 includes topology space component 2304 that is operable for and/or is otherwise included in determining a protocol address that identifies a node in at least one of the first hop and the second hop. The system for associating a name with a network path includes one or more processors and logic encoded in one or more computer readable media for execution by the one or more processors that when executed is operable for and/or is otherwise included in determining a protocol address that identifies a node in at least one of the first hop and the second hop.

FIGS. 4A-B illustrate topology space components 404 as adaptations and/or analogs of the topology space component 1904 in FIG. 23. One or more topology space components 404 operate in an execution environment 401. In FIG. 4A, a topology space component 404a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

With reference to FIG. 22, a block 2210 illustrates that the method includes sending the protocol address to at least one of the first node and the third node, wherein the protocol address identifies at least one of the first node to the third node and the third node to the first node. Accordingly, a system for associating a name with a network path includes means for sending the protocol address to at least one of the first node and the third node, wherein the protocol address identifies at least one of the first node to the third node and the third node to the first node. For example, the arrangement in FIG. 23, includes topology communication component 2310 that is operable for and/or is otherwise included in sending the protocol address to at least one of the first node and the third node, wherein the protocol address identifies at least one of the first node to the third node and the third node to the first node. The system for associating a name with a network path includes one or more processors and logic encoded in one or more computer readable media for execution by the one or more processors that when executed is operable for and/or is otherwise included in sending the protocol address to at least one of the first node and the third node, wherein the protocol address identifies at least one of the first node to the third node and the third node to the first node.

FIGS. 4A-B illustrate topology communication components 410 as adaptations and/or analogs of the topology communication component 1910 in FIG. 23. One or more topology communication components 410 operate in an execution environment 401. In FIG. 4A, a topology communication component 410a is illustrated. In FIG. 4B, a communication component 410b is illustrated as a component of a t-service 405*b*. A node 502 may include a topology communication component 410*a* and/or a topology communication component 410*b*. A path node 504 may also include an adaptation and/or an analog of a topology communication component.

Figure 24:
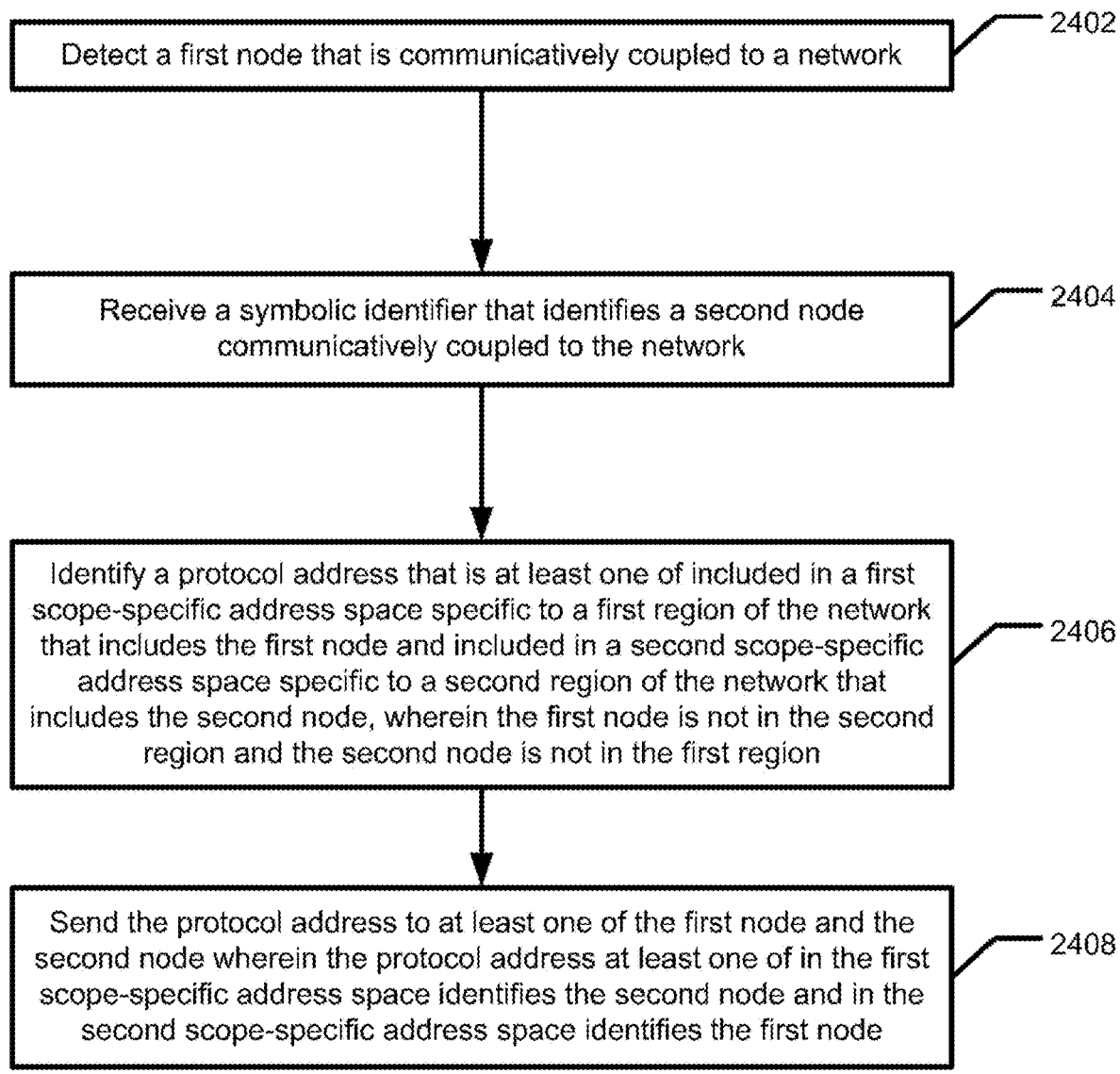
FIG. 24 is a flow diagram illustrating a method for associating a name with a network path according to an aspect of the subject matter described herein.
Figure 25:
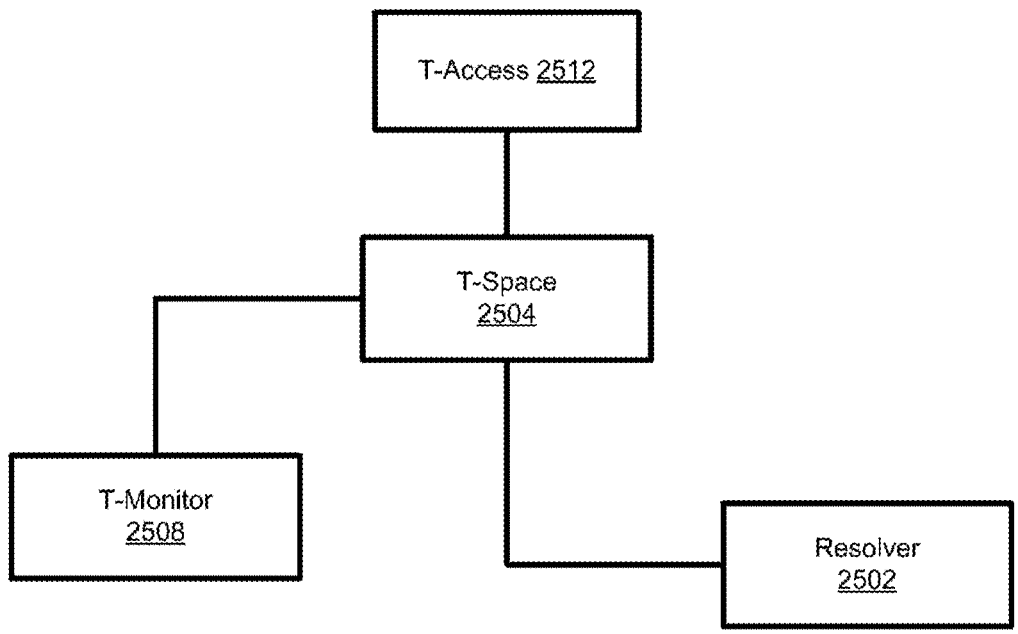
FIG. 25 is a block diagram illustrating an arrangement of components for associating a name with a network path according to another aspect of the subject matter described herein.

FIG. 25 illustrates an arrangement of components that may operate in an execution environment, such as execution environment 102 in FIG. 1 to perform a method illustrated in FIG. 24. The system illustrated by the arrangement includes a topology monitor component 2508, a resolver component 2502, a topology access component 2512, and a topology space component 2504. A suitable execution environment includes a processor, such as processor 104, to process an instruction in at least one of a topology monitor component, a resolver component, a topology access component, and a topology space component. Those skilled in the art will understand that other execution environments in addition to the various adaptations, analogs, and instances of the execution environments described herein are suitable for hosting an adaptation of the arrangement in FIG. 24.

With reference to FIG. 24, a block 2402 illustrates that the method includes detecting a first node that is communicatively coupled to a network. Accordingly, a system for associating a name with a network path includes means for detecting a first node that is communicatively coupled to a network. For example, the arrangement in FIG. 25 includes topology monitor component 2508 that is operable for and/or is otherwise included in detecting a first node that is communicatively coupled to a network. The system for associating a name with a network path includes one or more processors and logic encoded in one or more computer readable media for execution by the one or more processors that when executed is operable for and/or is otherwise included in detecting a first node that is communicatively coupled to a network.

FIGS. 4A-B illustrate topology monitor components 408 as adaptations and/or analogs of the topology monitor component 2108 in FIG. 25. One or more topology monitor components 408 operate in an execution environment 401. In FIG. 4A, a topology monitor component 408*a* is illustrated as a component of a network layer component 415*a*. In FIG. 4B, a handler component 408*b* is illustrated as a component of a t-service 405*b*. A node 502 may include a topology monitor component 408*a* and/or a topology monitor component 408*b*. A path node 504 may also include an adaptation and/or an analog of a topology monitor component.

With reference to FIG. 24, a block 2404 illustrates that the method includes receiving a symbolic identifier that identifies a second node communicatively coupled to the network. Accordingly, a system for associating a name with a network path includes means for receiving a symbolic identifier that identifies a second node communicatively coupled to the network. For example, the arrangement in FIG. 25 includes resolver component 2502 that is operable for and/or is otherwise included in receiving a symbolic identifier that identifies a second node communicatively coupled to the network. The system for associating a name with a network path includes one or more processors and logic encoded in one or more computer readable media for execution by the one or more processors that when executed is operable for and/or is otherwise included in receiving a symbolic identifier that identifies a second node communicatively coupled to the network.

FIGS. 4A-B illustrate resolver components 402 as adaptations and/or analogs of the resolver component 1902 in FIG. 25. One or more resolver components 402 operate in an execution environment 401 In FIG. 4A, a resolver component 402*a* is illustrated as a component of a t-space component 404*a*. In FIG. 4B, a resolver component 402*b* is illustrated as a component of a t-service 405*b*. A node 502 may include a resolver component 402*a* and/or a resolver component 402*b*. A path node 504 may also include an adaptation and/or an analog of a resolver component.

With reference to FIG. 24, a block 2406 illustrates that the method includes identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. Accordingly, a system for associating a name with a network path includes means for identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. For example, the arrangement in FIG. 25, includes topology access component 2512 that is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. The system for associating a name with a network path includes one or more processors and logic encoded in one or more computer readable media for execution by the one or more processors that when executed is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region.

FIGS. 4A-B illustrate topology access components 412 as adaptations and/or analogs of the topology access component 1912 in FIG. 25. One or more topology access components 412 operate in an execution environment 401. In FIG. 4A, a topology access component 412*a* is illustrated as a component of a network layer component 415*a*. In FIG. 4B, a topology access component 412*b* is illustrated as a component of a t-service 405*b*. A node 502 may include a topology access component 412*a* and/or a topology access component 412*b*. A path node 504 may also include an adaptation and/or an analog of a topology access component.

With reference to FIG. 24, a block 2408 illustrates that the method includes sending the protocol address to at least one of the first node and the second node wherein the protocol address at least one of in the first scope-specific address space identifies the second node and in the second scope-specific address space identifies the first node. Accordingly, a system for associating a name with a network path includes means for sending the protocol address to at least one of the first node and the second node wherein the protocol address at least one of in the first scope-specific address space identifies the second node and in the second scope-specific address space identifies the first node. For example, the arrangement in FIG. 25, includes topology space component 2504 that is operable for and/or is otherwise included in sending the protocol address to at least one of the first node and the second node wherein the protocol address at least one of in the first scope-specific address space identifies the second node and in the second scope-specific address space identifies the first node. The system for associating a name with a network path includes one or more processors and logic encoded in one or more computer readable media for execution by the one or more processors that when executed is operable for and/or is otherwise included in sending the protocol address to at least one of the first node and the second node wherein the protocol address at least one of in the first scope-specific address space identifies the second node and in the second scope-specific address space identifies the first node.

FIGS. 4A-B illustrate topology space components 404 as adaptations and/or analogs of the topology space component 1904 in FIG. 25. One or more topology space components 404 operate in an execution environment 401. In FIG. 4A, a topology space component 404a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

Figure 26:
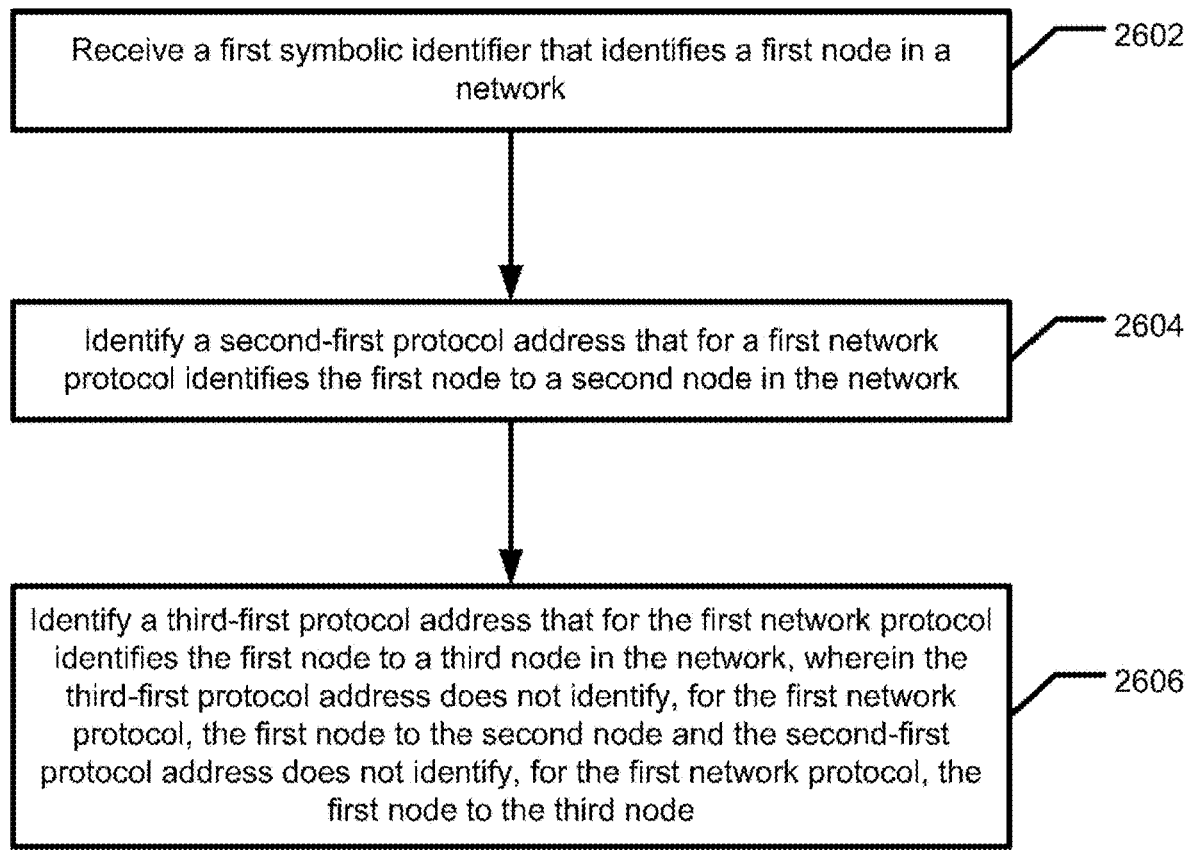
FIG. 26 is a flow diagram illustrating a method for associating a name with a network path according to an aspect of the subject matter described herein.
Figure 27:
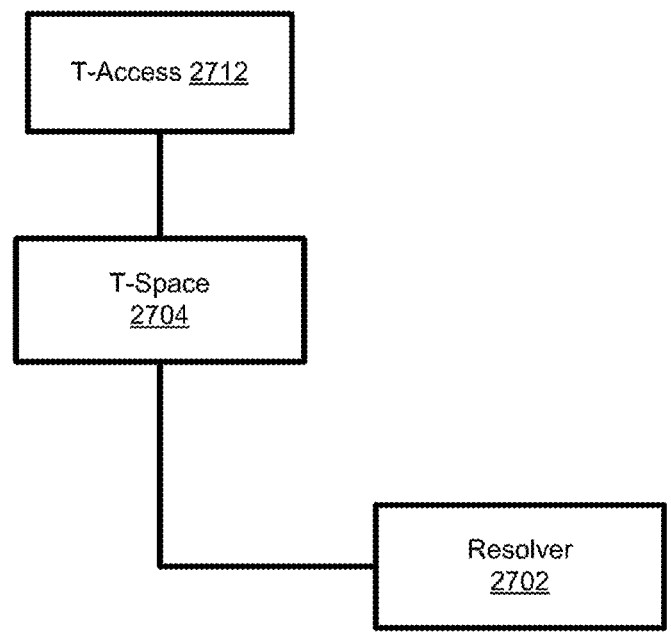
FIG. 27 is a block diagram illustrating an arrangement of components for associating a name with a network path according to another aspect of the subject matter described herein.

FIG. 27 illustrates an arrangement of components that may operate in an execution environment, such as execution environment 102 in FIG. 1 to perform a method illustrated in FIG. 26. The system illustrated by the arrangement includes a resolver component 2702, a topology space component 2704, and a topology access component 2712. A suitable execution environment includes a processor, such as processor 104, to process an instruction in at least one of a resolver component, a topology space component, and a topology access component. Those skilled in the art will understand that other execution environments in addition to the various adaptations, analogs, and instances of the execution environments described herein are suitable for hosting an adaptation of the arrangement in FIG. 26.

With reference to FIG. 26, a block 2602 illustrates that the method includes detecting a first node that is communicatively coupled to a network. Accordingly, a system for associating a name with a network path includes means for detecting a first node that is communicatively coupled to a network. For example, the arrangement in FIG. 27 includes resolver component 2702 that is operable for and/or is otherwise included in detecting a first node that is communicatively coupled to a network. The system for associating a name with a network path includes one or more processors and logic encoded in one or more computer readable media for execution by the one or more processors that when executed is operable for and/or is otherwise included in detecting a first node that is communicatively coupled to a network.

FIGS. 4A-B illustrate resolver components 402 as adaptations and/or analogs of the resolver component 2702 in FIG. 27. One or more resolver components 402 operate in an execution environment 401. In FIG. 4A, a resolver component 402a is illustrated as a component of a t-space component 404a. In FIG. 4B, a resolver component 402b is illustrated as a component of a t-service 405b. A node 502 may include a resolver component 402a and/or a resolver component 402b. A path node 504 may also include an adaptation and/or an analog of a resolver component.

With reference to FIG. 26, a block 2604 illustrates that the method includes receiving a symbolic identifier that identifies a second node communicatively coupled to the network. Accordingly, a system for associating a name with a network path includes means for receiving a symbolic identifier that identifies a second node communicatively coupled to the network. For example, the arrangement in FIG. 27 includes topology space component 2704 that is operable for and/or is otherwise included in receiving a symbolic identifier that identifies a second node communicatively coupled to the network. The system for associating a name with a network path includes one or more processors and logic encoded in one or more computer readable media for execution by the one or more processors that when executed is operable for and/or is otherwise included in receiving a symbolic identifier that identifies a second node communicatively coupled to the network.

FIGS. 4A-B illustrate topology space components 404 as adaptations and/or analogs of the topology space component 2704 in FIG. 27. One or more topology space components 404 operate in an execution environment 401 In FIG. 4A, a topology space component 402a is illustrated. In FIG. 4B, a topology space component 404b is illustrated as a component of a t-service 405b. A node 502 may include a topology space component 404a and/or a topology space component 404b. A path node 504 may also include an adaptation and/or an analog of a topology space component.

With reference to FIG. 26, a block 2606 illustrates that the method includes identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. Accordingly, a system for associating a name with a network path includes means for identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. For example, the arrangement in FIG. 27, includes topology access component 2712 that is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region. The system for associating a name with a network path includes one or more processors and logic encoded in one or more computer readable media for execution by the one or more processors that when executed is operable for and/or is otherwise included in identifying a protocol address that is at least one of included in a first scope-specific address space specific to a first region of the network that includes the first node and included in a second scope-specific address space specific to a second region of the network that includes the second node, wherein the first node is not in the second region and the second node is not in the first region.

FIGS. 4A-B illustrate topology access components 412 as adaptations and/or analogs of the topology access component 2712 in FIG. 27. One or more topology access components 412 operate in an execution environment 401. In FIG. 4A, a topology access component 412a is illustrated. In FIG. 4B, a topology access component 412b is illustrated as a component of a t-service 405b. A node 502 may include a topology access component 412a and/or a topology access component 412b. A path node 504 may also include an adaptation and/or an analog of a topology access component.

In another aspect of the method illustrated in FIG. 2, the first-second protocol address may be in the first scope-specific address space, the second-first protocol address may be in a second-scope-specific address space specific to a second region that includes the second node, the second-third protocol address may be in the second scope-specific address space, and/or the third-second protocol address may be in the third scope-specific address space. One or more of the scope-specific address spaces may be node-specific address spaces specific to the respective one or more of the first node, the second node, and the third node.

A scope-specific address space may include identifiers that identify locations in a metric space that include a representation of a network topology of the network. The metric space may be a geometric space. In an aspect of the method illustrated in FIG. 2, the first-second protocol address may defined relative to a first origin address that, in the first scope-specific address space, is defined to identify a first location of the first node and/or first region represented in a first metric space. The second-first protocol address may defined relative to a second origin address that, in the second scope-specific address space, is defined to identify a second location of the second node and/or region represented in a second metric space.

Analogously, the second-third protocol address may be defined relative to a second origin address that, in the second scope-specific address space, is defined to identify a second location of the second node/region represented in a second metric space. The third-second protocol address may be defined relative to a third origin address that, in the third scope-specific address space, that is defined to identify a third location of the third node/region represented in a third metric space.

Still further, the first-third protocol address may be defined relative to a first origin address that, in the first scope-specific address space, is defined to identify a first location of the first region represented in a first metric space. The third-first protocol address may be defined relative to a third origin address that, in the third scope-specific address space, that is defined to identify a third location of the third node/region represented in a third metric space.

A metric space may be multi-dimensional. One or both of first scope-specific address space and the third scope-specific address space respectively include identifiers that identify locations in a multi-dimensional metric space. The locations may be defined with respect to axes that intersect defining an origin location. The first scope specific address space may include a first origin address that identifies a first origin location. An identifier, for a location in the metric space, in the first scope specific address space may be defined relative to the origin location. Analogous statements may be made for other scope specific address spaces, such as the third scope-specific address space and the second scope specific address space in aspects of the method illustrated in FIG. 2.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. While at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and communication media. Computer storage media includes volatile and nonvolatile, removable and non-removable media implemented in any method or technology for storage of information such as computer readable instructions, data structures, software components or other data. Computer storage media includes, but is not limited to, Random Access Memory (RAM), Read Only Memory (ROM); Electrically Erasable Programmable Read Only Memory (EEPROM); flash memory or other memory technology; portable computer diskette; Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by an execution environment.

Communication media typically embodies computer readable instructions, data structures, software components, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used herein, any reference to an entity "in" an association is equivalent to describing the entity as "included in and/or identified by" the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

I claim:

1. A non-transitory computer-readable media storing instructions that, when executed by one or more processors of a current node in a network path between a transmitting node and a receiving node in a network, cause the current node to:

based on a receipt of a first packet that is specified by a protocol utilizing an Internet Protocol (IP) network protocol and that includes first data, identify, as being for use by the current node, a first identifier in a destination field of a first header of the first packet, the first identifier being predetermined before the receipt of the first packet and being of an identifier type of a plurality of identifier types that are supported by the protocol and that cause different data to be routed differently based on which of the plurality of identifier types are utilized for routing the different data, the plurality of identifier types including at least three of:

a first identifier type that:

is in an identifier space having a scope that spans multiple nodes only in a region of the network in which the protocol is administered, identifies a particular region that includes a plurality of region nodes, and does not specify any particular network interface, such that:

in the event that the identifier type of the first identifier, that is identified as being for use by the current node which is one of the multiple nodes, includes the first identifier type: the current node is caused to transmit, based on the first identifier of the first identifier type, the first data from the current node toward a first path node that is at least partially in the particular region, via a first path segment selected from a plurality of selectable path segments, including at least one multi-hop path segment with a first hop segment and a second hop segment, such that the both the first hop segment and the second hop segment are capable of being selected based on the first identifier of the first identifier type;
a second identifier type that:
is in an identifier space having a scope that spans at least a portion of only a single node, and
identifies a particular network interface of a particular link path segment that directly connects the single node to an adjacent node, such that:
in the event that the identifier type of the first identifier, that is identified as being for use by the current node which is the single node, includes the second identifier type: the current node is caused to transmit, based on the first identifier of the second identifier type, the first data from the current node toward the receiving node to the adjacent node via the particular network interface of the particular link path segment that directly connects the single node to the adjacent node;
a third identifier type that:
is in an identifier space having a scope that spans plural nodes only in the region of the network in which the protocol is administered,
identifies a particular path node, and
does not specify any particular path segment in communication with the particular path node, such that:
in the event that the identifier type of the first identifier, that is identified as being for use by the current node which is one of the plural nodes, includes the third identifier type: the current node is caused to transmit, based on the first identifier of the third identifier type, the first data from the current node toward the receiving node to the particular path node; and
a fourth identifier type that:
includes a symbolic identifier, and
corresponds to a plurality of corresponding path segment identifiers: which are predetermined before the receipt of the first packet, which identify a plurality of corresponding path segments, and which are not included in the first packet header before the receipt of the first packet, such that:
in the event that the identifier type of the first identifier, that is identified as being for use by the current node, includes the fourth identifier type: the current node is caused to utilize the first identifier of the fourth identifier type to identify the plurality of corresponding path segment identifiers, and the current node is further caused to transmit, based on the plurality of corresponding path segment identifiers, the first data from the current node toward the receiving node via the plurality of corresponding path segments, such that the plurality of corresponding path segments are capable of being selected based on the first identifier of the fourth identifier type.

2. The non-transitory computer-readable media of claim 1, wherein the instructions, when executed by the one or more processors of the current node, cause the current node to operate such that: the plurality of identifier types supported by the protocol include the second identifier type, the third identifier type, and the fourth identifier type.

3. The non-transitory computer-readable media of claim 1, wherein the instructions, when executed by the one or more processors of the current node, cause the current node to operate such that: the plurality of identifier types supported by the protocol include the first identifier type, the second identifier type, and the fourth identifier type.

4. The non-transitory computer-readable media of claim 1, wherein the instructions, when executed by the one or more processors of the current node, cause the current node to operate such that: the plurality of identifier types supported by the protocol include the first identifier type, the third identifier type, and the fourth identifier type.

5. The non-transitory computer-readable media of claim 1, wherein the instructions, when executed by the one or more processors of the current node, cause the current node to operate such that: the plurality of identifier types supported by the protocol include the first identifier type, the second identifier type, and the third identifier type.

6. The non-transitory computer-readable media of claim 1, wherein the instructions, when executed by the one or more processors of the current node, cause the current node to operate such that: the first identifier is identified as being an only identifier in the destination field of the first header of the first packet.

7. The non-transitory computer-readable media of claim 1, wherein the instructions, when executed by the one or more processors of the current node, cause the current node to operate such that: a second identifier is included in the first packet outside of the destination field for being identified as being for use by another node in the network path to route the first data toward the receiving node.

8. The non-transitory computer-readable media of claim 1, wherein the instructions, when executed by the one or more processors of the current node, cause the current node to operate such that: an operation identifier is identified based on the first identifier for performing an operation in connection with routing the first data.

9. The non-transitory computer-readable media of claim 1, wherein the instructions, when executed by the one or more processors of the current node, cause the current node to operate such that: the first identifier is of the first identifier type and is the only identifier in the first header of the first packet, the transmitting node includes a source node, and the first path node includes the receiving node.

10. The non-transitory computer-readable media of claim 1, wherein the instructions, when executed by the one or more processors of the current node, cause the current node to operate such that: the first identifier is of the second identifier type and is the only identifier in the first header of the first packet, the transmitting node includes a source node, and the adjacent node includes the receiving node.

11. The non-transitory computer-readable media of claim 1, wherein the instructions, when executed by the one or more processors of the current node, cause the current node to operate such that: the first identifier is of the third identifier type and is the only identifier in the first header of the first packet, the transmitting node includes a source node, and the particular path node includes the receiving node.

12. The non-transitory computer-readable media of claim 1, wherein the instructions, when executed by the one or more processors of the current node, cause the current node to operate such that: the first identifier is of the fourth identifier type.

13. The non-transitory computer-readable media of claim 1, wherein the instructions, when executed by the one or more processors of the current node, cause the current node to operate such that:
the plurality of identifier types include at least the first identifier type and the fourth identifier type;
the first packet includes the first identifier of the first identifier type, and does not include any identifier of the fourth identifier type; and
a second packet is received at the current node that includes a second identifier of the fourth identifier type, and that does not include any identifier of the first identifier type.

14. The non-transitory computer-readable media of claim 1, wherein the instructions, when executed by the one or more processors of the current node, cause the current node to operate such that:
the plurality of identifier types include at least the first identifier type, the second identifier type, the third identifier type, and the fourth identifier type;
the first packet includes the first identifier of the first identifier type, and that does not include any identifier of the second identifier type, the third identifier type, nor the fourth identifier type;
a second packet is received at the current node that includes a second identifier of the second identifier type, and that does not include any identifier of the first identifier type, the third identifier type, nor the fourth identifier type;
a third packet is received at the current node that includes a third identifier of the third identifier type, and that does not include any identifier of the first identifier type, the second identifier type, nor the fourth identifier type;
a fourth packet is received at the current node that includes a fourth identifier of the fourth identifier type, and that does not include any identifier of the first identifier type, the second identifier type, nor the third identifier type; and
a fifth packet is received at the current node that includes at least two identifiers of at least two different types of: the first identifier type, the second identifier type, the third identifier type, or the fourth identifier type.

15. The non-transitory computer-readable media of claim 1, wherein the instructions, when executed by the one or more processors of the current node, cause the current node to operate such that:
the plurality of identifier types include at least the first identifier type and the second identifier type; and
the first packet further includes a second identifier that is not identified, by the current node, as being for use by the current node, where:
the first identifier is of the first identifier type, and
the second identifier is of the second identifier type and is for being identified as being for use by the first path node which is the single node, to transmit, based on the second identifier of the second identifier type, the first data from the first path node toward the receiving node to the adjacent node via the particular network interface of the particular link path segment.

16. The non-transitory computer-readable media of claim 1, wherein the instructions, when executed by the one or more processors of the current node, cause the current node to operate such that:
the plurality of identifier types include at least the first identifier type, the second identifier type, the third identifier type, and the fourth identifier type; and
the first packet further includes a second identifier that is not identified, by the current node, as being for use by the current node, where:
the first identifier is of the first identifier type, and
the second identifier is of the third identifier type and is for being identified as being for use by the first path node, to transmit, based on the second identifier of the third identifier type, the first data from the first path node toward the receiving node to the particular path node.

17. The non-transitory computer-readable media of claim 1, wherein the instructions, when executed by the one or more processors of the current node, cause the current node to operate such that:
the plurality of identifier types include at least the first identifier type and the fourth identifier type; and
the first packet further includes a second identifier that is not identified, by the current node, as being for use by the current node, where:
the first identifier is of the first identifier type, and
the second identifier is of the fourth identifier type and is for being identified as being for use by the first path node, to: utilize the second identifier of the fourth identifier type to identify the plurality of corresponding path segment identifiers, and transmit, based on the plurality of corresponding path segment identifiers, the first data from the current node toward the receiving node via the plurality of corresponding path segments, such that the plurality of corresponding path segments are capable of being selected based on the second identifier of the fourth identifier type without utilizing any other identifier in the first header of the first packet.

18. The non-transitory computer-readable media of claim 1, wherein the instructions, when executed by the one or more processors of the current node, cause the current node to operate such that:
the plurality of identifier types include at least the second identifier type and the third identifier type;
the first packet further includes a second identifier that is not identified, by the current node, as being for use by the current node, where:
the first identifier is of the third identifier type, and
the second identifier is of the second identifier type and is for being identified as being for use by the particular path node, to transmit, based on the second identifier of the second identifier type, the first data from the particular path node toward the receiving node to the adjacent node via the particular network interface of the particular link path segment that directly connects to the adjacent node, where the single node includes the particular path node.

19. The non-transitory computer-readable media of claim 1, wherein the instructions, when executed by the one or more processors of the current node, cause the current node to operate such that:
the plurality of identifier types include at least the first identifier type; and
the first packet further includes a second identifier that is not identified, by the current node, as being for use by the current node, where:
the first identifier is of the first identifier type that identifies only a first particular region that is a first subset of the region and that includes a plurality of first particular region nodes that do not include the current node, and the second identifier is of the first identifier type that identifies only a second particular region that is a second subset of the region and that includes a plurality of second particular region nodes that do not include the first path node.

20. The non-transitory computer-readable media of claim 1, wherein the instructions, when executed by the one or more processors of the current node, cause the current node to operate such that:
the plurality of identifier types include at least the first identifier type; and
the first packet further includes a second identifier that is not identified, by the current node, as being for use by the current node, where:
the first identifier is of the first identifier type that identifies only a first particular region that is a first subset of the region and that includes a plurality of first particular region nodes, and
the second identifier is of the first identifier type that identifies only a second particular region that is a second subset of the region and that includes a plurality of second particular region nodes.

21. The non-transitory computer-readable media of claim 20, wherein the instructions, when executed by the one or more processors of the current node, cause the current node to operate such that: the first identifier of the first identifier type is in a same identifier space as the second identifier of the first identifier type.

22. The non-transitory computer-readable media of claim 20, wherein the instructions, when executed by the one or more processors of the current node, cause the current node to operate such that: the first identifier of the first identifier type is in a different identifier space as that of the second identifier of the first identifier type.

23. The non-transitory computer-readable media of claim 20, wherein the instructions, when executed by the one or more processors of the current node, cause the current node to operate such that: the first identifier of the first identifier type and the second identifier of the first identifier type are in different identifier spaces having different scopes that span different subsets of the region of the network in which the protocol is administered, where the first identifier of the first identifier type and the second identifier of the first identifier type are set to identify same network segments with same values in the different identifier spaces having the different scopes that span the different subsets of the region of the network.

24. The non-transitory computer-readable media of claim 1, wherein the instructions, when executed by the one or more processors of the current node, cause the current node to operate such that:
the plurality of identifier types include at least the first identifier type and the third identifier type;
the first identifier type is in the identifier space having the scope that spans only a first subset of the region, including a plurality of first subset nodes, of the network in which the protocol is administered, and
the third identifier type is in the identifier space having the scope that spans only a second subset of the region, including a plurality of second subset nodes that do not include at least one of the plurality of first subset nodes, of the network in which the protocol is administered.

25. The non-transitory computer-readable media of claim 1, wherein the instructions, when executed by the one or more processors of the current node, cause the current node to operate such that: the plurality of identifier types include at least the first identifier type, and the first identifier type identifies only the particular region without identifying any other particular regions.

26. The non-transitory computer-readable media of claim 1, wherein the instructions, when executed by the one or more processors of the current node, cause the current node to operate such that: the plurality of identifier types include at least the first identifier type, and the first identifier type identifies a plurality of the particular regions.

27. The non-transitory computer-readable media of claim 1, wherein the instructions, when executed by the one or more processors of the current node, cause the current node to operate such that: the plurality of identifier types include at least the first identifier type, and the plurality of region nodes do not include the current node.

28. The non-transitory computer-readable media of claim 1, wherein the instructions, when executed by the one or more processors of the current node, cause the current node to operate such that: the plurality of identifier types include at least the first identifier type, and the plurality of region nodes include the current node.

29. The non-transitory computer-readable media of claim 1, wherein the instructions, when executed by the one or more processors of the current node, cause the current node to operate such that: the plurality of identifier types include at least the first identifier type, and, in the event that the identifier type of the first identifier, that is identified as being for use by the current node which is one of the multiple nodes, includes the first identifier type: the first data is transmitted from the current node to the first path node that is at least partially in the particular region.

30. The non-transitory computer-readable media of claim 1, wherein the instructions, when executed by the one or more processors of the current node, cause the current node to operate such that: the plurality of identifier types include at least the first identifier type, and both the first hop segment and the second hop segment are capable of being selected based on the first identifier of the first identifier type without utilizing any other identifier in the first packet.

31. The non-transitory computer-readable media of claim 1, wherein the instructions, when executed by the one or more processors of the current node, cause the current node to operate such that: the plurality of identifier types include at least the fourth identifier type, and the plurality of corresponding path segments are capable of being selected based on the first identifier of the fourth identifier type without utilizing any other identifier in the first packet.

32. The non-transitory computer-readable media of claim 1, wherein the instructions, when executed by the one or more processors of the current node, cause the current node to operate such that: the plurality of identifier types include at least the first identifier type and the third identifier type, and both the first identifier type and the third identifier type are in the identifier space having a scope that spans an entirety of the region of the network in which the protocol is administered.

33. The non-transitory computer-readable media of claim 1, wherein the instructions, when executed by the one or more processors of the current node, cause the current node to operate such that: the plurality of identifier types include at least the first identifier type and the third identifier type, and both the first identifier type and the third identifier type are in the identifier space having a scope that spans only a subset of the region of the network in which the protocol is administered.

34. The non-transitory computer-readable media of claim 1, wherein the instructions, when executed by the one or more processors of the current node, cause the current node to operate such that: the plurality of identifier types include at least the first identifier type and the third identifier type, and both the first identifier type and the third identifier type are in different identifier spaces having different scopes that span different subsets of the region of the network in which the protocol is administered.

35. The non-transitory computer-readable media of claim 1, wherein the instructions, when executed by the one or more processors of the current node, cause the current node to operate such that: the plurality of identifier types include at least the first identifier type and the third identifier type, and the identifier space having the scope that spans the plural nodes is same as the identifier space having the scope that spans the multiple nodes, such that the plural nodes are same as the multiple nodes.

36. The non-transitory computer-readable media of claim 1, wherein the instructions, when executed by the one or more processors of the current node, cause the current node to operate such that: the plurality of identifier types include at least the first identifier type and the third identifier type, and the identifier space having the scope that spans the plural nodes is different from the identifier space having the scope that spans the multiple nodes, such that the plural nodes are at least partially different from the multiple nodes.

37. The non-transitory computer-readable media of claim 1, wherein the instructions, when executed by the one or more processors of the current node, cause the current node to operate such that: the plurality of identifier types include at least the first identifier type, and the particular region is a subset of the region in which the protocol is administered.

38. The non-transitory computer-readable media of claim 1, wherein the instructions, when executed by the one or more processors of the current node, cause the current node to operate such that: the plurality of identifier types include at least the first identifier type, and the particular region does not overlap another region in which the current node resides.

39. The non-transitory computer-readable media of claim 1, wherein the instructions, when executed by the one or more processors of the current node, cause the current node to operate such that: the plurality of identifier types include at least the third identifier type, and the particular path node is in the region in which the protocol is administered.

40. The non-transitory computer-readable media of claim 1, wherein the instructions, when executed by the one or more processors of the current node, cause the current node to operate such that: the plurality of identifier types include at least the third identifier type, and the particular path node is not in another region in which the current node resides.

41. The non-transitory computer-readable media of claim 1, wherein the instructions, when executed by the one or more processors of the current node, cause the current node to operate such that: the plurality of identifier types include at least the fourth identifier type, and the fourth identifier type is in an identifier space having a scope that spans at least a portion of only one node.

42. The non-transitory computer-readable media of claim 1, wherein the instructions, when executed by the one or more processors of the current node, cause the current node to operate such that: the plurality of identifier types include at least the fourth identifier type, and the fourth identifier type is in an identifier space having a scope that spans a plurality of nodes only in the region of the network in which the protocol is administered.

43. The non-transitory computer-readable media of claim 1, wherein the instructions, when executed by the one or more processors of the current node, cause the current node to operate such that: the first, second, third, and fourth identify type each includes a single identifier.

44. The non-transitory computer-readable media of claim 1, wherein the instructions, when executed by the one or more processors of the current node, cause the current node to operate such that: the plurality of identifier types include at least the first identifier type and the third identifier type, and the scope of the identifier space of at least one of the first identifier type or the third identifier type is capable of spanning only a subset of the region of the network in which the protocol is administered.

45. The non-transitory computer-readable media of claim 1, wherein the instructions, when executed by the one or more processors of the current node, cause the current node to operate such that: the plurality of identifier types include at least the first identifier type and the third identifier type, and the scope of the identifier space of the first identifier type and the scope of the identifier space of the third identifier type are capable of spanning only different subsets of the region of the network in which the protocol is administered.

46. The non-transitory computer-readable media of claim 1, wherein the instructions, when executed by the one or more processors of the current node, cause the current node to operate such that: the plurality of identifier types include at least the first identifier type and the third identifier type, and the scope of the identifier space of the first identifier type and the scope of the identifier space of the third identifier type are capable of spanning different subsets of the region of the network in which the protocol is administered, such that different identifiers of the first identifier type and the third identifier type are in different identifier spaces having different scopes that span different subsets of the region of the network in which the protocol is administered.

47. The non-transitory computer-readable media of claim 1, wherein the instructions, when executed by the one or more processors of the current node, cause the current node to operate such that: the plurality of identifier types include at least the first identifier type and the third identifier type, and the identifier space of the first identifier type and the identifier space of the third identifier type are different identifier spaces spanning different subsets of the region of the network in which the protocol is administered, such that one or more identifiers of the first identifier type and one or more identifiers of the third identifier type are set to identify one or more same network segments with same values in the different identifier spaces.

48. The non-transitory computer-readable media of claim 1, wherein the instructions, when executed by the one or more processors of the current node, cause the current node to operate such that: the plurality of identifier types include at least the third identifier type, and the first identifier of the third identifier type is utilized to identify a plurality of associated path segment identifiers which identify a plurality of associated path segments to the particular path node.

49. The non-transitory computer-readable media of claim 1, wherein the instructions, when executed by the one or more processors of the current node, cause the current node to operate such that: the plurality of identifier types include at least the third identifier type, and the first identifier of the third identifier type is utilized to identify a plurality of associated path segment identifiers which identify a plurality of associated path segments to the particular path node, by selecting a shortest path.

50. The non-transitory computer-readable media of claim 1, wherein the instructions, when executed by the one or more processors of the current node, cause the current node to operate such that: the plurality of identifier types include at least the first identifier type, and the first identifier type includes an area-specific region identifier.

51. The non-transitory computer-readable media of claim 1, wherein the instructions, when executed by the one or more processors of the current node, cause the current node to operate such that: the plurality of identifier types include at least the first identifier type, and the first identifier type includes an area-scoped region identifier.

52. The non-transitory computer-readable media of claim 1, wherein the instructions, when executed by the one or more processors of the current node, cause the current node to operate such that: the plurality of identifier types include at least the first identifier type, and the first identifier type includes an outside scope identifier.

53. The non-transitory computer-readable media of claim 1, wherein the instructions, when executed by the one or more processors of the current node, cause the current node to operate such that: the plurality of identifier types include at least the second identifier type, and the second identifier type includes a node-specific network interface identifier.

54. The non-transitory computer-readable media of claim 1, wherein the instructions, when executed by the one or more processors of the current node, cause the current node to operate such that: the plurality of identifier types include at least the second identifier type, and the second identifier type includes a node-scoped network interface identifier.

55. The non-transitory computer-readable media of claim 1, wherein the instructions, when executed by the one or more processors of the current node, cause the current node to operate such that: the plurality of identifier types include at least the third identifier type, and the third identifier type includes an region-specific node identifier.

56. The non-transitory computer-readable media of claim 1, wherein the instructions, when executed by the one or more processors of the current node, cause the current node to operate such that: the plurality of identifier types include at least the third identifier type, and the third identifier type includes an region-scoped node identifier.

57. The non-transitory computer-readable media of claim 1, wherein the instructions, when executed by the one or more processors of the current node, cause the current node to operate such that: the plurality of identifier types include at least the fourth identifier type, and the fourth identifier type includes a node-specific identifier.

58. The non-transitory computer-readable media of claim 1, wherein the instructions, when executed by the one or more processors of the current node, cause the current node to operate such that: the plurality of identifier types include at least the fourth identifier type, and the fourth identifier type includes a node-scoped identifier.

59. The non-transitory computer-readable media of claim 1, wherein the instructions, when executed by the one or more processors of the current node, cause the current node to operate such that: the plurality of identifier types include at least the fourth identifier type, and the fourth identifier type includes a region-specific identifier.

60. The non-transitory computer-readable media of claim 1, wherein the instructions, when executed by the one or more processors of the current node, cause the current node to operate such that: the plurality of identifier types include at least the fourth identifier type, and the fourth identifier type includes a region-scoped identifier.

61. The non-transitory computer-readable media of claim 1, wherein the instructions, when executed by the one or more processors of the current node, cause the current node to operate such that: the first identifier includes a loopback address.

62. The non-transitory computer-readable media of claim 1, wherein the instructions, when executed by the one or more processors of the current node, cause the current node to operate such that: the plurality of identifier types include at least the first identifier type, and, in the event that the identifier type of the first identifier, that is identified as being for use by the current node, includes the first identifier type, the first identifier includes a subnet address.

63. The non-transitory computer-readable media of claim 1, wherein the instructions, when executed by the one or more processors of the current node, cause the current node to operate such that: the plurality of identifier types include at least the first identifier type, and, in the event that the identifier type of the first identifier, that is identified as being for use by the current node, includes the first identifier type, the first identifier includes an IP prefix.

64. The non-transitory computer-readable media of claim 1, wherein the instructions, when executed by the one or more processors of the current node, cause the current node to operate such that: the plurality of identifier types include at least the first identifier type, and, in the event that the identifier type of the first identifier, that is identified as being for use by the current node, includes the third identifier type, the first identifier includes a loopback address.

65. The non-transitory computer-readable media of claim 1, wherein the instructions, when executed by the one or more processors of the current node, cause the current node to operate such that: the first data is transmitted in the first packet to the receiving node according to a first policy, and second data is transmitted in a second packet to the receiving node according to a second policy.

66. The non-transitory computer-readable media of claim 1, wherein the instructions, when executed by the one or more processors of the current node, cause the current node to operate such that: the first data is transmitted in the first packet to the receiving node according to a first policy, and second data is transmitted in a second packet to the receiving node according to a second policy, where the first data and the second data are components of a same digital object.

67. The non-transitory computer-readable media of claim 1, wherein the instructions, when executed by the one or more processors of the current node, cause the current node to operate such that: the current node includes a border node that is at least partially in at least two regions.

68. The non-transitory computer-readable media of claim 1, wherein the instructions, when executed by the one or more processors of the current node, cause the current node to operate such that: the first path node includes a border node that is at least partially in at least two regions.

69. The non-transitory computer-readable media of claim 2, wherein the instructions, when executed by the one or more processors of the current node, cause the current node to operate such that: the plurality of identifier types supported by the protocol include the first identifier type, the second identifier type, the third identifier type, the fourth identifier type, in addition to at least one additional identifier type including:
  a fifth identifier type that:
    includes a service identifier; and
    identifies a service to be performed by at least one node in connection with the first data.

70. A non-transitory computer-readable media storing instructions that, when executed by one or more processors of a current node in a network path between a transmitting node and a receiving node in a network, cause the current node to:

based on a receipt of a first packet that is specified by a protocol utilizing a label forwarding network protocol and that includes first data, identify, as being for use by the current node, a first identifier in a first header of the first packet, the first identifier being predetermined before the receipt of the first packet and being of an identifier type of a plurality of identifier types that are supported by the protocol and that cause different data to be routed differently based on which of the plurality of identifier types are utilized for routing the different data, the plurality of identifier types including at least three of:

a first identifier type that:
- is in an identifier space having a scope that spans multiple nodes only in a region of the network in which the protocol is administered,
- identifies a particular region that includes a plurality of region nodes, and
- does not specify any particular network interface, such that:
  - in the event that the identifier type of the first identifier, that is identified as being for use by the current node which is one of the multiple nodes, includes the first identifier type: the current node is caused to transmit, based on the first identifier of the first identifier type, the first data from the current node toward a first path node that is at least partially in the particular region, via a first path segment selected from a plurality of selectable path segments, including at least one multi-hop path segment with a first hop segment and a second hop segment, such that the both the first hop segment and the second hop segment are capable of being selected based on the first identifier of the first identifier type;

a second identifier type that:
- is in an identifier space having a scope that spans at least a portion of only a single node, and
- identifies a particular network interface of a particular link path segment that directly connects the single node to an adjacent node, such that:
  - in the event that the identifier type of the first identifier, that is identified as being for use by the current node which is the single node, includes the second identifier type: the current node is caused to transmit, based on the first identifier of the second identifier type, the first data from the current node toward the receiving node to the adjacent node via the particular network interface of the particular link path segment that directly connects the single node to the adjacent node;

a third identifier type that:
- is in an identifier space having a scope that spans plural nodes only in the region of the network in which the protocol is administered,
- identifies a particular path node, and
- does not specify any particular path segment in communication with the particular path node, such that:
  - in the event that the identifier type of the first identifier, that is identified as being for use by the current node which is one of the plural nodes, includes the third identifier type: the current node is caused to transmit, based on the first identifier of the third identifier type, the first data from the current node toward the receiving node to the particular path node; and a fourth identifier type that:
- includes a symbolic identifier, and
- corresponds to a plurality of corresponding path segment identifiers: which are predetermined before the receipt of the first packet, which identify a plurality of corresponding path segments, and which are not included in the first packet header before the receipt of the first packet, such that:
  - in the event that the identifier type of the first identifier, that is identified as being for use by the current node, includes the fourth identifier type: the current node is caused to utilize the first identifier of the fourth identifier type to identify the plurality of corresponding path segment identifiers, and the current node is further caused to transmit, based on the plurality of corresponding path segment identifiers, the first data from the current node toward the receiving node via the plurality of corresponding path segments, such that the plurality of corresponding path segments are capable of being selected based on the first identifier of the fourth identifier type.

71. The non-transitory computer-readable media of claim 70, wherein the instructions, when executed by the one or more processors of the current node, cause the current node to operate such that: the first identifier is identified based on a first value and a second value.

72. The non-transitory computer-readable media of claim 71, wherein the instructions, when executed by the one or more processors of the current node, cause the current node to operate such that: the first value includes an index value and the second value includes a base value.

73. The non-transitory computer-readable media of claim 71, wherein the instructions, when executed by the one or more processors of the current node, cause the current node to operate such that: the first value is globally unique in the region, and the second value is one of a plurality of segment routing values.

74. The non-transitory computer-readable media of claim 70, wherein the instructions, when executed by the one or more processors of the current node, cause the current node to operate such that: the plurality of identifier types supported by the protocol include the second identifier type, the third identifier type, and the fourth identifier type.

75. The non-transitory computer-readable media of claim 70, wherein the instructions, when executed by the one or more processors of the current node, cause the current node to operate such that: the plurality of identifier types supported by the protocol include the first identifier type, the second identifier type, and the fourth identifier type.

76. The non-transitory computer-readable media of claim 70, wherein the instructions, when executed by the one or more processors of the current node, cause the current node to operate such that: the plurality of identifier types supported by the protocol include the first identifier type, the third identifier type, and the fourth identifier type.

77. The non-transitory computer-readable media of claim 70, wherein the instructions, when executed by the one or more processors of the current node, cause the current node to operate such that: the plurality of identifier types supported by the protocol include the first identifier type, the second identifier type, and the third identifier type.

78. The non-transitory computer-readable media of claim 70, wherein the instructions, when executed by the one or more processors of the current node, cause the current node to operate such that: the first identifier is identified as being an only identifier in the first header of the first packet.

79. The non-transitory computer-readable media of claim 70, wherein the instructions, when executed by the one or more processors of the current node, cause the current node to operate such that: a second identifier is included in the first packet for being identified as being for use by another node in the network path to route the first data toward the receiving node.

80. The non-transitory computer-readable media of claim 70, wherein the instructions, when executed by the one or more processors of the current node, cause the current node to operate such that: an operation identifier is identified based on the first identifier for performing an operation in connection with routing the first data.

81. The non-transitory computer-readable media of claim 70, wherein the instructions, when executed by the one or more processors of the current node, cause the current node to operate such that: the first identifier is of the first identifier type and is the only identifier in the first header of the first packet, the transmitting node includes a source node, and the first path node includes the receiving node.

82. The non-transitory computer-readable media of claim 70, wherein the instructions, when executed by the one or more processors of the current node, cause the current node to operate such that: the first identifier is of the second identifier type and is the only identifier in the first header of the first packet, the transmitting node includes a source node, and the adjacent node includes the receiving node.

83. The non-transitory computer-readable media of claim 70, wherein the instructions, when executed by the one or more processors of the current node, cause the current node to operate such that: the first identifier is of the third identifier type and is the only identifier in the first header of the first packet, the transmitting node includes a source node, and the particular path node includes the receiving node.

84. The non-transitory computer-readable media of claim 70, wherein the instructions, when executed by the one or more processors of the current node, cause the current node to operate such that: the first identifier is of the fourth identifier type and is the only identifier in the first header of the first packet.

85. The non-transitory computer-readable media of claim 70, wherein the instructions, when executed by the one or more processors of the current node, cause the current node to operate such that:
  the plurality of identifier types include at least the first identifier type and the fourth identifier type;
  the first packet includes the first identifier of the first identifier type, and does not include any identifier of the fourth identifier type; and
  a second packet is received at the current node that includes a second identifier of the fourth identifier type, and that does not include any identifier of the first identifier type.

86. The non-transitory computer-readable media of claim 70, wherein the instructions, when executed by the one or more processors of the current node, cause the current node to operate such that:
  the plurality of identifier types include at least the first identifier type, the second identifier type, the third identifier type, and the fourth identifier type;
  the first packet includes the first identifier of the first identifier type, and that does not include any identifier of the second identifier type, the third identifier type, nor the fourth identifier type;
  a second packet is received at the current node that includes a second identifier of the second identifier type, and that does not include any identifier of the first identifier type, the third identifier type, nor the fourth identifier type;
  a third packet is received at the current node that includes a third identifier of the third identifier type, and that does not include any identifier of the first identifier type, the second identifier type, nor the fourth identifier type;
  a fourth packet is received at the current node that includes a fourth identifier of the fourth identifier type, and that does not include any identifier of the first identifier type, the second identifier type, nor the third identifier type; and
  a fifth packet is received at the current node that includes at least two identifiers of at least two different types of: the first identifier type, the second identifier type, the third identifier type, or the fourth identifier type.

87. The non-transitory computer-readable media of claim 70, wherein the instructions, when executed by the one or more processors of the current node, cause the current node to operate such that:
  the plurality of identifier types include at least the first identifier type and the second identifier type; and
  the first packet further includes a second identifier that is not identified, by the current node, as being for use by the current node, where:
    the first identifier is of the first identifier type, and
    the second identifier is of the second identifier type and is for being identified as being for use by the first path node which is the single node, to transmit, based on the second identifier of the second identifier type, the first data from the first path node toward the receiving node to the adjacent node via the particular network interface of the particular link path segment.

88. The non-transitory computer-readable media of claim 70, wherein the instructions, when executed by the one or more processors of the current node, cause the current node to operate such that:
  the plurality of identifier types include at least the first identifier type, the second identifier type, the third identifier type, and the fourth identifier type; and
  the first packet further includes a second identifier that is not identified, by the current node, as being for use by the current node, where:
    the first identifier is of the first identifier type, and
    the second identifier is of the third identifier type and is for being identified as being for use by the first path node, to transmit, based on the second identifier of the third identifier type, the first data from the first path node toward the receiving node to the particular path node.

89. The non-transitory computer-readable media of claim 70, wherein the instructions, when executed by the one or more processors of the current node, cause the current node to operate such that:
  the plurality of identifier types include at least the first identifier type and the fourth identifier type; and
  the first packet further includes a second identifier that is not identified, by the current node, as being for use by the current node, where:
    the first identifier is of the first identifier type, and the second identifier is of the fourth identifier type and is for being identified as being for use by the first path node, to: utilize the second identifier of the fourth identifier type to identify the plurality of corresponding path segment identifiers, and transmit, based on the plurality of corresponding path segment identifiers, the first data from the current node toward the receiving node via the plurality of corresponding path segments, such that the plurality of corresponding path segments are capable of being selected based on the second identifier of the fourth identifier type without utilizing any other identifier in the first header of the first packet.

90. The non-transitory computer-readable media of claim 70, wherein the instructions, when executed by the one or more processors of the current node, cause the current node to operate such that:
the plurality of identifier types include at least the second identifier type and the third identifier type;
the first packet further includes a second identifier that is not identified, by the current node, as being for use by the current node, where:
the first identifier is of the third identifier type, and
the second identifier is of the second identifier type and is for being identified as being for use by the particular path node, to transmit, based on the second identifier of the second identifier type, the first data from the particular path node toward the receiving node to the adjacent node via the particular network interface of the particular link path segment that directly connects to the adjacent node, where the single node includes the particular path node.

91. The non-transitory computer-readable media of claim 70, wherein the instructions, when executed by the one or more processors of the current node, cause the current node to operate such that:
the plurality of identifier types include at least the first identifier type; and
the first packet further includes a second identifier that is not identified, by the current node, as being for use by the current node, where:
the first identifier is of the first identifier type that identifies only a first particular region that is a first subset of the region and that includes a plurality of first particular region nodes that do not include the current node, and
the second identifier is of the first identifier type that identifies only a second particular region that is a second subset of the region and that includes a plurality of second particular region nodes that do not include the first path node.

92. The non-transitory computer-readable media of claim 70, wherein the instructions, when executed by the one or more processors of the current node, cause the current node to operate such that:
the plurality of identifier types include at least the first identifier type; and
the first packet further includes a second identifier that is not identified, by the current node, as being for use by the current node, where:
the first identifier is of the first identifier type that identifies only a first particular region that is a first subset of the region and that includes a plurality of first particular region nodes, and
the second identifier is of the first identifier type that identifies only a second particular region that is a second subset of the region and that includes a plurality of second particular region nodes.

93. The non-transitory computer-readable media of claim 92, wherein the instructions, when executed by the one or more processors of the current node, cause the current node to operate such that: the first identifier of the first identifier type is in a same identifier space as the second identifier of the first identifier type.

94. The non-transitory computer-readable media of claim 92, wherein the instructions, when executed by the one or more processors of the current node, cause the current node to operate such that: the first identifier of the first identifier type is in a different identifier space as that of the second identifier of the first identifier type.

95. The non-transitory computer-readable media of claim 92, wherein the instructions, when executed by the one or more processors of the current node, cause the current node to operate such that: the first identifier of the first identifier type and the second identifier of the first identifier type are in different identifier spaces having different scopes that span different subsets of the region of the network in which the protocol is administered, where the first identifier of the first identifier type and the second identifier of the first identifier type are set to identify same network segments with same values in the different identifier spaces having the different scopes that span the different subsets of the region of the network.

96. The non-transitory computer-readable media of claim 70, wherein the instructions, when executed by the one or more processors of the current node, cause the current node to operate such that:
the plurality of identifier types include at least the first identifier type and the third identifier type;
the first identifier type is in the identifier space having the scope that spans only a first subset of the region, including a plurality of first subset nodes, of the network in which the protocol is administered, and
the third identifier type is in the identifier space having the scope that spans only a second subset of the region, including a plurality of second subset nodes that do not include at least one of the plurality of first subset nodes, of the network in which the protocol is administered.

97. The non-transitory computer-readable media of claim 70, wherein the instructions, when executed by the one or more processors of the current node, cause the current node to operate such that: the plurality of identifier types include at least the first identifier type, and the first identifier type identifies only the particular region without identifying any other particular regions.

98. The non-transitory computer-readable media of claim 70, wherein the instructions, when executed by the one or more processors of the current node, cause the current node to operate such that: the plurality of identifier types include at least the first identifier type, and the first identifier type identifies a plurality of the particular regions.

99. The non-transitory computer-readable media of claim 70, wherein the instructions, when executed by the one or more processors of the current node, cause the current node to operate such that: the plurality of identifier types include at least the first identifier type, and the plurality of region nodes do not include the current node.

100. The non-transitory computer-readable media of claim 70, wherein the instructions, when executed by the one or more processors of the current node, cause the current node to operate such that: the plurality of identifier types include at least the first identifier type, and the plurality of region nodes include the current node.

101. The non-transitory computer-readable media of claim 70, wherein the instructions, when executed by the one or more processors of the current node, cause the current node to operate such that: the plurality of identifier types include at least the first identifier type, and, in the event that the identifier type of the first identifier, that is identified as being for use by the current node which is one of the multiple nodes, includes the first identifier type: the first data is transmitted from the current node to the first path node that is at least partially in the particular region.

102. The non-transitory computer-readable media of claim 70, wherein the instructions, when executed by the one or more processors of the current node, cause the current node to operate such that: the plurality of identifier types include at least the first identifier type, and both the first hop segment and the second hop segment are capable of being selected based on the first identifier of the first identifier type without utilizing any other identifier in the first packet.

103. The non-transitory computer-readable media of claim 70, wherein the instructions, when executed by the one or more processors of the current node, cause the current node to operate such that: the plurality of identifier types include at least the fourth identifier type, and the plurality of corresponding path segments are capable of being selected based on the first identifier of the fourth identifier type without utilizing any other identifier in the first packet.

104. The non-transitory computer-readable media of claim 70, wherein the instructions, when executed by the one or more processors of the current node, cause the current node to operate such that: the plurality of identifier types include at least the first identifier type and the third identifier type, and both the first identifier type and the third identifier type are in the identifier space having a scope that spans an entirety of the region of the network in which the protocol is administered.

105. The non-transitory computer-readable media of claim 70, wherein the instructions, when executed by the one or more processors of the current node, cause the current node to operate such that: the plurality of identifier types include at least the first identifier type and the third identifier type, and both the first identifier type and the third identifier type are in the identifier space having a scope that spans only a subset of the region of the network in which the protocol is administered.

106. The non-transitory computer-readable media of claim 70, wherein the instructions, when executed by the one or more processors of the current node, cause the current node to operate such that: the plurality of identifier types include at least the first identifier type and the third identifier type, and both the first identifier type and the third identifier type are in different identifier spaces having different scopes that span different subsets of the region of the network in which the protocol is administered.

107. The non-transitory computer-readable media of claim 70, wherein the instructions, when executed by the one or more processors of the current node, cause the current node to operate such that: the plurality of identifier types include at least the first identifier type and the third identifier type, and the identifier space having the scope that spans the plural nodes is same as the identifier space having the scope that spans the multiple nodes, such that the plural nodes are same as the multiple nodes.

108. The non-transitory computer-readable media of claim 70, wherein the instructions, when executed by the one or more processors of the current node, cause the current node to operate such that: the plurality of identifier types include at least the first identifier type and the third identifier type, and the identifier space having the scope that spans the plural nodes is different from the identifier space having the scope that spans the multiple nodes, such that the plural nodes are at least partially different from the multiple nodes.

109. The non-transitory computer-readable media of claim 70, wherein the instructions, when executed by the one or more processors of the current node, cause the current node to operate such that: the plurality of identifier types include at least the first identifier type, and the particular region is a subset of the region in which the protocol is administered.

110. The non-transitory computer-readable media of claim 70, wherein the instructions, when executed by the one or more processors of the current node, cause the current node to operate such that: the plurality of identifier types include at least the first identifier type, and the particular region does not overlap another region in which the current node resides.

111. The non-transitory computer-readable media of claim 70, wherein the instructions, when executed by the one or more processors of the current node, cause the current node to operate such that: the plurality of identifier types include at least the third identifier type, and the particular path node is in the region in which the protocol is administered.

112. The non-transitory computer-readable media of claim 70, wherein the instructions, when executed by the one or more processors of the current node, cause the current node to operate such that: the plurality of identifier types include at least the third identifier type, and the particular path node is not in another region in which the current node resides.

113. The non-transitory computer-readable media of claim 70, wherein the instructions, when executed by the one or more processors of the current node, cause the current node to operate such that: the plurality of identifier types include at least the fourth identifier type, and the fourth identifier type is in an identifier space having a scope that spans at least a portion of only one node.

114. The non-transitory computer-readable media of claim 70, wherein the instructions, when executed by the one or more processors of the current node, cause the current node to operate such that: the plurality of identifier types include at least the fourth identifier type, and the fourth identifier type is in an identifier space having a scope that spans a plurality of nodes only in the region of the network in which the protocol is administered.

115. The non-transitory computer-readable media of claim 70, wherein the instructions, when executed by the one or more processors of the current node, cause the current node to operate such that: the first, second, third, and fourth identify type each includes a single identifier.

116. The non-transitory computer-readable media of claim 70, wherein the instructions, when executed by the one or more processors of the current node, cause the current node to operate such that: the plurality of identifier types include at least the first identifier type and the third identifier type, and the scope of the identifier space of at least one of the first identifier type or the third identifier type is capable of spanning only a subset of the region of the network in which the protocol is administered.

117. The non-transitory computer-readable media of claim 70, wherein the instructions, when executed by the one or more processors of the current node, cause the current node to operate such that: the plurality of identifier types include at least the first identifier type and the third identifier type, and the scope of the identifier space of the first identifier type and the scope of the identifier space of the third identifier type are capable of spanning only different subsets of the region of the network in which the protocol is administered.

118. The non-transitory computer-readable media of claim 70, wherein the instructions, when executed by the one or more processors of the current node, cause the current node to operate such that: the plurality of identifier types include at least the first identifier type and the third identifier type, and the scope of the identifier space of the first identifier type and the scope of the identifier space of the third identifier type are capable of spanning different subsets of the region of the network in which the protocol is administered, such that different identifiers of the first identifier type and the third identifier type are in different identifier spaces having different scopes that span different subsets of the region of the network in which the protocol is administered.

119. The non-transitory computer-readable media of claim 70, wherein the instructions, when executed by the one or more processors of the current node, cause the current node to operate such that: the plurality of identifier types include at least the first identifier type and the third identifier type, and the identifier space of the first identifier type and the identifier space of the third identifier type are different identifier spaces spanning different subsets of the region of the network in which the protocol is administered, such that one or more identifiers of the first identifier type and one or more identifiers of the third identifier type are set to identify one or more same network segments with same values in the different identifier spaces.

120. The non-transitory computer-readable media of claim 70, wherein the instructions, when executed by the one or more processors of the current node, cause the current node to operate such that: the plurality of identifier types include at least the third identifier type, and the first identifier of the third identifier type is utilized to identify a plurality of associated path segment identifiers which identify a plurality of associated path segments to the particular path node.

121. The non-transitory computer-readable media of claim 70, wherein the instructions, when executed by the one or more processors of the current node, cause the current node to operate such that: the plurality of identifier types include at least the third identifier type, and the first identifier of the third identifier type is utilized to identify a plurality of associated path segment identifiers which identify a plurality of associated path segments to the particular path node, by selecting a shortest path.

122. The non-transitory computer-readable media of claim 70, wherein the instructions, when executed by the one or more processors of the current node, cause the current node to operate such that: the plurality of identifier types include at least the first identifier type, and the first identifier type includes an area-specific region identifier.

123. The non-transitory computer-readable media of claim 70, wherein the instructions, when executed by the one or more processors of the current node, cause the current node to operate such that: the plurality of identifier types include at least the first identifier type, and the first identifier type includes an area-scoped region identifier.

124. The non-transitory computer-readable media of claim 70, wherein the instructions, when executed by the one or more processors of the current node, cause the current node to operate such that: the plurality of identifier types include at least the first identifier type, and the first identifier type includes an outside scope identifier.

125. The non-transitory computer-readable media of claim 70, wherein the instructions, when executed by the one or more processors of the current node, cause the current node to operate such that: the plurality of identifier types include at least the second identifier type, and the second identifier type includes a node-specific network interface identifier.

126. The non-transitory computer-readable media of claim 70, wherein the instructions, when executed by the one or more processors of the current node, cause the current node to operate such that: the plurality of identifier types include at least the second identifier type, and the second identifier type includes a node-scoped network interface identifier.

127. The non-transitory computer-readable media of claim 70, wherein the instructions, when executed by the one or more processors of the current node, cause the current node to operate such that: the plurality of identifier types include at least the third identifier type, and the third identifier type includes an region-specific node identifier.

128. The non-transitory computer-readable media of claim 70, wherein the instructions, when executed by the one or more processors of the current node, cause the current node to operate such that: the plurality of identifier types include at least the third identifier type, and the third identifier type includes an region-scoped node identifier.

129. The non-transitory computer-readable media of claim 70, wherein the instructions, when executed by the one or more processors of the current node, cause the current node to operate such that: the plurality of identifier types include at least the fourth identifier type, and the fourth identifier type includes a node-specific identifier.

130. The non-transitory computer-readable media of claim 70, wherein the instructions, when executed by the one or more processors of the current node, cause the current node to operate such that: the plurality of identifier types include at least the fourth identifier type, and the fourth identifier type includes a node-scoped identifier.

131. The non-transitory computer-readable media of claim 70, wherein the instructions, when executed by the one or more processors of the current node, cause the current node to operate such that: the plurality of identifier types include at least the fourth identifier type, and the fourth identifier type includes a region-specific identifier.

132. The non-transitory computer-readable media of claim 70, wherein the instructions, when executed by the one or more processors of the current node, cause the current node to operate such that: the plurality of identifier types include at least the fourth identifier type, and the fourth identifier type includes a region-scoped identifier.

133. The non-transitory computer-readable media of claim 70, wherein the instructions, when executed by the one or more processors of the current node, cause the current node to operate such that: the first identifier includes a loopback address.

134. The non-transitory computer-readable media of claim 70, wherein the instructions, when executed by the one or more processors of the current node, cause the current node to operate such that: the plurality of identifier types include at least the first identifier type, and, in the event that the identifier type of the first identifier, that is identified as being for use by the current node, includes the first identifier type, the first identifier includes a subnet address.

135. The non-transitory computer-readable media of claim 70, wherein the instructions, when executed by the one or more processors of the current node, cause the current node to operate such that: the plurality of identifier types include at least the first identifier type, and, in the event that the identifier type of the first identifier, that is identified as being for use by the current node, includes the first identifier type, the first identifier includes an IP prefix.

136. The non-transitory computer-readable media of claim 70, wherein the instructions, when executed by the one or more processors of the current node, cause the current node to operate such that: the plurality of identifier types include at least the first identifier type, and, in the event that the identifier type of the first identifier, that is identified as being for use by the current node, includes the third identifier type, the first identifier includes a loopback address.

137. The non-transitory computer-readable media of claim 70, wherein the instructions, when executed by the one or more processors of the current node, cause the current node to operate such that: the first data is transmitted in the first packet to the receiving node according to a first policy, and second data is transmitted in a second packet to the receiving node according to a second policy.

138. The non-transitory computer-readable media of claim 70, wherein the instructions, when executed by the one or more processors of the current node, cause the current node to operate such that: the first data is transmitted in the first packet to the receiving node according to a first policy, and second data is transmitted in a second packet to the receiving node according to a second policy, where the first data and the second data are components of a same digital object.

139. The non-transitory computer-readable media of claim 70, wherein the instructions, when executed by the one or more processors of the current node, cause the current node to operate such that: the current node includes a border node that is at least partially in at least two regions.

140. The non-transitory computer-readable media of claim 70, wherein the instructions, when executed by the one or more processors of the current node, cause the current node to operate such that: the first path node includes a border node that is at least partially in at least two regions.

141. The non-transitory computer-readable media of claim 70, wherein the instructions, when executed by the one or more processors of the current node, cause the current node to operate such that: the plurality of identifier types supported by the protocol include the first identifier type, the second identifier type, the third identifier type, the fourth identifier type, in addition to at least two additional identifier types.

142. The non-transitory computer-readable media of claim 141, wherein the instructions, when executed by the one or more processors of the current node, cause the current node to operate such that: the first packet includes the first identifier of the first identifier type, and does not include any identifier of the fourth identifier type; and
    a second packet is received at the current node that includes a second identifier of the fourth identifier type, and that does not include any identifier of the first identifier type.

143. The non-transitory computer-readable media of claim 141, wherein the instructions, when executed by the one or more processors of the current node, cause the current node to operate such that: the first packet includes the first identifier of the first identifier type, and that does not include any identifier of the second identifier type, the third identifier type, nor the fourth identifier type;
    a second packet is received at the current node that includes a second identifier of the second identifier type, and that does not include any identifier of the first identifier type, the third identifier type, nor the fourth identifier type;
    a third packet is received at the current node that includes a third identifier of the third identifier type, and that does not include any identifier of the first identifier type, the second identifier type, nor the fourth identifier type;
    a fourth packet is received at the current node that includes a fourth identifier of the fourth identifier type, and that does not include any identifier of the first identifier type, the second identifier type, nor the third identifier type; and
    a fifth packet is received at the current node that includes at least two identifiers of at least two different types of: the first identifier type, the second identifier type, the third identifier type, or the fourth identifier type.

144. The non-transitory computer-readable media of claim 141, wherein the instructions, when executed by the one or more processors of the current node, cause the current node to operate such that: the first packet further includes a second identifier that is not identified, by the current node, as being for use by the current node, where:
    the first identifier is of the first identifier type, and the second identifier is of the second identifier type and is for being identified as being for use by the first path node which is the single node, to transmit, based on the second identifier of the second identifier type, the first data from the first path node toward the receiving node to the adjacent node via the particular network interface of the particular link path segment.

145. The non-transitory computer-readable media of claim 141, wherein the instructions, when executed by the one or more processors of the current node, cause the current node to operate such that: the first packet further includes a second identifier that is not identified, by the current node, as being for use by the current node, where:
    the first identifier is of the first identifier type, and
    the second identifier is of the third identifier type and is for being identified as being for use by the first path node, to transmit, based on the second identifier of the third identifier type, the first data from the first path node toward the receiving node to the particular path node.

146. The non-transitory computer-readable media of claim 141, wherein the instructions, when executed by the one or more processors of the current node, cause the current node to operate such that: the first packet further includes a second identifier that is not identified, by the current node, as being for use by the current node, where:
    the first identifier is of the first identifier type, and
    the second identifier is of the fourth identifier type and is for being identified as being for use by the first path node, to: utilize the second identifier of the fourth identifier type to identify the plurality of corresponding path segment identifiers, and transmit, based on the plurality of corresponding path segment identifiers, the first data from the current node toward the receiving node via the plurality of corresponding path segments, such that the plurality of corresponding path segments are capable of being selected based on the second identifier of the fourth identifier type without utilizing any other identifier in the first header of the first packet.

147. The non-transitory computer-readable media of claim 141, wherein the instructions, when executed by the one or more processors of the current node, cause the current node to operate such that: the first packet further includes a second identifier that is not identified, by the current node, as being for use by the current node, where:
the first identifier is of the third identifier type, and
the second identifier is of the second identifier type and is for being identified as being for use by the particular path node, to transmit, based on the second identifier of the second identifier type, the first data from the particular path node toward the receiving node to the adjacent node via the particular network interface of the particular link path segment that directly connects to the adjacent node, where the single node includes the particular path node.

148. The non-transitory computer-readable media of claim 141, wherein the instructions, when executed by the one or more processors of the current node, cause the current node to operate such that: the first packet further includes a second identifier that is not identified, by the current node, as being for use by the current node, where:
the first identifier is of the first identifier type that identifies only a first particular region that is a first subset of the region and that includes a plurality of first particular region nodes that do not include the current node, and
the second identifier is of the first identifier type that identifies only a second particular region that is a second subset of the region and that includes a plurality of second particular region nodes that do not include the first path node.

149. The non-transitory computer-readable media of claim 141, wherein the instructions, when executed by the one or more processors of the current node, cause the current node to operate such that: the first packet further includes a second identifier that is not identified, by the current node, as being for use by the current node, where:
the first identifier is of the first identifier type that identifies only a first particular region that is a first subset of the region and that includes a plurality of first particular region nodes, and
the second identifier is of the first identifier type that identifies only a second particular region that is a second subset of the region and that includes a plurality of second particular region nodes.

150. The non-transitory computer-readable media of claim 149, wherein the instructions, when executed by the one or more processors of the current node, cause the current node to operate such that: the first identifier of the first identifier type is in a same identifier space as the second identifier of the first identifier type.

151. The non-transitory computer-readable media of claim 149, wherein the instructions, when executed by the one or more processors of the current node, cause the current node to operate such that: the first identifier of the first identifier type is in a different identifier space as that of the second identifier of the first identifier type.

152. The non-transitory computer-readable media of claim 149, wherein the instructions, when executed by the one or more processors of the current node, cause the current node to operate such that: the first identifier of the first identifier type and the second identifier of the first identifier type are in different identifier spaces having different scopes that span different subsets of the region of the network in which the protocol is administered, where the first identifier of the first identifier type and the second identifier of the first identifier type are set to identify same network segments with same values in the different identifier spaces having the different scopes that span the different subsets of the region of the network.

153. The non-transitory computer-readable media of claim 141, wherein the instructions, when executed by the one or more processors of the current node, cause the current node to operate such that:
the first identifier type is in the identifier space having the scope that spans only a first subset of the region, including a plurality of first subset nodes, of the network in which the protocol is administered, and
the third identifier type is in the identifier space having the scope that spans only a second subset of the region, including a plurality of second subset nodes that do not include at least one of the plurality of first subset nodes, of the network in which the protocol is administered.

154. The non-transitory computer-readable media of claim 141, wherein the instructions, when executed by the one or more processors of the current node, cause the current node to operate such that: the first identifier type identifies only the particular region without identifying any other particular regions.

155. The non-transitory computer-readable media of claim 141, wherein the instructions, when executed by the one or more processors of the current node, cause the current node to operate such that: the first identifier type identifies a plurality of the particular regions.

156. The non-transitory computer-readable media of claim 141, wherein the instructions, when executed by the one or more processors of the current node, cause the current node to operate such that: the plurality of region nodes do not include the current node.

157. The non-transitory computer-readable media of claim 141, wherein the instructions, when executed by the one or more processors of the current node, cause the current node to operate such that: the plurality of region nodes include the current node.

158. The non-transitory computer-readable media of claim 141, wherein the instructions, when executed by the one or more processors of the current node, cause the current node to operate such that: in the event that the identifier type of the first identifier, that is identified as being for use by the current node which is one of the multiple nodes, includes the first identifier type: the first data is transmitted from the current node to the first path node that is at least partially in the particular region.

159. The non-transitory computer-readable media of claim 141, wherein the instructions, when executed by the one or more processors of the current node, cause the current node to operate such that: both the first hop segment and the second hop segment are capable of being selected based on the first identifier of the first identifier type without utilizing any other identifier in the first packet.

160. The non-transitory computer-readable media of claim 141, wherein the instructions, when executed by the one or more processors of the current node, cause the current node to operate such that: the plurality of corresponding path segments are capable of being selected based on the first identifier of the fourth identifier type without utilizing any other identifier in the first packet.

161. The non-transitory computer-readable media of claim 141, wherein the instructions, when executed by the one or more processors of the current node, cause the current node to operate such that: both the first identifier type and the third identifier type are in the identifier space having a scope that spans an entirety of the region of the network in which the protocol is administered.

162. The non-transitory computer-readable media of claim 141, wherein the instructions, when executed by the one or more processors of the current node, cause the current node to operate such that: both the first identifier type and the third identifier type are in the identifier space having a scope that spans only a subset of the region of the network in which the protocol is administered.

163. The non-transitory computer-readable media of claim 141, wherein the instructions, when executed by the one or more processors of the current node, cause the current node to operate such that: both the first identifier type and the third identifier type are in different identifier spaces having different scopes that span different subsets of the region of the network in which the protocol is administered.

164. The non-transitory computer-readable media of claim 141, wherein the instructions, when executed by the one or more processors of the current node, cause the current node to operate such that: the identifier space having the scope that spans the plural nodes is same as the identifier space having the scope that spans the multiple nodes, such that the plural nodes are same as the multiple nodes.

165. The non-transitory computer-readable media of claim 141, wherein the instructions, when executed by the one or more processors of the current node, cause the current node to operate such that: the identifier space having the scope that spans the plural nodes is different from the identifier space having the scope that spans the multiple nodes, such that the plural nodes are at least partially different from the multiple nodes.

166. The non-transitory computer-readable media of claim 141, wherein the instructions, when executed by the one or more processors of the current node, cause the current node to operate such that: the particular region is a subset of the region in which the protocol is administered.

167. The non-transitory computer-readable media of claim 141, wherein the instructions, when executed by the one or more processors of the current node, cause the current node to operate such that: the particular region does not overlap another region in which the current node resides.

168. The non-transitory computer-readable media of claim 141, wherein the instructions, when executed by the one or more processors of the current node, cause the current node to operate such that: the particular path node is in the region in which the protocol is administered.

169. The non-transitory computer-readable media of claim 141, wherein the instructions, when executed by the one or more processors of the current node, cause the current node to operate such that: the particular path node is another region in which the current node resides.

170. The non-transitory computer-readable media of claim 141, wherein the instructions, when executed by the one or more processors of the current node, cause the current node to operate such that: the fourth identifier type is in an identifier space having a scope that spans at least a portion of only one node.

171. The non-transitory computer-readable media of claim 141, wherein the instructions, when executed by the one or more processors of the current node, cause the current node to operate such that: the fourth identifier type is in an identifier space having a scope that spans a plurality of nodes only in the region of the network in which the protocol is administered.

172. The non-transitory computer-readable media of claim 141, wherein the instructions, when executed by the one or more processors of the current node, cause the current node to operate such that: the scope of the identifier space of the first identifier type and the scope of the identifier space of the third identifier type are capable of spanning different subsets of the region of the network in which the protocol is administered, such that different identifiers of the first identifier type and the third identifier type are in different identifier spaces having different scopes that span different subsets of the region of the network in which the protocol is administered.

173. The non-transitory computer-readable media of claim 141, wherein the instructions, when executed by the one or more processors of the current node, cause the current node to operate such that: the identifier space of the first identifier type and the identifier space of the third identifier type are different identifier spaces spanning different subsets of the region of the network in which the protocol is administered, such that one or more identifiers of the first identifier type and one or more identifiers of the third identifier type are set to identify one or more same network segments with same values in the different identifier spaces.

174. The non-transitory computer-readable media of claim 141, wherein the instructions, when executed by the one or more processors of the current node, cause the current node to operate such that: the first identifier of the third identifier type is utilized to identify a plurality of associated path segment identifiers which identify a plurality of associated path segments to the particular path node.

175. The non-transitory computer-readable media of claim 141, wherein the instructions, when executed by the one or more processors of the current node, cause the current node to operate such that: the first identifier includes a loopback address.

176. The non-transitory computer-readable media of claim 141, wherein the instructions, when executed by the one or more processors of the current node, cause the current node to operate such that: in the event that the identifier type of the first identifier, that is identified as being for use by the current node, includes the first identifier type, the first identifier includes a subnet address.

177. The non-transitory computer-readable media of claim 141, wherein the instructions, when executed by the one or more processors of the current node, cause the current node to operate such that: in the event that the identifier type of the first identifier, that is identified as being for use by the current node, includes the first identifier type, the first identifier includes an IP prefix.

178. The non-transitory computer-readable media of claim 141, wherein the instructions, when executed by the one or more processors of the current node, cause the current node to operate such that: in the event that the identifier type of the first identifier, that is identified as being for use by the current node, includes the third identifier type, the first identifier includes a loopback address.

179. The non-transitory computer-readable media of claim 141, wherein the instructions, when executed by the one or more processors of the current node, cause the current node to operate such that: the first data is transmitted in the first packet to the receiving node according to a first policy, and second data is transmitted in a second packet to the receiving node according to a second policy, where the first data and the second data are components of a same digital object.

180. The non-transitory computer-readable media of claim 141, wherein at least one of:
the region includes a logical area of the network;
the region includes a physical area of the network, or a virtual area of the network;
the protocol utilizes the label forwarding network protocol, by including at least one feature thereof;
the protocol utilizes the label forwarding network protocol, by including at least one feature thereof;

the protocol utilizes the label forwarding network protocol, by being an extension thereof;
the protocol utilizes the label forwarding network protocol, by being an adaptation thereof;
the label forwarding network protocol includes a Multiprotocol Label Switching protocol;
toward the receiving node, includes along the network path to the receiving node without reaching the receiving node;
the first identifier is identified as being for use by the current node, based on a position of the first identifier;
the first identifier is identified as being for use by the current node, based on a location of the first identifier;
the first identifier is identified as being for use by the current node, by being identified as being active for the current node;
the plurality of identifier types including at least three of, by including only three of the first, second, third, and fourth identifier types, and excluding at least one of the first, second, third, and fourth identifier types;
the plurality of identifier types including at least three of, by including all of the first, second, third, and fourth identifier types;
the plurality of identifier types including at least three of, by including a single instance of each of three of: the first, second, third, and fourth identifier types;
the symbolic identifier maps to at least one protocol address;
the symbolic identifier maps to an IP address;
the symbolic identifier is capable of mapping to a plurality of addresses;
the symbolic identifier maps to a node identifier and a network interface identifier;
the symbolic identifier maps to network segment identifiers including a node identifier and a network interface identifier;
the symbolic identifier maps to network segment identifiers of a multi-hop path segment including a node and a network interface;
toward the receiving node, includes along a way to the receiving node without reaching the receiving node;
the at least portion of only the single node, includes an entirety of the single node;
the first identifier includes an address;
the first identifier is the only identifier in the header of the first packet;
the first identifier type does not specify any particular network interface, by specifying the particular region which, in turn, is used to identify at least one particular network interface;
the particular region overlaps the region;
the third identifier type does not specify any particular path segment, by specifying the particular path node which, in turn, is used to identify at least one particular path segment;
the particular region overlaps the region;
the at least one particular path segment includes a particular network interface;
the at least one particular path segment includes a particular component of a specific node;
the at least one particular path segment includes a particular component of the network;
the particular region includes one specifically-identified region;
the particular path node includes one specifically-identified path node;
the particular link path segment includes one specifically-identified link path segment;
the particular network interface includes one specifically-identified network interface;
each instance of specify includes a specific identification;
the particular link path segment directly connects the single node to the adjacent node, by connecting the single node to the adjacent node, with no additional node therebetween;
the protocol is administered by being used;
the first hop segment and the second hop segment share at least one common node;
the single node is the same as the one node;
the single node is different from the one node;
the plural nodes are the same as the multiple nodes;
the plural nodes are different from the multiple nodes;
the plural nodes only in the region of the network, include all of the plural nodes in the region of the network;
the plural nodes only in the region of the network, include any and all nodes in the region of the network;
the multiple nodes only in the region of the network, include any and all nodes in the region of the network;
the multiple nodes only in the region of the network, include all of the multiple nodes in the region of the network;
the symbolic identifier maps to at least one protocol address;
the symbolic identifier maps to at least one protocol address, that includes at least one identifier used by the protocol;
the symbolic identifier maps to at least one protocol address, that includes at least one particular identifier used by the protocol;
the symbolic identifier maps to at least one protocol address, that includes at least one particular identifier used by the protocol to identify at least one particular network component;
the symbolic identifier maps to at least one protocol address, that includes at least one particular identifier used by the protocol to identify at least one particular network segment;
changes may be made to the plurality of corresponding path segments, despite the plurality of corresponding path segment identifiers being predetermined before the receipt of the first packet;
the plurality of region nodes in the region of the first identifier type is the same as those in the region of the third identifier type;
the plurality of region nodes in the region of the first identifier type are different from those in the region of the third identifier type;
the plurality of associated path segments, the plurality of corresponding path segments, and
the plurality of selectable path segments, share at least one common path segment;
the plurality of associated path segments, the plurality of corresponding path segments; or
the plurality of selectable path segments, do not share any common path segment.

181. A computer-implemented method, comprising:
at a network:
administering a protocol that processes packets of a plurality of identifier types that are supported by the protocol and that cause data transmission in different ways, the plurality of identifier types including:
a first identifier type that:

is in an identifier space having a scope that spans multiple nodes only in a region of the network in which the protocol is administered, identifies a particular region that includes a plurality of region nodes, and does not specify any particular network interface;

a second identifier type that:
is in an identifier space having a scope that spans at least a portion of only a single node, and
identifies a particular network interface of a particular link path segment that directly connects the single node to an adjacent node;

a third identifier type that:
is in an identifier space having a scope that spans plural nodes only in the region of the network in which the protocol is administered,
identifies a particular path node, and
does not specify any particular path segment in communication with the particular path node;

a fourth identifier type that:
includes a symbolic identifier, and
corresponds to a plurality of corresponding path segment identifiers which identify a plurality of corresponding path segments; and a fifth identifier type;

at a first network node in a first network path including a first source node, in a second network path including a second source node, and in a third network path including a third source node:

based on a receipt, at the first network node, of a first packet specified by the protocol and including first data, identifying, as being for use by the first network node and in a first header of the first packet, a first identifier of a first identifier set, the first identifier set being predetermined at the first source node and the first identifier of the first identifier set being of the first identifier type such that the first network node is one of the multiple nodes;

transmitting, based on the first identifier of the first identifier set, the first data from the first network node toward a first path node that is at least partially in the particular region, via a first path segment selected from a plurality of selectable path segments, including at least one multi-hop path segment with a first hop segment and a second hop segment, such that the both the first hop segment and the second hop segment are capable of being selected based on the first identifier of the first identifier set;

based on a receipt, at the first network node, of a second packet specified by the protocol and including second data, identifying, as being for use by the first network node and in a second header of the second packet, a last identifier of a second identifier set, the second identifier set being predetermined at the second source node and the last identifier of the second identifier set being of the second identifier type such that the first network node is the single node;

transmitting, based on the last identifier of the second identifier set, the second data from the first network node to the adjacent node via the particular network interface of the particular link path segment that directly connects the first network node to the adjacent node;

based on a receipt, at the first network node, of a third packet specified by the protocol and including third data, identifying, as being for use by the first network node and in a third header of the third packet, a first identifier of a third identifier set, the third identifier set being predetermined at the third source node and the first identifier of the third identifier set being of the fourth identifier type; and utilizing the first identifier of the third identifier set to identify the plurality of corresponding path segment identifiers; and transmitting, based on a first one of the plurality of corresponding path segment identifiers, the third data to a first one of the plurality of corresponding path segments in the third network path;

at the first path node in the first network path:
based on a receipt, at the first path node, of the first packet specified by the protocol and including the first data, identifying, as being for use by the first path node and in the first header of the first packet, a second identifier of the first identifier set being of the third identifier type such that the first path node is one of the plural nodes; and transmitting, based on the second identifier of the first identifier set, the first data from the first path node to the particular path node; and at the first one of the plurality of corresponding path segments in the third network path:
transmitting, based on a second one of the plurality of corresponding path segment identifiers, the third data to a second one of the plurality of corresponding path segments in the third network path.

182. The method of claim 181, wherein the first identifier of the first identifier set of the first identifier type identifies only the particular region without identifying any other particular regions.

183. The method of claim 181, wherein the first identifier of the first identifier set of the first identifier type identifies a plurality of the particular regions.

184. The method of claim 181, wherein the plurality of region nodes do not include the first network node.

185. The method of claim 181, wherein the plurality of region nodes include the first network node.

186. The method of claim 181, wherein both the first hop segment and the second hop segment are capable of being selected based on the first identifier of the first identifier set of the first identifier type without utilizing any other identifier in the first packet.

187. The method of claim 181, wherein the plurality of corresponding path segments are capable of being selected based on the first identifier of the third identifier set of the fourth identifier type without utilizing any other identifier in the first packet.

188. The method of claim 181, wherein both the first identifier type and the third identifier type are in the identifier space having a scope that spans an entirety of the region of the network in which the protocol is administered.

189. The method of claim 181, wherein both the first identifier type and the third identifier type are in the identifier space having a scope that spans only a subset of the region of the network in which the protocol is administered.

190. The method of claim 181, wherein both the first identifier type and the third identifier type are in different identifier spaces having different scopes that span different subsets of the region of the network in which the protocol is administered.

191. The method of claim 181, wherein the identifier space having the scope that spans the plural nodes is same as the identifier space having the scope that spans the multiple nodes, such that the plural nodes are same as the multiple nodes.

192. The method of claim 181, wherein the identifier space having the scope that spans the plural nodes is different from the identifier space having the scope that spans the multiple nodes, such that the plural nodes are at least partially different from the multiple nodes.

193. The method of claim 181, wherein the particular region is a subset of the region in which the protocol is administered.

194. The method of claim 181, wherein the fourth identifier type is in an identifier space having a scope that spans at least a portion of only one node.

195. The method of claim 181, wherein the fourth identifier type is in an identifier space having a scope that spans a plurality of nodes only in the region of the network in which the protocol is administered.

196. The method of claim 181, wherein the scope of the identifier space of the first identifier type and the scope of the identifier space of the third identifier type are capable of spanning different subsets of the region of the network in which the protocol is administered, such that different identifiers of the first identifier type and the third identifier type are in different identifier spaces having different scopes that span different subsets of the region of the network in which the protocol is administered.

197. The method of claim 181, wherein the first identifier of the third identifier type is utilized to identify a plurality of associated path segment identifiers which identify a plurality of associated path segments to the particular path node.

198. The method of claim 181, wherein the second identifier of the first identifier set includes a loopback address.

199. The method of claim 181, wherein the first identifier of the first identifier set includes a subnet address.

200. The method of claim 181, wherein the first identifier of the first identifier set includes an IP prefix.

201. The method of claim 181, wherein the first data is transmitted according to a first policy, and second data is transmitted according to a second policy, where the first data and the second data are components of a same digital object.

\* \* \* \* \*